US 7,283,810 B1

(12) United States Patent
Arakawa et al.

(10) Patent No.: US 7,283,810 B1
(45) Date of Patent: Oct. 16, 2007

(54) COMMUNICATION DEVICE OF MOBILE UNIT

(75) Inventors: Shuji Arakawa, Hiratsuka (JP); Seiichi Mizui, Odawara (JP); Seiji Kamada, Chigasaki (JP); Yoshio Asayama, Chigasaki (JP); Noriaki Abe, Kawasaki (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/936,484

(22) PCT Filed: Mar. 17, 2000

(86) PCT No.: PCT/JP00/01657

§ 371 (c)(1),
(2), (4) Date: Dec. 6, 2001

(87) PCT Pub. No.: WO00/55827

PCT Pub. Date: Sep. 21, 2000

(30) Foreign Application Priority Data

Mar. 17, 1999 (JP) ................................. 11-072734
Mar. 17, 1999 (JP) ................................. 11-072742

(51) Int. Cl.
*H04M 3/42* (2006.01)
*B60Q 1/00* (2006.01)

(52) U.S. Cl. ................ 455/414; 455/412.1; 455/412.2; 455/423; 340/438; 340/439; 340/441; 340/459

(58) Field of Classification Search ............... 455/556, 455/33.2, 11, 99, 456; 370/346, 85.7; 340/825, 340/825.06, 991, 431, 438, 988, 426, 457
See application file for complete search history.

(56) References Cited

U.S. PATENT DOCUMENTS

| 4,107,689 | A |   | 8/1978  | Jellinek          |         |
|-----------|---|---|---------|-------------------|---------|
| 4,132,941 | A | * | 1/1979  | Sousek et al.     | 318/663 |
| 5,025,253 | A | * | 6/1991  | DiLullo et al.    | 340/10.41 |
| 5,068,656 | A | * | 11/1991 | Sutherland        | 340/989 |
| 5,299,132 | A | * | 3/1994  | Wortham           | 455/457 |
| 5,400,018 | A |   | 3/1995  | Scholl et al.     |         |
| 5,442,553 | A | * | 8/1995  | Parrillo          | 455/420 |
| 5,515,043 | A | * | 5/1996  | Berard et al.     | 340/988 |
| 5,588,005 | A |   | 12/1996 | Ali et al.        |         |
| 5,726,450 | A | * | 3/1998  | Peterson et al.   | 250/338.5 |
| 5,742,915 | A | * | 4/1998  | Stafford          |         |
| 5,758,300 | A | * | 5/1998  | Abe               | 455/424 |
| 5,913,170 | A | * | 6/1999  | Wortham           | 455/457 |
| 6,204,772 | B1| * | 3/2001  | DeMay et al.      | 340/686.1 |
| 6,292,736 | B1| * | 9/2001  | Aruga et al.      | 701/95  |

(Continued)

FOREIGN PATENT DOCUMENTS

JP          62-94443         4/1987

(Continued)

*Primary Examiner*—William Trost
*Assistant Examiner*—Julio Perez
(74) *Attorney, Agent, or Firm*—Posz Law Group, PLC; R. Eugene Varndell, Jr.

(57) ABSTRACT

Communications are performed between a mobile unit and a terminal device. The mobile unit is provided with a communication device that is capable of communicating with the terminal device if it is connected electrically with a power supply. When an engine key switch signal is off, the electrical connection between the power supply and the communication device is turned on and off intermittently.

21 Claims, 38 Drawing Sheets

U.S. PATENT DOCUMENTS

| | | | |
|---|---|---|---|
| 6,331,972 B1* | 12/2001 | Harris et al. | 370/313 |
| 2002/0033833 A1* | 3/2002 | Kinugawa et al. | 345/629 |
| 2002/0038172 A1* | 3/2002 | Kinugawa | 701/50 |
| 2003/0093203 A1* | 5/2003 | Adachi et al. | 701/50 |
| 2003/0115019 A1* | 6/2003 | Doddek et al. | 702/183 |
| 2003/0137398 A1* | 7/2003 | Shibata et al. | 340/5.61 |

FOREIGN PATENT DOCUMENTS

| | | |
|---|---|---|
| JP | 6294443 | 4/1987 |
| JP | 62-277579 | 12/1987 |
| JP | 4152499 | 5/1992 |
| JP | 4-215324 | 8/1992 |
| JP | 04215324 | 8/1992 |
| JP | 06-330539 | 11/1994 |
| JP | 7-6299 | 1/1995 |
| JP | 7-123042 | 5/1995 |
| JP | 8-136639 | 5/1996 |
| JP | 8136639 | 5/1996 |
| JP | 8147597 | 6/1996 |
| JP | 9147297 | 6/1997 |
| JP | 09-282596 | 10/1997 |
| JP | 10-063997 | 3/1998 |
| JP | 10171508 | 6/1998 |
| JP | 10-290193 | 10/1998 |
| JP | 10290193 | 10/1998 |
| JP | 11-7599 | 1/1999 |
| JP | 117599 | 1/1999 |

* cited by examiner

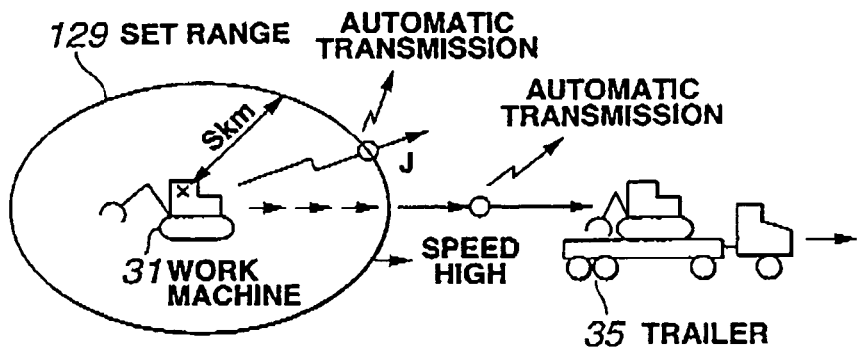
FIG.10
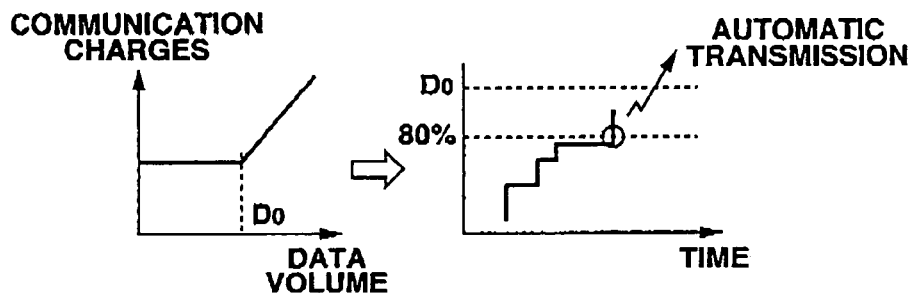
FIG.11(a) FIG.11(b)
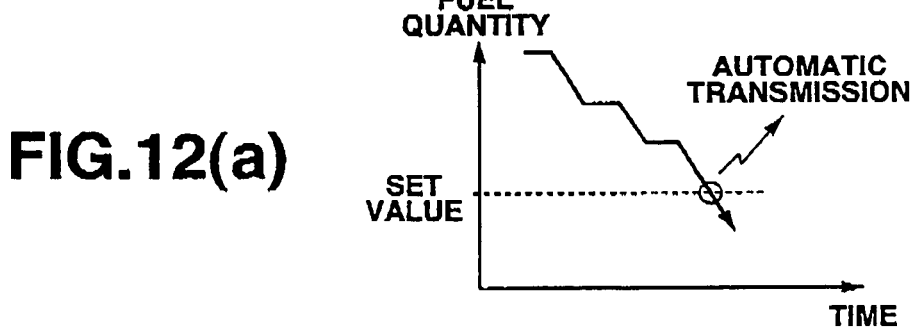
FIG.12(a)
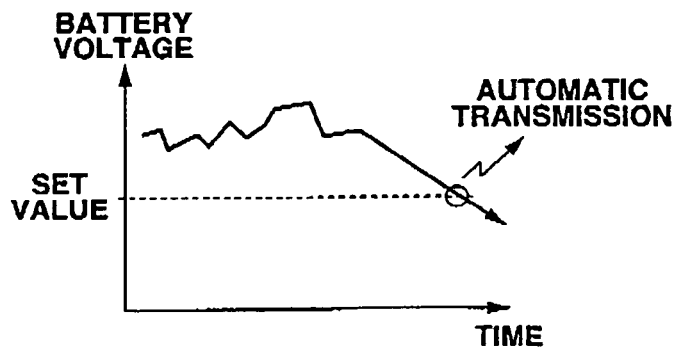
FIG.12(b)

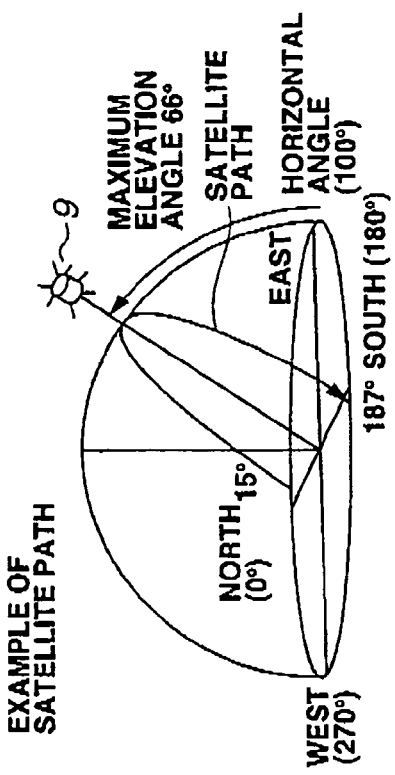
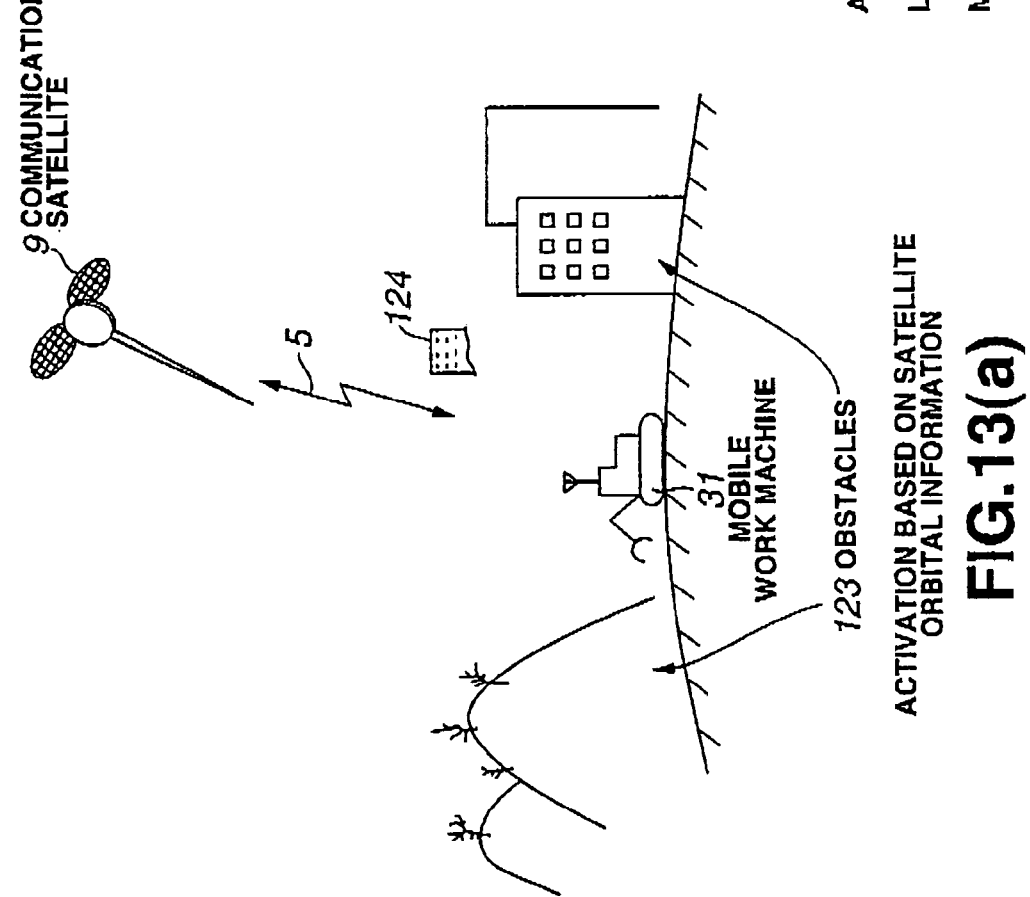
FIG.13(c)
FIG.13(b)
AOS TIME AND AZIMUTH AT WHICH SATELLITE APPEARS ON HORIZON
LOS TIME AND AZIMUTH AT WHICH SATELLITE DISAPPEARS BELOW HORIZON
MEL TIME AND AZIMUTH AT MAXIMUM ELEVATION ANGLE
FIG.13(a)

FIG.17(a)

| COMMUNICATION STATUS | VEHICLE NUMBER | POSITION | SERVICE METER |
|---|---|---|---|
| BLUE | 23 | TOWN A | 405H |
| YELLOW | 102 | CITY B | 120H |
| BLUE | 117 | TOWN C | 97H |
| BLUE | 233 | CITY D | 381H |
| YELLOW | 234 | TOWN E | 39H |

33, 31, 36, 37, 32

REARRANGE ACCORDING TO COMMUNICATION STATUS ⇧

FIG.17(b)

| COMMUNICATION STATUS | VEHICLE NUMBER | POSITION | SERVICE METER |
|---|---|---|---|
| YELLOW | 102 | CITY B | 120H |
| YELLOW | 234 | TOWN E | 39H |
| BLUE | 23 | TOWN A | 405H |
| BLUE | 117 | TOWN C | 97H |
| BLUE | 233 | CITY D | 381H |

31, 32, 33, 36, 37

EXTRACT ⇨

FIG.17(c)

| COMMUNICATION STATUS | VEHICLE NUMBER | POSITION | SERVICE METER |
|---|---|---|---|
| YELLOW | 102 | CITY B | 120H |
| YELLOW | 234 | TOWN E | 39H |

31, 32

T1 > T2 > T3 > T4

DATA BY VEHICLE MODEL : LATEST DATA [RETURN]

POSITION DATA : HISTORY

| DATE | LATITUDE | LONGITUDE |
|---|---|---|
| 98/10/19 3:58:30 P.M. | H35.19.15.240 | E139.17.54.210 |

SERVICE METER | 98/10/19 3:58:30 P.M. | [GRAPH]

SPECIFIC DATA

| | | | | |
|---|---|---|---|---|
| FUEL QUANTITY | 98/09/10 5:06:38 P.M. | 90 | % | GRAPH |
| ENGINE SPEED | 98/09/10 5:06:38 P.M. | 1340 | RPM | GRAPH |
| BATTERY VOLTAGE | 98/09/10 5:06:38 P.M. | 26 | V | GRAPH |
| PUMP PRESSURE | 98/09/10 5:06:38 P.M. | 35 | kg/cm² | GRAPH |
| WORK MODE | 98/09/10 5:06:38 P.M. | | | |

IMAGE CAPTURED BY CAMERA
116

[RUNNING MAP] [GRAPH]

MOBILE LIST DISPLAY

| | NO. | PURCHASING USER | UTILIZING USER | Car ID | MANU-FACTURER | CONSTRUCTION MACHINE TYPE |
|---|---|---|---|---|---|---|
| PROCESSING DONE | 0 | ASAYAMA KENSETSU | ASAYAMA KENSETSU | 2 | | CRANE |
| REQUEST IN PROGRESS | 1 | SUZUKI JUKI | SUZUKI JUK | 28 | | WHEEL LOADER |
| REQUEST IN PROGRESS | 2 | ABE RENTAL | MIZUI DOBOKU | 26 | | SPECIAL |
| REQUEST IN PROGRESS | 3 | ABE RENTAL | MIZUI DOBOKU | 25 | | CRANE |
| NORMAL | 4 | SUZUKI JUKI | SUZUKI JUKI | 30 | | BULLDOZER |
| NORMAL | 5 | HIRAKI SAISEKI | HIRAKI SAISEKI | 29 | | WHEEL LOADER |
| NORMAL | 6 | HQS | BREWERY | 20 | | |

CLEAR SELECTIONS

REQUEST EXECUTION

SELECTION OF RECIPIENT OF VEHICLE DATA SENT BACK

| REPLY RECIPIENT TERMINAL |
|---|
| ADMINISTRATOR A |
| ADMINISTRATOR B |
| SERVICE CAR |
| TRAILER |
|  |
|  |
|  |

REQUEST EXECUTION | CANCEL

NUMBER OF BYTES CHARGED FOR THIS MONTH [1101]
TRANSMISSION BYTES [6] RECEPTION BYTES [6] CURRENT BYTE COUNT [1089]

BASIC DATA
☐ VEHICLE POSITION  ☐ SERVICE METER

☐ SPECIFIC SINGLE METER

ALL ON | ALL OFF
☐ FUEL QUANTITY
☐ WORK MODE
☐ VEHICLE BODY ALARM 1
☐ VEHICLE BODY ALARM 2
☐ BATTERY VOLTAGE
☐ ENGINE WATER TEMPERATURE
☐ ENGINE SPEED
☐ PUMP PRESSURE

EXAMPLE OF SCREEN FOR MAKING INFORMATION REQUEST TO MOBILES

FIG.32

NOTIFICATION SCREEN

There were 7 noticed as of 10:21:31 a.m. on 00/01/31. No.1 to no.7 are displayed.
Previous 20 notices    Next 20 notices    Page : 1

| WATCH | TIME | MANU-FACTURER | MODEL | MODEL NUMBER | MACHINE NUMBER | ID1 | ID2 | CONTENT |
|---|---|---|---|---|---|---|---|---|
| ☐ | 2000/01/31 08:38 | X COMPANY | PC60 | 7 | 0251 | K623 | | The lock was set by remote. |
| ☐ | 2000/01/30 21:14 | X COMPANY | PC200 | 6E | 1338 | K005 | | Vehicle engine started outside regular hours. |
| ☑ | 2000/01/30 03:20 | X COMPANY | PC75UU | 3 | 3007 | K108 | | No confirmation of locking received from vehicle. |
| ☐ | 2000/01/29 20:28 | X COMPANY | PC75UU | 3 | 0011 | K008 | | The battery voltage is low. |
| ☐ | 2000/01/29 09:57 | X COMPANY | PC75UU | 3 | 7789 | K315 | | The vehicle is out of range. |
| ☐ | 2000/01/29 05:25 | X COMPANY | PC200 | 6E | 7633 | K311 | | Vehicle engine started outside regular hours. |
| ☑ | 2000/01/28 21:54 | X COMPANY | PC75UU | 3 | 5422 | K116 | | No communication with vehicle for 36 hours or more. |

SET VEHICLE TO WATCH

ORGANIZE NOTICES

※This screen is automatically updated at a certain time interval.

FIG.34

SCREEN OF ENTRY AND LEAVING

LATEST ITEMS FROM NO.1 TO NO.10 DISPLAYED.
PREVIOUS 20 ITEMS   NEXT 20 ITEMS   PAGE : 1

| TIME | PARTICULARS OF ENTRY AND LEAVING |
|---|---|
| 1999/11/15  16:19:00 | LEFT SOUTH TOKYO OFFICE. |
| 1999/11/15  15:37:00 | ENTERED SHIRAKAWA BRANCH OFFICE. |
| 1999/11/15  13:53:00 | LEFT WEST TOKYO OFFICE. |
| 1999/11/12  14:37:00 | LOCATED AT WEST TOKYO OFFICE. |
| 1999/11/12  14:17:00 | ENTERED WEST TOKYO OFFICE. |

FIG.36

DAILY WORK REPORT SCREEN

ABC DOBOKU (KK)　　　　　　　　　　　　　　　SITE : IROHA ROCK QUARRY

| DATE | RUNNING MAP | RUNNING TIME | NAME OF WORKER | REMARKS |
|---|---|---|---|---|
| 2000/01/30 | 0:00 — 24:00 | 0 HOUR 0 MINUTE | | |
| 2000/01/29 | 0:00 — 24:00 | 8 HOURS 18 MINUTES | SATOH | LUBE |
| 2000/01/28 | 0:00 — 24:00 | 8 HOURS 24 MINUTES | SATOH | |
| 2000/01/27 | 0:00 — 24:00 | 8 HOURS 36 MINUTES | SATOH | |
| 2000/01/26 | 0:00 — 24:00 | 9 HOURS 12 MINUTES | SUZUKI | |
| 2000/01/25 | 0:00 — 24:00 | 0 HOUR 54 MINUTES | SUZUKI | |
| 2000/01/24 | 0:00 — 24:00 | 3 HOURS 12 MINUTES | KATOH | |
| 2000/01/23 | 0:00 — 24:00 | 0 HOUR 0 MINUTE | | |
| 2000/01/22 | 0:00 — 24:00 | 2 HOURS 54 MINUTES | SATOH | FUEL 2001 |
| 2000/01/21 | 0:00 — 24:00 | 5 HOURS 36 MINUTES | SATOH | |

CHARGES : XXXXXXX YEN (TOTAL 49 HOURS 6 MINUTES)

| MANUFACTURER | COMPANY A |
|---|---|
| MODEL | PC2000 |
| MODEL NUMBER | 6E |
| MACHINE NUMBER | 18322 |
| IDENTIFICATION ID1 | K274 |
| IDENTIFICATION ID2 | |
| VEHICLE TYPE | POWER SHOVEL |
| UTILIZATION USER | |
| CLASSIFICATION 1 | UNCLASSIFIED |
| CLASSIFICATION 2 | UNCLASSIFIED |
| DATE OF RECEIPT OF LATEST MAIL | 2000/01/30 23:00:00 |
| COMMUNICATION STATUS | REPLY SENT |

FIG.40

COMMUNICATION DEVICE OF MOBILE UNIT

CROSS-REFERENCE TO RELATED APPLICATIONS

This application is a U.S. national phase application of International Application No. PCT/JP00/01657 filed Mar. 17, 2000, which application was not published in English.

TECHNICAL FIELD

The present invention relates to a communication device of a mobile unit for carrying out communications between a mobile unit, such as construction machine, and a terminal device.

BACKGROUND ART

For a mobile unit, especially a construction machine, data, such as travel location, service meter, amount of fuel, and engine speed, is required information from the standpoint of managing a vehicle.

In the past, as a method for acquiring data related to this construction machine, maintenance personnel went out to the construction machine, and downloaded historical data written to the internal memory of the construction machine by connecting a personal computer to the construction machine. Then, a plurality of construction machine was managed by storing data collected from a plurality of construction machine into the memory of a computer in the management section.

However, because the collection of information was done by hand, the larger the number of construction machine, and the more remote their location, the more complicated data collection became, detracting greatly from the efficiency of data collection work.

Accordingly, as seen in Japanese Patent Application Laid-open No. 6-330539, attempts are being made to automatically acquire construction machine data using communication means without relying on man power.

The invention disclosed in the above-mentioned publication is one that makes a connection between a management section and construction machine for unfettered two-way communications via communication means, and a data request is sent from the management section, data is extracted by the construction machine, and sent back to the management section. In this manner, the data of the construction machine side is collected at the requesting management section. Consequently, construction machine data can be obtained by a terminal of the management section side.

However, the period of time during which a construction machine engine is not running (in other words, the period of time during which the power is OFF) is long.

FIG. 21 shows the inside of the body of a construction machine. In FIG. 21, if a battery 63 (rated voltage 24V), which is the power source, were, hypothetically, to be connected electrically to a communication terminal 56 at all times even while the engine is OFF, the battery 63 would not be charged by the alternator because the engine would not be running. Thus, the discharge of the battery 63 would proceed rapidly. Conversely, if the electrical connection between the battery 63 and communication terminal 56 were, hypothetically, to be OFF at all times while the engine is OFF, communications with the terminal would be impossible. For this reason, if there is a request for mobile unit information from the terminal side when the engine is OFF, it is impossible to respond to this.

Accordingly, even for construction machine and other mobile units, the engines of which are not run for long periods of time, it is desirable to make communications with a terminal possible while the engine is OFF, and to enable a response to be given to a request from the terminal, and, in addition, to enable wasted power consumption to be held in check.

Furthermore, in Japanese Patent Application Laid-open No. 10-68336, there is disclosed an invention, in which, when a signal requesting data relative to construction machine is received from a remote terminal, a construction machine internal controller is started up in response to signal reception, resulting in a state wherein download is possible, and start-stop is performed subsequent to the passage of a fixed period of time after a request signal is received. However, according to this invention, construction machine data cannot be sent to a remote terminal from the construction machine side in a state, wherein the remote terminal is not sending a request signal. That is, it is not possible to cope with a case in which construction machine transmits data on its own.

Accordingly, a first invention is a communication device, wherein the mobile unit side sometimes transmits data on its own, and has as an object the enabling of communications while an engine is OFF, and, in addition, the suppressing of wasted power consumption.

Further, in the above-mentioned Japanese Patent Application Laid-open No. 6-330539, an error code is automatically sent to a management section terminal from the construction machine side when a serious malfunction occurs.

Here, it is desirable to be aware of an abnormal state occurring in construction machine, which cannot be constantly managed and monitored by a terminal of the management side, and to accurately comprehend an operating state, and a resting state of construction machine, which cannot be constantly managed and monitored by a terminal of the management section side.

However, according to the invention disclosed in the above-mentioned publication, such requirements cannot be handled.

For example, it is supposed that data concerning the location of construction machine is to be acquired.

According to the invention disclosed in the above-mentioned publication, it is possible to acquire the location of construction machine on the management section side only when there is a request from the management section regarding construction machine. That is, the successive locations of construction machine cannot be acquired by the management section side unless a request is made from the management section. Thus, when the management section does not request location data, if construction machine is moved illegally, it is not possible to deal with this in an opportune fashion. Further, just automatically sending an error code from the construction machine side does not make it possible to deal with an abnormal situation such as construction machine being moved illegally.

In this manner, according to the invention disclosed in the above-mentioned publication, it is not possible to know about an abnormal state occurring in construction machine, which cannot be constantly managed and monitored. Further, it is not possible to accurately comprehend an operating state, and a resting state of construction machine, which cannot be constantly managed and monitored.

A third invention has as an object making it possible to know about an abnormal state occurring in a mobile unit, which cannot be constantly managed and monitored by the terminal side, and to accurately comprehend an operating state, and a resting state of a mobile unit.

Now then, since construction machines are very expensive, they are often rendered to be rented. The rental of construction machines utilizes a system called group rental. This is a system, whereby, due to the fact that there are various kinds of construction machines (small-sized hydraulic excavator, medium-sized hydraulic excavator, large-sized hydraulic excavator, and so forth), these many kinds of construction machines are shared by a plurality of business offices. For this reason, when a certain business office has a request from a client for a specific type of rental machine, and a business office does not have the pertinent type of construction machine, the business office can get another business office to loan it this specific type of construction machine, thereby not missing out on a business opportunity.

To meet the rental requests of clients, each business office must reliably manage the storage and dispatch of its construction machine.

For some time now, managing the storage and dispatch of construction machine at a business office has ordinarily been performed using storage and dispatch management software. That is, every time construction machine is recovered from a rental customer and placed in storage, and every time it is taken out of storage for delivery to a rental customer, an operator records the storage and dispatch history via a personal computer keyboard inputting operation.

However, because an operator performs the inputting operation by visual confirmation, there are times when inputting is forgotten for a long time, or erroneous inputting is performed. Thus, there are instances when a certain type of machine is recorded as being "not in storage" despite the fact that it is in storage, and instances when a certain type of machine is recorded as being "in storage" despite the fact that it is not in storage. In other words, there are occasions when storage and dispatch data does not correspond to the actual storage and dispatch status.

At a business office, when there is a request for rental from a customer, a reply is given to the customer based on the data recorded in the personal computer. However, when the above-mentioned input error occurs, there are times when a business office responds that the specified type of machine "is not in storage and therefore cannot be rented" despite the fact that it is in storage. Thus, although rental is actually possible, rental is declined, and a business opportunity is lost. Further, there are also times when a business office responds that the specified type of machine is "in storage and can be rented" despite the fact that it is not in storage. Thus, although rental is actually not possible, because the business office agreed to a rental, the customer is put to a lot of trouble. If this situation continues, there is the danger that the customer will decide to deal with another manufacturer's business office.

An eleventh invention was devised with this fact in view, and has as an object making possible the real-time recording of the storage and dispatch history of a mobile unit, such as construction machine, and enabling storage and dispatch management to be performed reliably without mistakes.

Further, the delivery of construction machine to a rental customer, or the recovery of construction machine from a rental customer is carried out by loading the construction machine on a trailer. Because of the high cost of transportation by trailer, it is necessary to heighten the efficiency of trailer transport, and to keep transporting costs low. Further, it is necessary to increase rental opportunities and to raise business profits by speeding up delivery to a rental customer and recovery from a rental customer by heightening the efficiency of trailer transport.

A thirteenth invention and a fourteenth invention were devised with this fact in view, and have as an object enhancing the transport efficiency of a mobile unit, such as construction machine.

A first invention is a communication device of a construction machine for communicating between the construction machine and a terminal device, characterized in that:

a communication device, which enables communications with said terminal device when an electrical connection to a power source is ON, and location detecting means for detecting a location of said construction machine are provided in said construction machine;

means for turning ON an electrical connection between said power source and said communication device when an engine of said construction machine is stopped, is provided in said construction machine; and a time at which the electrical connection between said power source and said communication device is turned ON is changed in accordance with the location of said construction machine detected by said location detecting means.

Further, a second invention is a communication device of a construction machine for communicating between the construction machine and a terminal device, characterized in that:

a communication device, which enables communications with said terminal device when an electrical connection to a power source is ON and travel speed computing means for computing a travel speed of said construction machine are provided in said construction machine;

means for turning ON the electrical connection between said power source and said communication device when an engine of said construction machine is stopped, is provided in said construction machine; and a time at which the electrical connection between said power source and said communication device is turned ON is changed in accordance with the travel speed of said construction machine computed by said travel speed computing means.

Further, a third invention is a communication device of a mobile unit constituted such that the mobile unit and a terminal device are connected by communication means enabling mutual transmission and reception, and, in accordance with an input operation performed at said terminal device of requesting mobile unit information related to the mobile unit, a content of a request is sent to the mobile unit, and the mobile unit, which receives the request content, acquires, via a mobile unit, mobile unit information corresponding to the request content and sends the acquired mobile unit information to said terminal device, characterized in that:

detecting means for detecting a specified parameter in the mobile unit is provided in said mobile unit; and when said detecting means detects that the specified parameter has attained a specified value, specified mobile unit information is sent to said terminal device from said mobile unit.

This invention will be explained by referring to FIG. 1 and FIG. 26.

That is, communications are carried out between a mobile unit 31 and a terminal device 11 as shown in FIG. 1, and when instructions requesting mobile unit 31 data are sent to the mobile unit 31 from the terminal device 11, mobile unit 31 data is sent to the terminal device 11 from the mobile unit 31.

Meanwhile, in the mobile unit 31, a mobile unit internal parameter, for example, the engine start-up state, is detected by detecting means (for example, a sensor for detecting an alternator voltage value).

Then, when the detection output of detecting means constitutes a specified value (state of engine at start-up) as shown in FIG. 26 (A), mobile unit information is sent to the terminal device 11 from the mobile unit 31 as shown in FIG. 26 (B).

For example, it is supposed that mobile unit information, such as the location of construction machine or some other mobile unit 31, is to be acquired.

According to this invention, even when there is no request for location data from the terminal device 11, the location of the mobile unit 31 is acquired by the terminal device 11 side when the engine is started up. Thus, even in a case in which the engine is started up at night, and the mobile unit 31 is moved illegally, since location data is acquired by the terminal device 11 side at that time, it is possible to deal appropriately with an abnormal situation. Further, even when location data is not requested from the terminal device 11 side, a location history of each time the engine is started is acquired by the terminal device 11 side, making it possible to accurately comprehend the operating states and resting states of the mobile unit 31.

Therefore, according to this invention, even under conditions, wherein there is no request from the terminal device 11 side, since mobile unit information is acquired when a mobile unit 31 internal parameter constitutes a specified value, it is possible to perceive an abnormal situation that occurs in the mobile unit 31, which cannot be constantly monitored by the terminal device 11 side, and it is possible to accurately comprehend the operating states and resting states of the mobile unit 31.

Further, a fourth invention is according to the third invention, and is characterized in that the above-mentioned detecting means is detecting means for detecting the fact that the engine of the above-mentioned mobile unit was started up, and when the above-mentioned engine is started up, the specified mobile unit information is sent to said terminal device from said mobile unit.

Further, a fifth invention is according to the third invention, and is characterized in that the above-mentioned detecting means is detecting means for totaling the engine operating hours of the above-mentioned mobile unit, and when the total value of the above-mentioned engine operating hours either reaches a specified value, or increases by a specified amount, the specified mobile unit information is sent to said terminal device from said mobile unit.

Further, a sixth invention is according to the third invention, and is characterized in that the above-mentioned detecting means is detecting means for detecting the location of the above-mentioned mobile unit, and when the location of the above-mentioned mobile unit changes, the specified mobile unit information is sent to said terminal device from said mobile unit.

Further, a seventh invention is according to the third invention, and is characterized in that the above-mentioned detecting means is detecting means for detecting the relative location of the above-mentioned mobile unit for a set range, and when the relative location of the above-mentioned mobile unit for a set range constitutes a specified relative location, the specified mobile unit information is sent to said terminal device from said mobile unit.

Further, an eighth invention is according to the third invention, and is characterized in that the above-mentioned detecting means is detecting means for detecting a drop in voltage of a power source mounted to the above-mentioned mobile unit, and when the voltage of the above-mentioned power source drops below a specified value, the specified mobile unit information is sent to said terminal device from said mobile unit.

Further, a ninth invention is according to the third invention, and is characterized in that the specified mobile unit information is sent to said terminal device from said mobile unit only when the content of mobile unit-related data to be sent this time differs from the mobile unit-related data sent the previous time.

Further, a tenth invention is according to the third invention, and is characterized in that, by sending change data to the above-mentioned mobile unit from the above-mentioned terminal device, this change data is received by the above-mentioned mobile unit, and the above-mentioned mobile unit changes either a mobile unit internal parameter, or a specified value of the above-mentioned parameter in accordance with the received change data.

Further, an eleventh invention is a communication device of an operational mobile unit for communicating between a plurality of operational mobile units and a terminal device, characterized in that:

one or more business offices at/from which said plurality of operational mobile units are stored/dispatched, and one or more work sites at which said plurality of operational mobile units are operated, are established;

location detecting means for detecting a location of said operational mobile unit is provided in each operational mobile unit;

based on the detection result of said location detecting means and location data for said business office and work site, when said operational mobile unit enters said business office or work site, data stating that this operational mobile unit has entered this business office or work site is sent to said terminal device from this operational mobile unit, and when said operational mobile unit exits from said business office or work site, data stating that this operational mobile unit has exited this business office or work site is sent to said terminal device from this operational mobile unit; and based on said sent data, data on the entry/exit of said plurality of operational mobile units to/from said business offices or work sites is managed by said terminal device.

According to the eleventh invention, a plurality of areas 130, 131, 132, which the mobile unit 31 enters and exits, are established as shown in FIG. 35. And location detecting means (a GPS (global positioning system) sensor 57) for detecting the location of mobile unit 31, is provided in mobile unit 35.

On the basis of the detection results of location detecting means 57 and the location data P, Q, R of the plurality of areas 130, 131, 132, when the mobile unit 31 enters area 130*a*, data to the effect that this mobile unit 31 entered this area 130*a* (vehicle 31 is in storage at branch office 130) is sent to the terminal device 11 from this mobile unit 31.

Further, when the mobile unit 31 exits area 130*b*, data to the effect that this mobile unit 31 exited from this area 130*b* (vehicle 31 has departed from branch office 130) is sent to the terminal device 11 from this mobile unit 31.

And then, based on the sent data, data ("in storage" and "dispatched") on the entry/exit of the mobile unit 31 to/from a plurality of areas ("branch office 130," "headquarters 131," and "branch office 132") is managed on the terminal device 11.

Thus, according to the eleventh invention, the storage and dispatch history of construction machine and other such mobile units 31 can be recorded in real-time, making it possible to perform storage and dispatch management reliably without errors.

Further, a twelfth invention is according to the eleventh invention, and is characterized in that when the above-mentioned mobile unit exits from any of the areas of the above-mentioned plurality of areas, location data is sent to the above-mentioned terminal device from the above-mentioned mobile unit each time the above-mentioned mobile unit moves a predetermined distance, and, based on the above-mentioned sent location data, data on the movement history of the above-mentioned mobile unit is managed by the above-mentioned terminal device.

Further, a thirteenth invention is a communication device of a mobile unit for communicating between a terminal device and a plurality of operational mobile units for operating at one or more operating areas, characterized in that:

a transportation mobile unit for transporting said plurality of operational mobile units is provided;

one or more storage and dispatch areas, at/from which said plurality of operational mobile units are stored/dispatched, are established, and, in addition, one or more operating areas, where said plurality of operational mobile units are operated, are established;

location detecting means for detecting locations of said plurality of operational mobile units is provided in each of said plurality of operational mobile units;

based on the detection results of said location detecting means and location data of said one or more operating areas, data as to whether or not said operational mobile unit is at said operating area is sent to said terminal device from this operational mobile unit;

based on the detection results of said location detecting means and location data of said one or more storage and dispatch areas, when said operational mobile unit enters said storage and dispatch area, data to the effect that this operational mobile unit has entered this storage and dispatch area is sent to said terminal device from this operational mobile unit;

when said operational mobile unit exits from said storage and dispatch area, data to the effect that this operational mobile unit exited from this storage and dispatch area is sent to said terminal device from this operational mobile unit;

based on said sent data, data as to whether said plurality of operational mobile units is either being stored at or has been dispatched from said one or more storage and dispatch areas, and data as to whether or not said plurality of operational mobile units is at said one or more operating areas are managed by said terminal device; and based on said managed data, said terminal device issues instructions to said transportation mobile unit to transport said operational mobile unit from said operating area to said storage and dispatch area, or to transport said operational mobile unit from said storage and dispatch area to said operating area.

According to the thirteenth invention, a transportation mobile unit 35 for transporting a plurality of operational mobile units 31, 32 is provided as shown in FIG. 37 (*a*). Either one or more storage and dispatch areas for storing a plurality of operational mobile units 31, 32 are established. Either one or more operating areas 133, 134, where a plurality of operational mobile units 31, 32 are operated, are established. Location detecting means (GPS sensor 57) for detecting the locations of the plurality of operational mobile units 31, 32 are provided on the plurality of operational mobile units 31, 32, respectively.

Accordingly, based on the detection results of location detecting means 57 and location data for either one or a plurality operating areas 133, 134, data as to whether or not the operational mobile units 31, 32 are located at either one or more operating areas 133, 134 is sent to the terminal device 11 from these operational mobile units 31, 32. Thus, data ("vehicle 32 is located at operating area 134") as to whether or not the plurality of operational mobile units 31, 32 is located at either one or more operating areas 133, 134 is acquired by the terminal device 1.

Further, based on the detection results of location detecting means 57 and location data for either one or more storage and dispatch areas 130, when the operational mobile unit 31 enters a storage and dispatch area 130, data to the effect that this operational mobile unit 31 entered this storage and dispatch area 130 ("vehicle 31 is stored at branch office 130") is sent to the terminal device 11 from this operational mobile unit 31.

Further, based on the detection results of location detecting means 57 and location data for either one or more storage and dispatch areas 130, when the operational mobile unit 31 exits from a storage and dispatch area 130, data to the effect that this operational mobile unit 31 exited this storage and dispatch area 130 is sent to the terminal device 11 from this operational mobile unit 31.

Based on the sent data, data as to whether the plurality of operational mobile units 31, 32 is either being stored at or have been dispatched from either one or more storage and dispatch areas 130 ("vehicle 31 is in storage at branch office 130"), and data as to whether or not the plurality of operational mobile units 31, 32 is located at either one or more operating areas 133, 134 ("vehicle 32 is at work site 134") is managed by terminal device 11.

Accordingly, based on managed data, the terminal device 11 can issue instructions to a transportation mobile unit 35 to transport operational mobile unit 32 from operating area 134 to storage and dispatch area 130, and to transport operational mobile unit 31 from storage and dispatch area 130 to operating area 133. In other words, the terminal device 11 can issue transport instructions to the transportation mobile unit 35 to the effect "Transport vehicle 31 at branch office 130 to work site 133, and on the return trip, transport vehicle 32 at work site 134 and return it to branch office 130."

For this reason, by dispatching the transportation mobile unit 35 one time, it is possible to carry out the transport of vehicle 31 and the transport (recovery) of vehicle 32 at the same time, making it possible to enhance the transportation efficiency of the mobile units 31, 32.

Further, a fourteenth invention is a communication device of a mobile unit for communicating between a terminal device and a plurality of operational mobile units for operating within one or more operating areas, characterized in that:

a transportation mobile unit for transporting said plurality of operational mobile units is provided;

one or more storage and dispatch areas, at/from which said plurality of operational mobile units is stored/dispatched, are established, and, in addition, one or more operating areas, where said plurality of operational mobile units are operated, are established;

location detecting means for detecting locations of said plurality of operational mobile units is provided in each of said plurality of operational mobile units;

based on the detection results of said location detecting means, location data of said one or more storage and dispatch areas, and location data of said one or more operating areas, when said operational mobile unit enters either said storage and dispatch area, or said operating area, data to the effect that this operational mobile unit entered this area is sent to said terminal device from this operational mobile unit, and when said operational mobile unit exits from either said storage and dispatch area, or said operating area, data to the effect that this operational mobile unit has exited from this area is sent to said terminal device from this operational mobile unit;

based on said sent data, data as to whether said plurality of operational mobile units is either being stored at or has been dispatched from said one or plurality of storage and dispatch areas, and data as to whether or not said plurality of operational mobile units is at said either one or plurality of operating areas are managed by said terminal device; and based on said managed data, said terminal device issues instructions to said transportation mobile unit to either transport said operational mobile unit from said operating area to said storage and dispatch area, or to transport said operational mobile unit from said storage and dispatch area to said operating area.

According to the fourteenth invention, the same effects as the thirteenth invention are obtained.

Further, a fifteenth invention is a communication device of a mobile unit for communicating between a mobile unit and a terminal device via a communication satellite, characterized in that:

a communication device, which enables communications with said terminal device when an electrical connection to a power source is ON and clocking means for clocking timing are provided in said mobile unit, and means for turning ON the electrical connection between said power source and said communication device each time the timing clocked by said clocking means and a flight timing of said communication satellite coincide when an engine of said mobile unit is stopped, is provided in said mobile unit.

Further, a sixteenth invention is a communication device of a mobile unit for communicating between a mobile unit and a terminal device, characterized in that:

a communication device enabling communications with said terminal device when an electrical connection to a power source is turned ON is provided in said mobile unit, means for turning ON at a predetermined period the electrical connection between said power source and said communication device when an engine of said operational mobile unit is stopped, is provided in said mobile unit, and said period is changed in accordance with change data sent to said mobile unit from said terminal device.

BRIEF DESCRIPTION OF THE DRAWINGS

FIG. 10 is a diagram illustrating the circumstances under which an automatic transmission is made from a mobile unit;

FIGS. 11(a) and 11(b) are graphs used for explaining an embodiment in which an automatic transmission is made from a mobile unit;

FIGS. 12(a) and 12(b) are graphs used for explaining an embodiment in which an automatic transmission is made from a mobile unit;

FIGS. 13(a) to 13(c) are diagrams used for explaining an embodiment in which a power-saving operation is performed;

FIGS. 16(a) to 16(d) are diagrams illustrating the circumstances under which the display mode of an icon of a mobile unit changes in accordance with the communication status;

FIGS. 17(a) to 17(c) are diagrams illustrating the circumstances under which data is sequenced in accordance with the communication status;

FIG. 31 is a diagram showing an example of a display on a terminal display screen;

FIG. 32 is a diagram showing an example of a display on a terminal display screen;

FIG. 34 is a diagram showing an example of a display on a terminal display screen;

FIG. 36 is a diagram showing an example of a display on a terminal display screen;

FIG. 40 is a diagram showing an example of a display on a terminal display screen.

BEST MODE FOR CARRYING OUT THE INVENTION

Hereinbelow, aspects of the embodiment of a communication device of a mobile unit related to the present invention will be explained by referring to the figures. Furthermore, this embodiment supposes a system for managing vehicles peripheral to mobile work machine, such as mobile work machine (machines that travel to perform work, including hydraulic excavators, bulldozers, wheel loaders and other such construction machine), mobile work machine transport vehicles (trailers and the like for transporting mobile work machine), service vehicles (vehicles that travel for performing maintenance, inspections and other such services), special fueling and lubricating vehicles, and parts supply vehicles.

Figure 1:
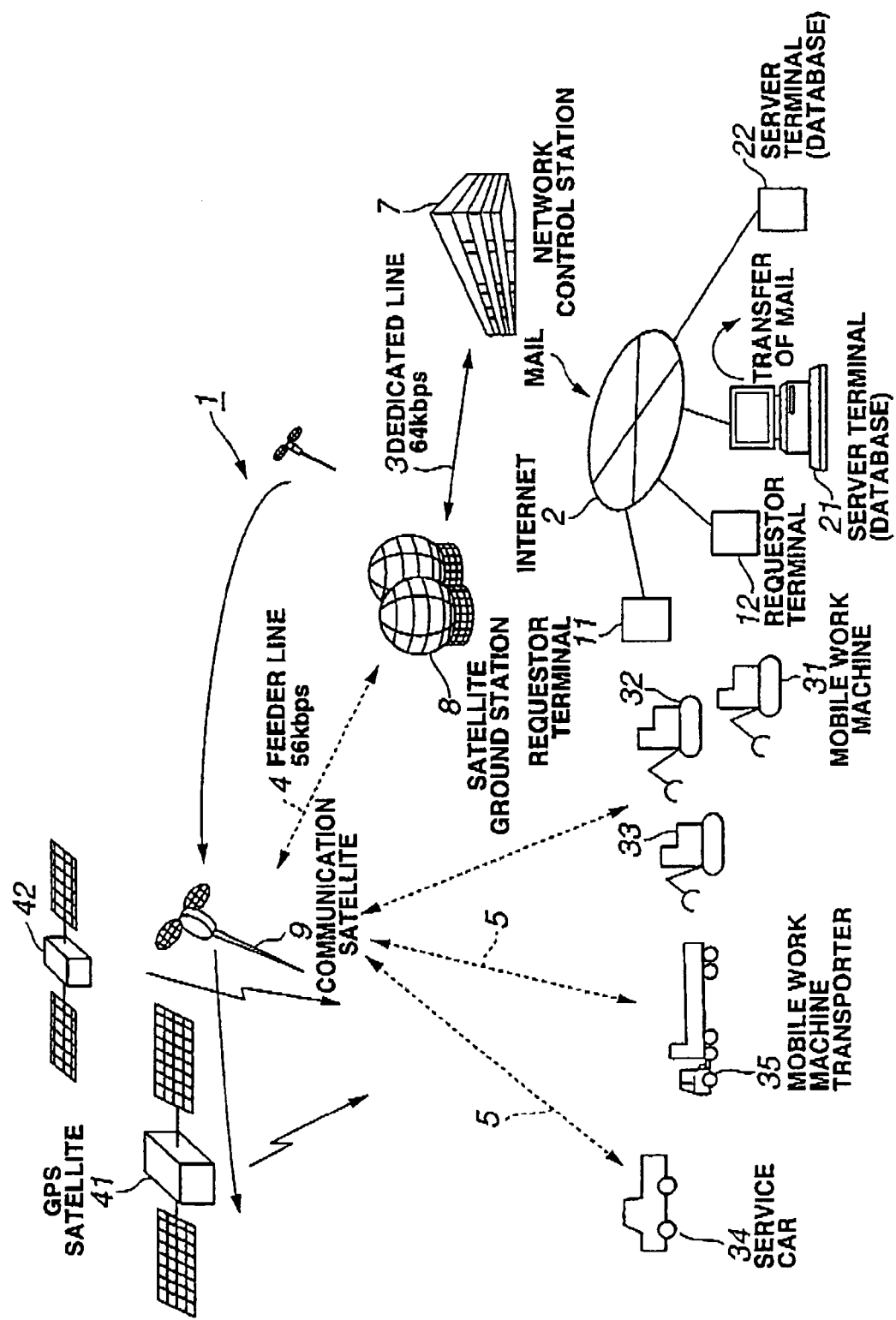
FIG. 1 is a diagram showing a communication device of this embodiment.

FIG. 1 shows the overall constitution of the embodiment.

As shown in FIG. 1, in the system of this embodiment, a plurality of mobile units 31, 32, 33, 34, 35 and a plurality of terminals 11, 12, 21, 22 are connected via communication means 1 (Internet 2, network control station 7, leased lines 3, satellite earth station 8, feeder lines 4, communication satellite 9, radio communication channel 5) to enable mutual transmitting and receiving.

That is, construction machine and the like are often operated on a rental basis, and the precise work area is often unclear. And there are also times when this machine is taken overseas. In this embodiment, a communication network, which enables communications from anywhere on Earth, is used to cope with such problems. Furthermore, because a plurality of mobile units 31–35 are often found in groups, the plurality of mobile units 31–35 can also be connected via a prescribed communication means to enable them to communicate freely with one another.

A plurality of mobile units 31–35 comprise mobile work machine, that is, construction machine 31, 32, 33, such as a bulldozer, hydraulic excavator, and crane, a service vehicle 34 for providing services like maintenance and inspections to this mobile work machine 31–33, and a mobile work machine transport vehicle, that is, a trailer 35 for transporting this mobile work machine 31–33.

Terminals 11, 12, and so forth, are terminal devices (workstations) connected to the Internet 2. More specifically, computers, such as personal computers, are connected to the Internet via public telephone lines in a freely communicating condition. Furthermore, the Internet is a global communication network connecting a plurality of LANs (local area networks) via gateways and bridges in a freely communicating condition. The Internet 2 provides services, such as WWW (World Wide Web: an information retrieval system on the Internet) and e-mail (electronic mail: (letters) sent and received via the Internet).

Terminals 11, 12, and so forth are installed in the offices of managers, who monitor and manage a plurality of mobile units 31–35, onboard a service vehicle 34, onboard a mobile work machine transport vehicle 35, in the offices of the users of the mobile work machine 31–33, and either in the mobile work machine 31–33 sales offices or business offices.

Terminal 21 is a server terminal provided corresponding to terminals 11, 12, and so forth, and is connected to the Internet 2. Server terminal 21 comprises a database, that is, storage means. Therefore, server terminal 21, in response to requests from terminals 11, 12, provides content stored in a database to these terminals 11, 12.

Terminal 22 is a server terminal provided corresponding to terminals other than terminals 11, 12.

The server terminals 21, 22 function as mail servers for providing e-mail services, and, in addition, function as HTTP (hypertext transfer protocol) servers for providing WWW services. In other words, a mail server performs processing such that data sent from a request-origination terminal is sent to the address specified in an e-mail address. And a HTTP server displays a homepage as a file described in HTML (hypertext markup language) on the display device of a request-origination terminal in response to a request from the request-origination terminal. A homepage (an Internet information screen) is displayed using a WWW browser as data display software. These e-mail data and homepage data are stored in the databases of the server terminals 21, 22.

A network control station 7 is connected in a freely communicating condition to the Internet 2.

The network control station 7 and a satellite earth station 8 are interconnected in a freely communicating condition by a wire leased line 3. Over this leased line 3, data is transmitted at a speed of 64 kbps.

The satellite earth station 8 and a communication satellite 9 are interconnected in a freely communicating condition by a wireless feeder line 4. Over this feeder line 4, data is transmitted at a speed of 56 kbps.

The communication satellite 9 and the plurality of mobile units 31–35 are interconnected in a freely communicating condition by wireless communication channels 5. The reason for using satellite communications as wireless communications here is because construction machine and other such mobile units often operate in mountainous areas, forested regions, and remote places, and it is required to ensure communications with a mobile unit even in these mountainous and other areas, which are incapable of being covered by ground wave communications. Further, if satellite communications are used, it becomes possible to manage and track construction machine even when it is taken overseas.

E-mail is sent and received on the Internet 2 in accordance with a communication protocol called TCP/IP (transfer control protocol/Internet protocol). For leased line 3, feeder line 4, and wireless communication channel 5, electronic mail is sent and received in accordance with prescribed communication protocols that differ from this. Protocol conversion is performed by network control station 7.

The location of a mobile unit 31–35 is measured via GPS (global positioning system). GPS satellites 41, 42 form a GPS. That is, radio waves sent from GPS satellites 41, 42 are received by a receiver mounted to a mobile unit 31–35, and based on the time difference of the sending time at the GPS satellites 41, 42 and the receiving time at the receiver, the pseudo-distance from the GPS satellites 41, 42 to the receiver is determined, and by making corrections thereto, the actual distance is computed, and the two-dimensional location of a receiver (a mobile unit 31–35) on the Earth is measured from this actual distance.

Computer input devices (mouse, trackball, keyboard and so forth) are provided on the terminals 11, 12 and the server terminals 21, 22, and, in addition, display devices, which constitute liquid crystals, CRT and the like, are provided. A display screen of this display device will be explained below.

Figure 2:
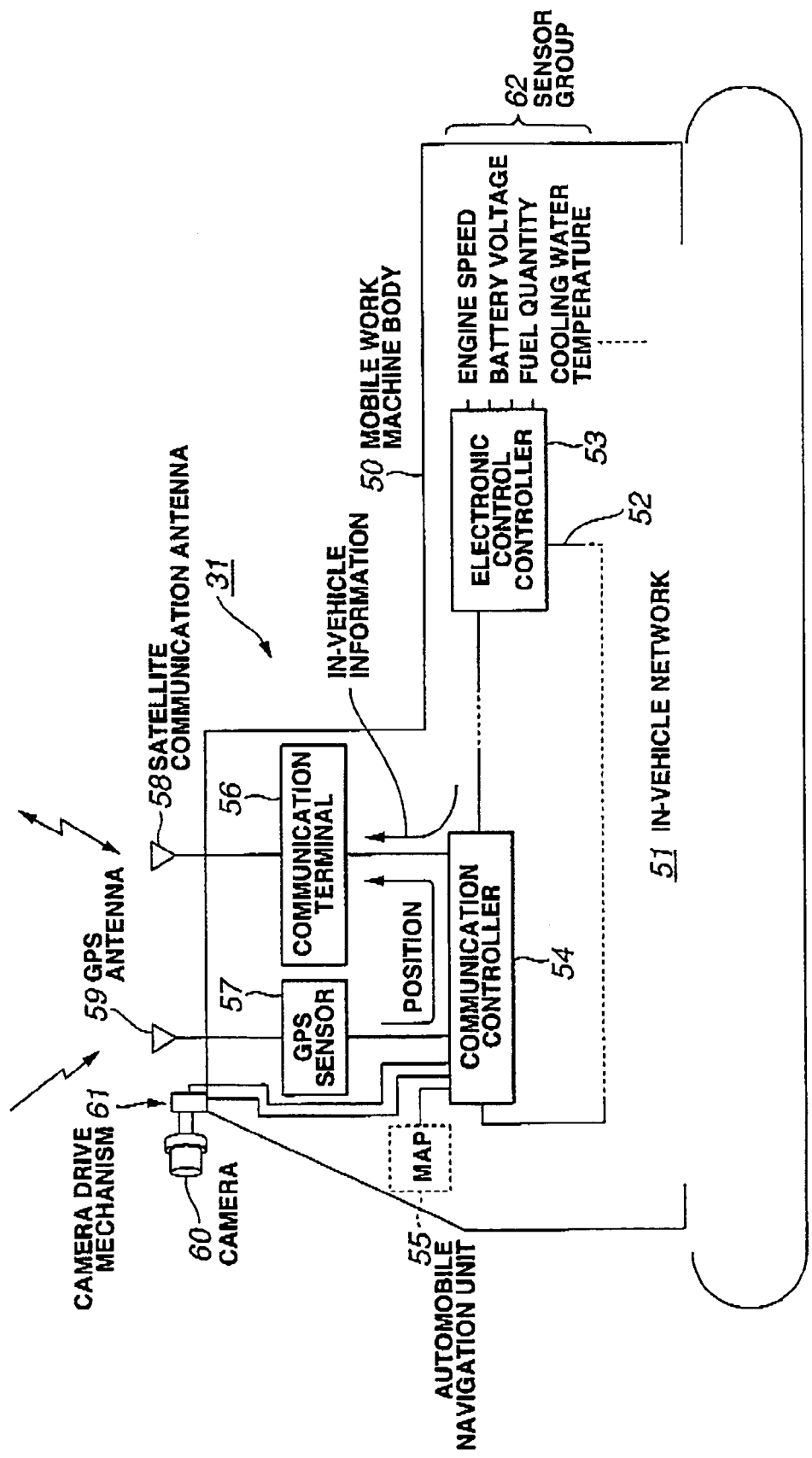
FIG. 2 is a diagram showing the constitution of the body of a mobile unit of an embodiment.

FIG. 2 is a block diagram showing the constitutions of mobile units 31–35. In FIG. 2, mobile work machine 31 is shown to represent them.

As shown in this FIG. 2, the inside of the vehicle body 50 of mobile work machine 31 is comprised of a satellite communication antenna 58 for sending and receiving data related to e-mail to and from communication satellite 9; a communication terminal 56 for processing the sending and receiving of e-mail to and from the communication satellite 9; a GPS antenna 59 for receiving radio waves sent from the GPS satellites 41, 42; a GPS sensor 57 for detecting the present location of mobile work machine 31 based on radio waves received from GPS satellites 41, 42; a camera 60, which is mounted in the upper portion of the cabin of the vehicle body 50, and which images the outside of the vehicle body 50; a camera drive mechanism 61 for driving the camera 60 and adjusting the imaging direction, zoom and so forth; a car navigation system 55; a communication controller 54, which is connected such that signals are transferred between the communication terminal 56, GPS sensor 57, camera 60, and car navigation system 55; and an electronic control controller 53 and various other such controllers provided in each portion of the inside of vehicle body 50. Furthermore, a car navigation system is a system for displaying the current location of the vehicle detected via a GPS sensor on a map of a display screen. The car navigation system 55 is provided in the service vehicle 34 and the mobile work machine transport vehicle 35. In this case, the car navigation system 55 functions as terminals 13, 14 on a par with terminal 11 and terminal 12. Thus, as will be explained below, on a display screen of the car navigation system 55, the location of the vehicle itself is displayed and, in addition, the mobile work machine location, which constitutes the place where work is to be performed, is displayed, and an efficient travel route to the work site is set.

Communication controller 54 is connected in daisy-chain fashion to electronic control controller 53 and the various other controllers via a signal wire 52 so as to enable serial communications, constituting an in-vehicle network 51.

That is, a frame signal of a predetermined protocol is transferred over signal wire 52. When a frame signal is transmitted to the respective controllers 53, 54 and the like, a drive signal is outputted to an actuator (hydraulic pump, governor, control valve, and the like) connected to the respective controllers 53, 54 and the like, and these actuators are driven and controlled in accordance with data described in the frame signal, and, in addition, detection data detected by a sensor connected to the respective controllers 53, 54 and the like, or data indicating information inside the machine is acquired and described in a frame signal.

A group of sensors 62 for detecting information related to a mobile unit, such as engine speed, battery voltage, fuel quantity, cooling water temperature, and abnormalities (error codes) (this is called mobile unit information), is connected to electronic control controller 53. Therefore, data related to mobile unit information detected by this group of sensors 62 is described in a frame signal, and sent to the communication controller 54 via the signal wire 52.

Location data detected by the GPS sensor 57 is captured to the communication controller 54, and, in addition, image data imaged by the camera 60 is captured. Further, the communication controller 54 generates a drive command for a camera drive mechanism 61, and operates the camera drive mechanism 61 and adjusts the imaging direction and zoom of the camera 60 by outputting this drive command to the camera drive mechanism 61. Location data of a mobile unit 31 detected by this GPS sensor 57 and image data of the outside of the vehicle body 50 acquired by the camera 60 is comprised in the above-mentioned "mobile unit information."

The communication terminal 56 performs processing for interpreting the content of e-mail received by satellite the communication antenna 58 from the terminals 11, 12, and thereafter, for preparing the content of a reply e-mail corresponding to the content of this request, and returning this e-mail.

That is, the mobile unit information detected by the sensor group 62 of the electronic control controller 53, and the mobile unit information detected by the GPS sensor 57 and imaged by the camera 60, are sent to the communication terminal 56 from the communication controller 54, and incorporated into a reply e-mail according to the content of the request of the e-mail that had been sent.

Further, display data corresponding to the content of the work instructions of the e-mail that had been sent is sent to the car navigation system 55 from the communication controller 54, and displayed on a display screen.

Now then, e-mail addresses specific to the terminals 11, 12 are assigned to these terminals 11, 12, respectively. Further, e-mail addresses, which specify the mobile units 31–35, are assigned to these mobile units 31–35, respectively.

In server terminal 21, the content of e-mail sent to these mobile units 31–35 from the terminals 11, 12 corresponding to the respective e-mail addresses of mobile units 31–35 is stored in the respective mailboxes. The server terminal (mail server) 21 searches the respective mailboxes of each of the mobile units 31–35, and sends data to the effect that it requests that the corresponding mobile units 31–35 come and pick up the e-mail inside their mailboxes. The mobile units 31–35, which receive this data, send data to the server terminal 21 to the effect that they will receive the e-mail inside the corresponding mailbox. As a result of this, e-mail is sent to the respective mobile units 31–35 from the server terminal 21.

Similarly, the content of e-mail sent back to the terminals 11, 12 from the mobile units 31–35 corresponding to the respective e-mail addresses of these terminals 11, 12 is stored in the respective mailboxes. The server terminal (mail server) 21 searches the respective mailboxes of each of the terminals 11, 12, and sends data to the effect that it requests that corresponding terminals 11, 12 come and pick up the e-mail inside their mailboxes. The terminals 11, 12, which receive this data, send data to the server terminal 21 to the effect that they will receive the e-mail inside the corresponding mailbox. As a result of this, e-mail is sent to the respective terminals 11, 12 from the server terminal 21.

A communication status information extraction program, which acquires information on the transmission status of e-mail sent to the respective mobile units 31–35 from the respective terminals 11, 12, and the reply status of e-mails sent back to the respective terminals 11, 12 from the respective mobile units 31–35, is stored in the server terminal 21. By executing this communication status information extraction program, communication status information data, which indicates current communication status information, is generated.

Further, a mobile unit information extraction program, which searches the respective mailboxes of each terminal 11, 12, and extracts mobile unit information from the content of e-mails sent back to the respective terminals 11, 12, is stored in the server terminal 21. By executing this mobile unit information extraction program, total mobile unit information MD, which indicates the latest information for all the mobile units, is generated. This total mobile unit information MD is data on content corresponding to the latest mobile unit information of each of the mobile units 31–35.

Here, a homepage for managing and monitoring the mobile units 31–35 is prepared on the server terminal 21, and stored in the database as prescribed link structure data. Respective homepage display screens are shown in FIG. 27 through FIG. 32. Furthermore, in this specification, a homepage is defined as a generic term for a series of linked pages that follow a first page.

A homepage update processing program, which updates data of a display screen corresponding to the homepage in accordance with the above-mentioned communication status information data and total mobile unit information MD, is stored in server terminal 21. By executing this homepage update processing program, mobile unit information of the display screen corresponding to the homepage is updated in accordance with the latest total mobile unit information MD stored in the server terminal 21, and, in addition, communication status information of the display page corresponding to the homepage is updated in accordance with the current communication status information stored in the server terminal 21. Furthermore, with regard to time sequence data (such as the fuel quantity time sequence data shown in FIG. 29), the latest data is added, and, in addition, the oldest data is deleted.

Next, the operation of this embodiment will be explained.

It is supposed that terminal 11 is a terminal installed on the side, for example, of the manager of the mobile units 31–35.

When a WWW browser is started up at this management side terminal 11, homepage data is read out from the server terminal 21 via the WWW browser, and displayed in a display screen of the display device of terminal 11.

Figure 27:
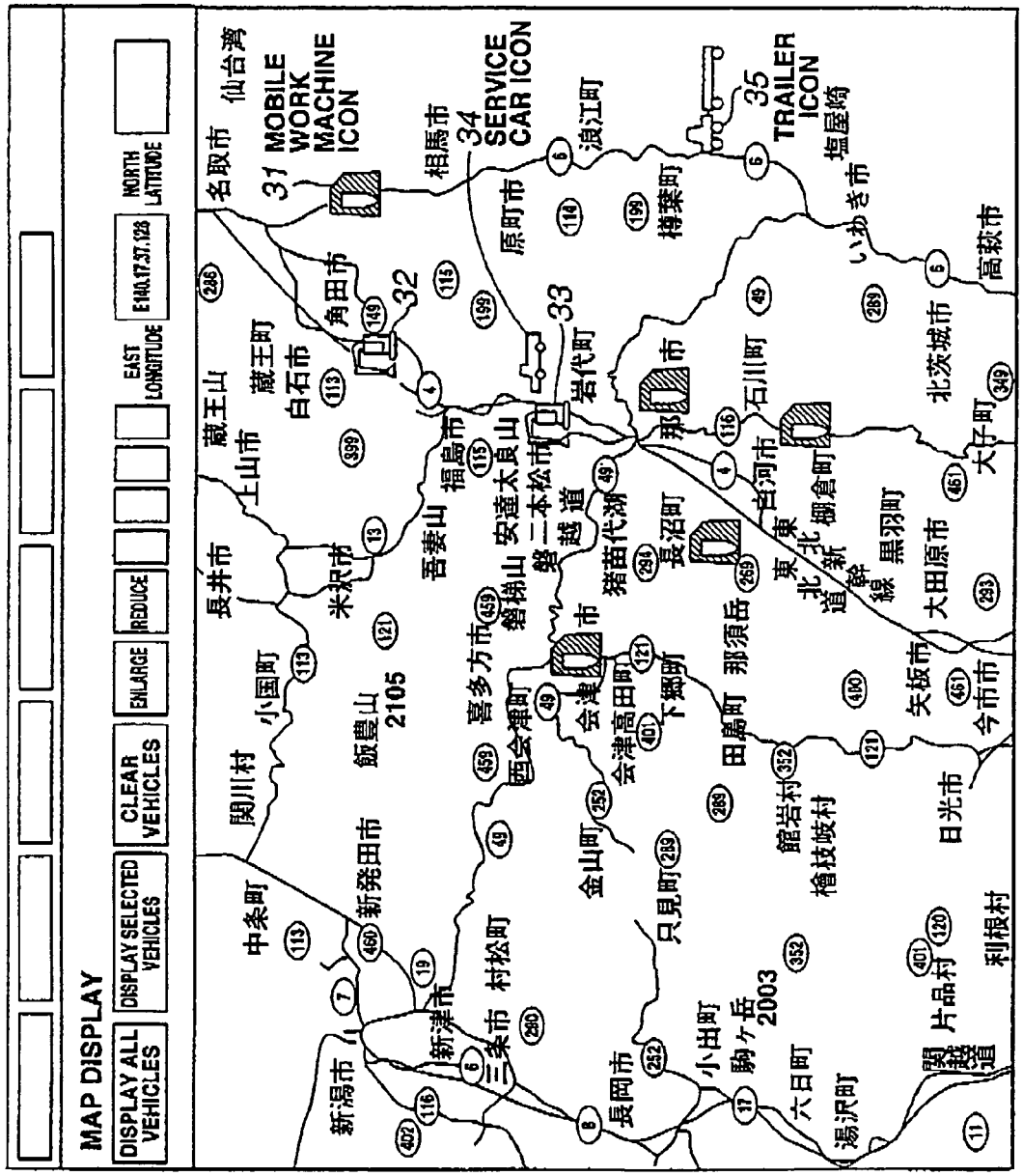
FIG. 27 is a diagram showing an example of a display on a terminal display screen.

FIG. 27 shows a map display screen of the homepage displayed on the display device of terminal 11. This map data is stored in the computer of terminal 11. As shown in FIG. 27, icons (pictographs), which specify the respective mobile units 31–35, are respectively superimposed and displayed on a map. Since the mobile units 31–35 are displayed as icons, the types of mobile units 31–35 (bulldozer, hydraulic excavator, wheel loader, trailer, service vehicle) can be easily distinguished on the screen. The location of an icon on the map corresponds to the latest mobile unit location detected by the GPS sensor 57 inside each of the mobile units 31–35 and stored in the database of the server terminal 21.

When an input operation (key operation, or click operation) for sequentially moving the homepage display screen to the next page is performed via an input device of terminal 11, it is possible to sequentially move from the current screen to the next display screen. In this case, by performing a click input operation on the icon of that mobile unit to be displayed (for example, mobile work machine 31) from among the icons of the respective mobile units 31–35 displayed on the display screen, it is possible to move to a display screen, which shows detailed information of only that mobile work machine 31 to be displayed.

For example, FIG. 31 is a display screen, which displays a table of information of all the mobile units 31–35.

Figure 28:
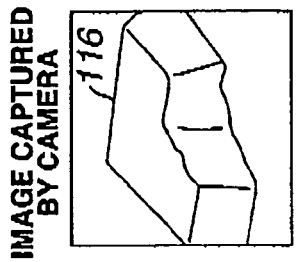
FIG. 28 is a diagram showing an example of a display on a terminal display screen.

When a click input operation is performed on the icon of a mobile unit (for example, mobile work machine 31), for which detailed information is to be displayed on the display screen shown in FIG. 31, the display moves to the display screen shown in FIG. 28, and the latest mobile unit information related to the specified mobile work machine 31 is displayed on the display screen. By doing the same thing from the map display screen of all the mobile units 31–35 shown in FIG. 27, it is also possible to move to a display screen, which shows the detailed mobile unit information of the specified mobile unit shown in FIG. 28.

FIG. 28 shows a screen for displaying the latest data of individual types of machine.

Figure 6:
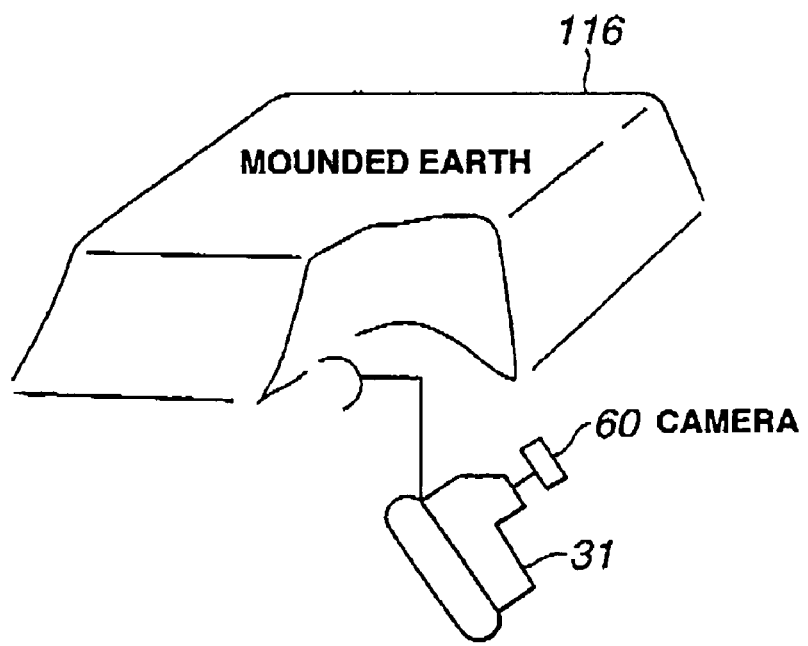
FIG. 6 is a diagram showing the circumstances under which a camera-equipped mobile unit is performing work.

As shown in this FIG. 28, mobile unit information, such as the current location, service meter values, fuel quantity, engine speed, engine cooling water temperature, battery voltage, hydraulic pump outlet pressure, oil quantity, abnormalities (error codes), and camera images of a specified mobile unit (for example, mobile work machine 31), is displayed. For example, when mobile work machine 31 is performing excavation work on a mound 116 as shown in FIG. 6, the excavation status of the mound 116 is imaged by the camera 60. As a result of this, as shown in FIG. 28, an image of this mound 116 is displayed on the display screen of terminal 11. Thus, it is possible to visually grasp the state of work progress of the remote mobile work machine 31 from terminal 11.

Figure 29:
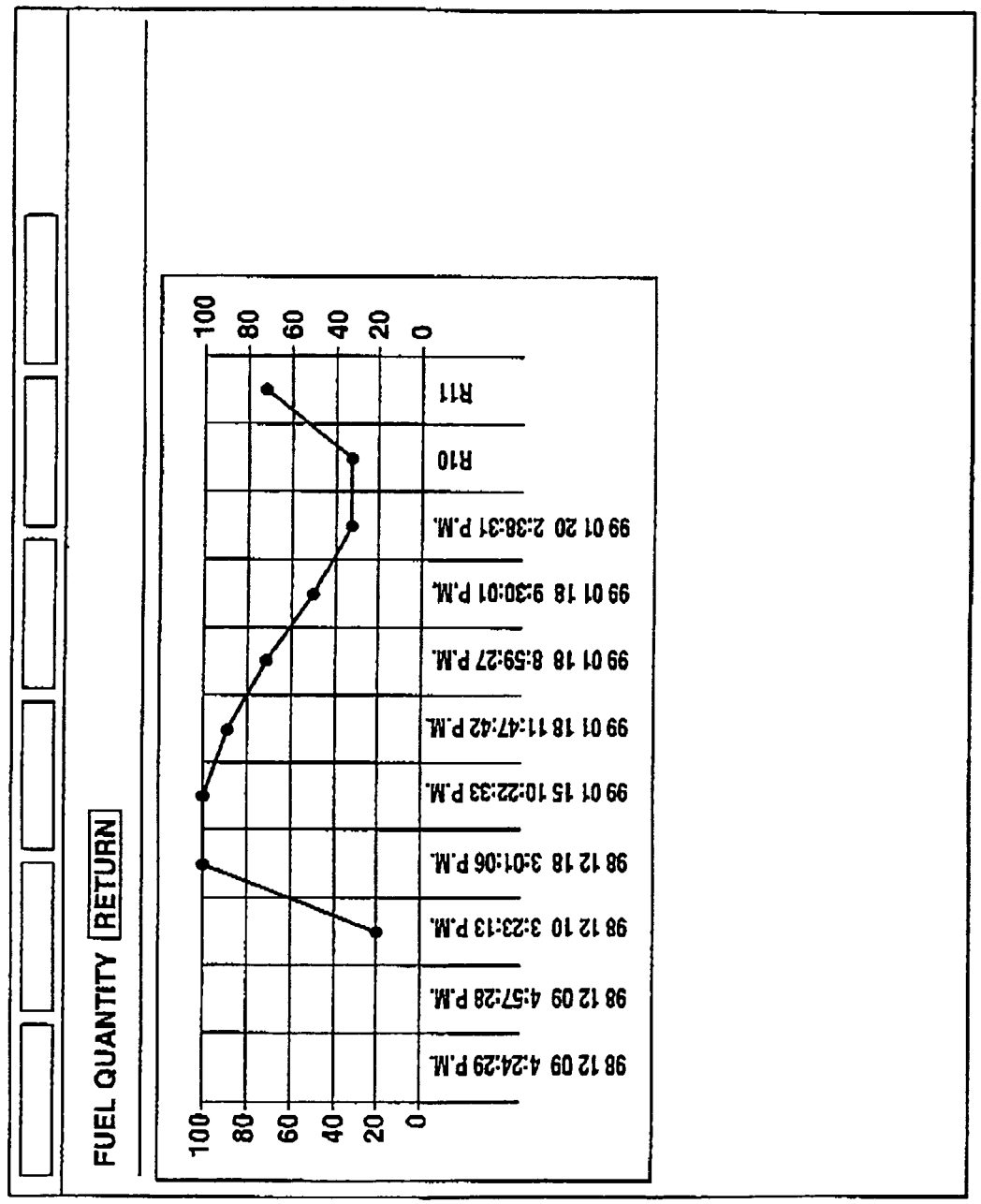
FIG. 29 is a diagram showing an example of a display on a terminal display screen.

When a click input operation is performed on a button for specified mobile unit information, for example, a fuel quantity "graph," for which time sequence data is to be displayed on the display screen shown in FIG. 28, the display moves to the display screen shown in FIG. 29, and a graph showing time-sequenced changes in fuel quantity is displayed on the display screen.

Figure 30:
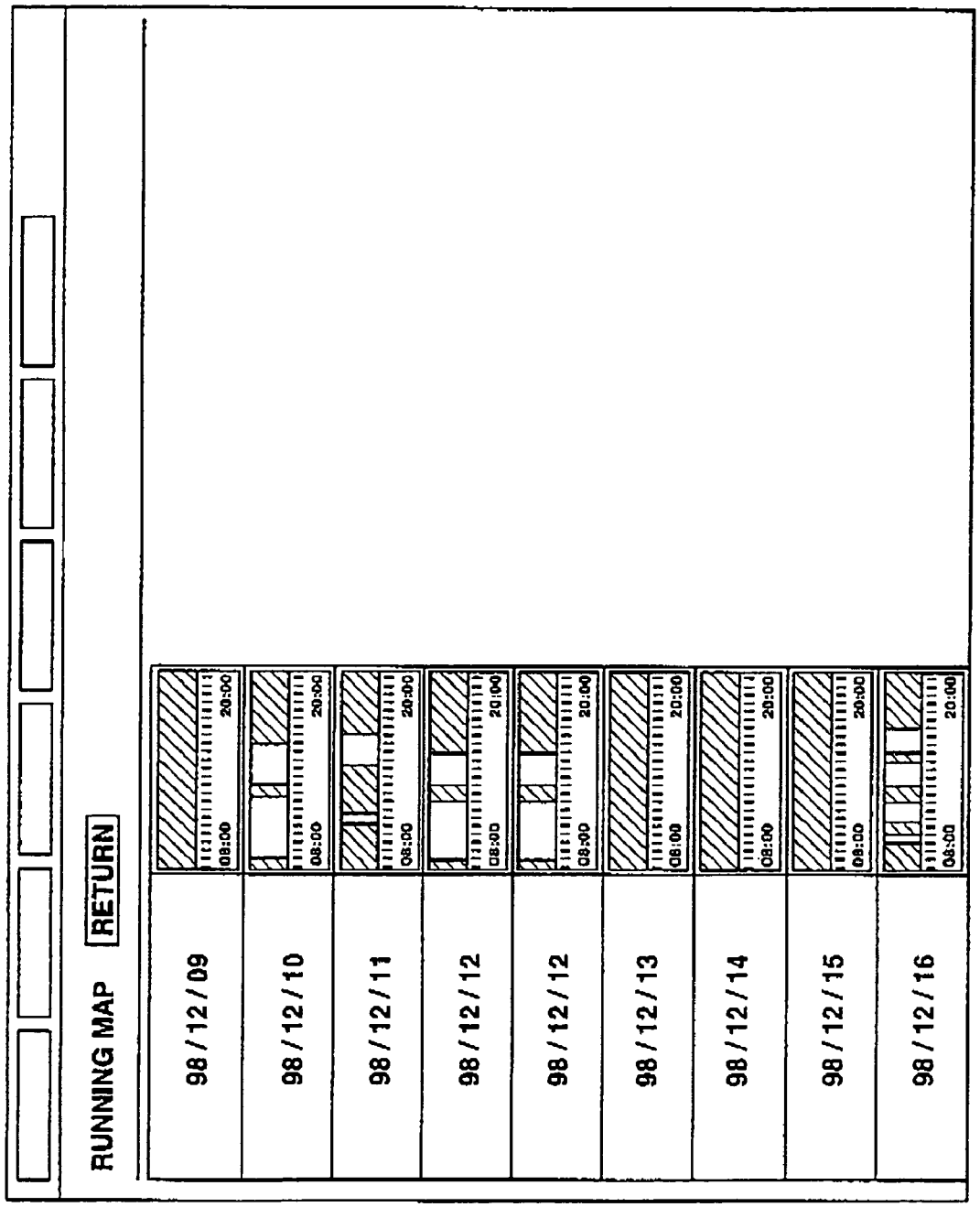
FIG. 30 is a diagram showing an example of a display on a terminal display screen.

Further, when a click input operation is performed on the operation map button on the display screen shown in FIG. 28, the display moves to the display screen shown in FIG. 30, and the daily operating time (engine operating time) of mobile work machine 31 is displayed as a band graph. Thus, the manager can easily comprehend the rate of operation (productivity) of the specified mobile work machine 31 from the operation map displayed in this FIG. 30.

Further, by doing the same thing, it is possible to display time-sequenced data of abnormalities (error codes), that is, a history of abnormal occurrences, of mobile work machine 31 on a display screen. Thus, it is possible to make a determination from a past history of abnormal occurrences, and to take appropriate measures relative to newly generated abnormalities. Further, since the content of abnormal occurrences can be accurately and rapidly recognized from the terminal 11 side, these abnormalities can be dealt with by a small number of people without having to dispatch expert technicians to the field.

Next, the content of processing when requesting the latest mobile unit information for a specified mobile unit from the homepage display screen of terminal 11 will be explained.

In this case, a click operation is performed on the icon of that mobile unit (for example, mobile work machine 31) for which the latest mobile unit information is being requested from among all the mobile units 31–35 on the display screen shown in either FIG. 31 or FIG. 27. In accordance therewith, request destination identification data D2 for the content of "mobile unit 31" is generated.

Next, by performing an input operation to switch display screens, the display screen switches to the request execution display screen shown in FIG. 32.

Then, out of the checkboxes indicating each item of the mobile unit information shown in FIG. 32, that is, "vehicle location," "service meter," "fuel quantity," "work mode," "vehicle warning 1 (error code 1)," "vehicle warning 2 (error code 2)," "battery voltage," "engine water temperature," "engine speed," "pump pressure," "oil quantity," and "camera images," a click operation is performed on the item to be requested. In accordance therewith, the mobile unit information to be requested (for example, "vehicle location," "fuel quantity") is selected from among all the mobile unit information of mobile work machine 31, and requested information identification data D3 for the content of "vehicle location" and "fuel quantity" are generated. Thus, mobile unit information basic to managing the rate of operation, such as vehicle location and service meter, can, of course, be requested via an input device of terminal 11, and mobile unit information required for maintenance and inspections, such as fuel quantity, and battery voltage, can also be arbitrarily selected and requested. Furthermore, with regard to the imaging direction and zoom of the camera 60 as well, the camera drive mechanism 61 can be operated and adjustments made by input operations at terminal 11.

However, the volume of data communications increases as the amount of data of the mobile unit information being requested becomes larger, increasing communication status costs. Accordingly, to inform a terminal 11 requester of communication status charges and make him aware of the economical efficiency, the amount of data to be sent and received is displayed at the stage when a mobile unit information item is selected. More specifically, in addition to "current number of bytes," numerical values for "number of bytes transmitted," "number of bytes received" and "number of bytes billed this month" are displayed. Furthermore, the communication status charges themselves can be displayed in place of the volume of communication status data.

Further, from among the respective checkboxes of each terminal of the reply destination terminals shown in FIG. 32, that is, "manager A (terminal 11)," "manager B," "service vehicle," and "trailer (terminal 12)," a click operation is performed on the terminal of the display destination, where mobile unit information is to be displayed. In accordance therewith, a display destination terminal (for example, terminal 12) is selected from among the respective terminals 11, 12 and so forth, and display destination identification data D4 for the content of "terminal 12" is generated. It is supposed that terminal 12 is a terminal provided at the operator side of mobile work machine transport vehicle (trailer) 35.

Figure 33:
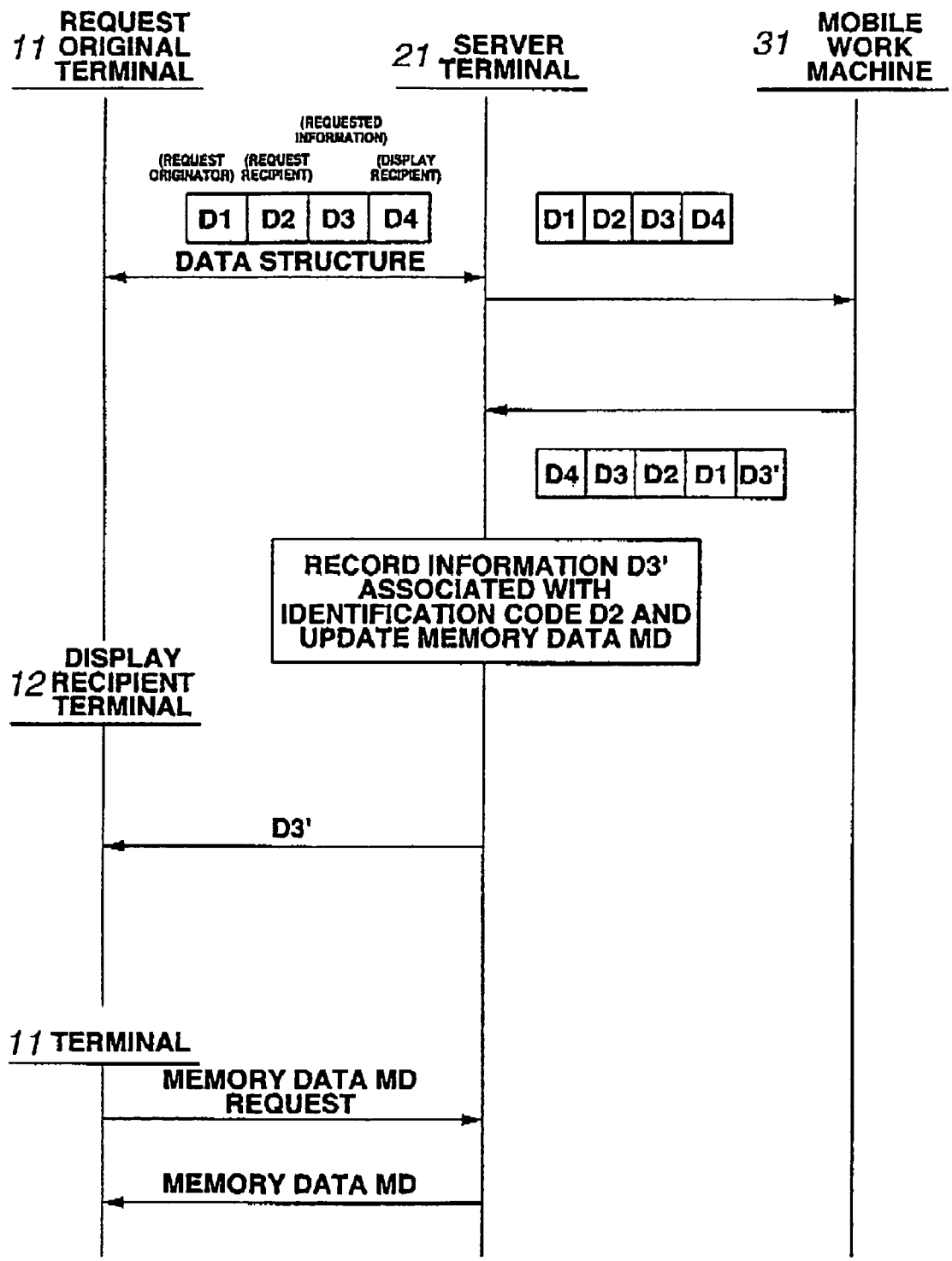
FIG. 33 is a sequence diagram showing the processing procedures of communication control of the embodiment.

FIG. 33 shows a sequence diagram of processing procedures for communication status control. Hereinbelow, an explanation will be given by referring to this figure.

When there is an input operation for the above-mentioned data by a request-origination terminal 11 to the server terminal 21, requester identification data D1 indicating the request-origination terminal (terminal 11), request destination identification data D2 indicating the mobile unit to which a request is being sent (mobile work machine 31), requested information identification data D3 indicating the content of the information being requested (vehicle location, fuel quantity), and display destination identification data D4 indicating the terminal on which the requested information is to be displayed (terminal 12) are sent to the server terminal 21 from terminal 11 as e-mail using a data structure conforming to a communication status protocol on the Internet 2. Here, requester identification data D1 ("terminal 11") corresponds to the e-mail address of request-origination terminal 11. Further, display destination identification data D4 ("terminal 12") corresponds to the e-mail address of display destination terminal 12. Further, request destination identification data D2 ("mobile work machine 31") corresponds to the e-mail address of the mobile work machine 31.

The server terminal 21 receives the sent e-mail, reads in the request destination identification data D2, and stores the content of the e-mail in the mailbox of the mobile work machine 31, which corresponds to this request destination identification data D2 ("mobile work machine 31").

The server terminal (mail server) 21 transmits data to mobile work machine 31 to the effect that it requests that mobile work machine 31 come to pick up the e-mail inside its mailbox. That is, a response-requested signal is sent via radio communication status channel 5 to mobile work machine 31 from the communication status satellite 9. The transmission of this response-requested signal to mobile work machine 31 from the communication status satellite 9 side is carried out continuously since often times it is not clear whether or not communication is possible, such as when mobile work machine 31 is in an environment, where communication status conditions are not good. In response thereto, confirmation of the existence of a response-requested signal is performed intermittently from the mobile work machine 31 side to the communication status satellite 9. Confirmation of the existence of a response-requested signal is performed by sensing a radio wave indicating that a response-requested signal has been sent from the communication status satellite 9. Therefore, a request can be reliably communicated from the communication status satellite 9 side to mobile work machine 31. The confirmation of the existence of this response-requested signal (sensing of a radio wave indicative of a response-requested signal) is performed either at the time at which a specific event occurs, or subsequent to the passage of a predetermined amount of time following the occurrence of a specific event.

For example, the starting up of the engine of mobile work machine 31 can be detected, and this detection signal can serve as the trigger for confirming the existence of a response-requested signal. In this case, confirmation of the existence of a response-requested signal can be performed only when the engine is initially started up each day.

Further, the occurrence of an abnormality in mobile work machine 31 can be detected, and this detection signal can serve as the trigger for confirming the existence of a response-requested signal.

Further, confirmation of the existence of a response-requested signal can be performed when a predetermined amount of time has passed following the carrying out of the last transmission by mobile work machine 31, and the next transmission can be performed.

Further, either the above-mentioned specific event or predetermined time can be arbitrarily altered. It may be constituted such that these items are changed by an input operation to an input device of terminal 11.

As a result of the above-mentioned confirmation of the existence of a response-requested signal, when a response-requested signal is deemed to exist, mobile work machine 31 sends to the server terminal 21 via the communication status satellite 9 data to the effect that it will take delivery of the e-mail inside its mailbox. As a result thereof, e-mail is sent to mobile work machine 31 from the server terminal 21.

That is, the e-mail is sent to network control station 7 via the Internet 2, and the e-mail data undergoes protocol conversion. Then, the protocol-converted e-mail if sent out over a leased line 3. And then the e-mail is sent to mobile work machine 31 via the satellite earth station 8, feeder line 4, communication status satellite 9, and radio communication status channel 5, and is received by the satellite communication status antenna 58 of mobile work machine 31.

The communication terminal 56 of mobile work machine 31 reads in the requested information identification data D3 ("vehicle location," "fuel quantity") from the e-mail received via the satellite communication status antenna 58, and instructs the communication status controller 54 to acquire mobile unit information corresponding to this requested information identification data D3, in other words, vehicle location data and fuel quantity data, from inside this mobile work machine 31.

In response to this, the communication status controller 54 sends vehicle location data, which is currently being detected by the GPS sensor 57, to the communication terminal 56. Further, data to the effect that "fuel quantity" should be acquired by the electronic control controller 53 is described in a frame signal and sent out over the signal wire 52. The electronic control controller 53 reads in the description content of the frame signal, collects detection data on the current fuel quantity from the sensor group 62 of this electronic control controller 53, and describes same in a frame signal. Then, this frame signal is sent to the communication status controller 54 via the signal wire 52. The communication status controller 54 reads out the fuel quantity data described in the frame signal, and sends same to the communication terminal 56. As a result of this, the communication terminal 56 incorporates the vehicle location data and fuel quantity data into a reply e-mail as mobile unit information D3'.

Reply originator identification data D2 (mobile work machine 31) indicating the mobile unit from which the reply originated, reply destination identification data D4 (terminal 12) indicating the terminal to which the reply is sent, and mobile unit information D3' (vehicle location data and fuel quantity data) indicating the mobile unit information is sent from the communication terminal 56 via the satellite communication status antenna 58 to the communication status satellite 9 as a reply e-mail using a data structure that conforms to a prescribed communication status protocol. Furthermore, D1 and D3 are sent simultaneously. D1 can be used as a distribution key for each communication status charge billing destination. Further, D3 is used in identifying the content of D3'. Here, reply originator identification data D2 ("mobile work machine 31") corresponds to the e-mail address of mobile work machine 31. Further, reply destination identification data D4 ("terminal 12") corresponds to the e-mail address of the display destination terminal 12.

The reply e-mail is received by the communication status satellite 9, and then sent to the network control station 7 via the feeder line 4, satellite earth station 8 and leased line 3. The data of the reply e-mail undergoes protocol conversion at this network control station 7, and the protocol-converted reply e-mail is sent out over the Internet 2.

The server terminal 21 receives the sent e-mail, reads in the reply destination identification data D4, and stores the content of the e-mail in the mailbox of the terminal 12, which corresponds to this reply destination identification data D4 ("terminal 12").

Furthermore, the above-mentioned mobile unit information extraction program is executed, mobile unit information D3' ("vehicle location data," and "fuel quantity data") is extracted from the content of the e-mail stored in the terminal 12 mailbox, and, in addition, reply originator identification data D2 ("mobile work machine 31") is extracted, and the latest vehicle location data and fuel quantity data are stored correspondent to the address of mobile work machine 31. In this manner, the contents of the total mobile unit information are updated.

The server terminal (mail server) 21 sends to terminal 12 data to the effect that it requests that terminal 12 come pick up the e-mail in its mailbox. In response to this, terminal 12 sends to the server terminal 21 data to the effect that it will take delivery of the e-mail in its mailbox. As a result of this, the e-mail is sent from the server terminal 21 to terminal 12. The data to be sent can be limited by the security layer of D4.

When the e-mail is received by operator-side terminal 12 of the mobile work machine transport vehicle 35, reply originator data D2 (mobile work machine 31) and mobile unit information D3' (vehicle location data and fuel quantity data) are read out from the data of the e-mail. When this happens, the content of the e-mail, that is, the current location and current fuel quantity of mobile work machine 31, are displayed on a display screen of terminal 12.

Thus, the operator of transport vehicle 35 can perceive from the display screen of terminal 12 the specific type of mobile work machine 31 about which transportation instructions have been issued by the management side, and, in addition, can also perceive the current location and current fuel quantity, which are required for transporting this mobile work machine 31. Moreover, for the operator of the side of terminal 12, it is possible to obtain from the terminal 12 display screen only that information required for work without having to perform an information request input operation. In other words, an operator, who wants to obtain information, can obtain information required for work even under conditions in which it is not possible to perform an input operation via terminal 12. Thus, the work of transporting mobile work machine 31 can be carried out extremely efficiently.

Furthermore, the embodiment described hereinabove is constituted such that information needed for transportation is displayed on operator-side terminal 12 of the transport vehicle 35 by a request input operation performed at the management-side terminal 11, but there is also the possibility of an embodiment, such that information required for services, like maintenance and inspections, is displayed on the terminal 12 of the side of a serviceman, who is driving a service vehicle 34, by a request input operation performed at the management-side terminal 11.

In this case, similarly, an email, which treats the current location data, service meter and abnormal data of mobile work machine 31 as mobile unit information, is sent from the management-side terminal 11 to the terminal 12 of the serviceman side via the mobile work machine 31.

When the e-mail is received by the serviceman-side terminal 12, reply originator data D2 (mobile work machine 31) and mobile unit information D3' (vehicle location data and abnormal data (error code)) are read out from the data of the e-mail. When this happens, the content of the e-mail, that is, the current location and current abnormal occurrence item (error code) of mobile work machine 31, are displayed on the display screen of the terminal 12.

Thus, the serviceman driving the service vehicle 34 can perceive from the display screen of the terminal 12 the specific type of mobile work machine 31 about which service instructions have been issued by the management side, and, in addition, can also perceive the current vehicle location and current abnormal occurrence item (error code), which are required for servicing this mobile work machine 31. Moreover, for the serviceman of the side of terminal 12, it is possible to obtain from the terminal 12 display screen only that information required for work without having to perform an information request input operation. In other words, a serviceman, who wants to obtain information, can obtain information required for work even under conditions in which it is not possible to perform an input operation via terminal 12. Thus, the work of providing maintenance and inspection of the mobile work machine 31 can be carried out extremely efficiently.

Next, it is supposed that the terminal of the management side is server terminal 21.

In this case, by performing a request input operation via the terminal 12 of the side of a serviceman, who is driving a service vehicle 34, it is possible to display information required for the centralized management of a plurality of mobile units on the management-side server terminal 21. For example, when a serviceman supplies oil to mobile work machine 31, since the on-site serviceman himself is cognizant of the fact that sufficient oil has been supplied, there is no need for him to confirm this fact all over again via the terminal 12 display screen. On the other hand, it is necessary to provide information to the management side as to the fact that oil supply work has been completed, and for managing the next oil supply period.

Similarly, in this case, too, an email, which treats the current oil quantity data of mobile work machine 31 as mobile unit information, is sent from serviceman-side terminal 12 to server terminal 21 via mobile work machine 31.

When the e-mail is received by server terminal 21, reply originator data D2 (mobile work machine 31) and mobile unit information D3' (oil quantity data) are read out from the data of the e-mail. When this happens, the content of the e-mail, that is, the current oil quantity of mobile work machine 31, are displayed on the display screen of server terminal 21.

Thus, the manager can perceive from the display screen of server terminal 21 the specific type of mobile work machine 31 for which an oil supply service has been completed, and, in addition, can also perceive the current oil quantity, which is required for managing this mobile work machine 31. Moreover, for the manager of the side of server terminal 21, it is possible to obtain from the server terminal 21 display screen only that information required for management without having to perform an information request input operation. In other words, a manager, who wants to obtain information, can obtain information required for managing a mobile unit even under conditions in which it is not possible to perform an input operation via the server terminal 21 side. Thus, the work of centrally managing mobile work machine 31–35 can be carried out extremely efficiently.

In the embodiment described hereinabove, the terminal of the request originator and the terminal of the display destination are different, but the terminal of the request originator and the terminal of the display destination can be the same.

For example, by performing a request input operation via the operator-side terminal 11 of mobile work machine 31, it is possible to display information required for start-up inspection on the same screen. The operator of mobile work machine 31 performs the above-mentioned request input operation via terminal 11 inside the office before getting into the vehicle.

Similarly, in this case, too, an email, which treats the current fuel quantity and the current oil quantity data of mobile work machine 31 as mobile unit information, is sent from terminal 11 to terminal 11 via mobile work machine 31.

When the e-mail is received by terminal 11, reply originator data D2 (mobile work machine 31) and mobile unit information D3' (fuel quantity data, and oil quantity data) are read out from the data of the e-mail. When this happens, the content of the e-mail, that is, the current fuel quantity and current oil quantity of mobile work machine 31, are displayed on the display screen of terminal 11.

Thus, the mobile work machine operator can perceive from the terminal 11 display screen the current fuel quantity and oil quantity required for a start-up inspection of the specified type of mobile work machine 31, which he is about to get into. In this case, for the operator of the side of terminal 11, it is possible to obtain beforehand from the display screen of terminal 11 only that information necessary for a start-up inspection without having to actually go to mobile work machine 31. Thus, a start-up inspection of mobile work machine 31 can be performed easily and efficiently, and any inadequacies discovered via the start-up inspection can be dealt with in advance.

Similarly, by performing a request input operation via operator-side terminal 11 of mobile work machine transport vehicle 35, it is possible to display information required for transportation work on the same terminal 11. Thus, the operator of mobile work machine transport vehicle 35 can perceive from the display screen of terminal 11 the mobile unit information (current location, current fuel quantity, etc) required to transport the specific type of mobile work machine 31, which he intends to transport. In this case, for the operator of the side of terminal 11, it is possible to obtain beforehand from the terminal 11 display screen only that information necessary for transport work without having to actually go to mobile work machine 31. Thus, the job of transporting mobile work machine 31 can be performed easily and efficiently, and any inadequacies can be dealt with in advance.

Similarly, by performing a request input operation via the serviceman-side terminal 11 of service vehicle 34, it is possible to display information required for services, such as maintenance and inspection, on the same terminal 11. Thus the serviceman of service vehicle 34 can perceive from the display screen of terminal 11 the mobile unit information (current location, abnormal occurrences, service meter) required to service the specific type of mobile work machine 31, which he intends to service. In this case, for the serviceman of the side of terminal 11, it is possible to obtain beforehand from the terminal 11 display screen only that information necessary for providing services without having to actually go to mobile work machine 31. Thus, the servicing of mobile work machine 31 can be performed easily and efficiently, and any inadequacies can be dealt with in advance. In other words, the serviceman can recognize an abnormal state before actually proceeding to mobile work machine 31, and can efficiently arrange for parts, call on support personnel for help and research repair methods.

Further, according to this embodiment, it is possible to achieve an effect such that the latest total mobile unit information MD related to a plurality of mobile units 31–35, updated by request input operations from a plurality of terminals 11, 12, and so forth, can be displayed on an arbitrary terminal (for example, terminal 11). This will be explained once again by referring to FIG. 33.

That is, when a reply e-mail is sent from mobile work machine 31 to the server terminal 21 as described hereinabove, the mobile unit information extraction program is executed by the server terminal 21, and mobile unit information D3' ("vehicle location data," "fuel quantity data") is extracted from the content of the e-mail stored in the mailbox of the display terminal 12, and, in addition, reply originator identification data D2 ("mobile work machine 31") is extracted, and the latest vehicle location data and fuel quantity data are stored correspondent to the email address of the mobile work machine 31. In accordance therewith, the content of total mobile unit information MD is updated. In addition, the above-mentioned homepage updating program is executed on the server terminal 21, and mobile unit information of a display screen corresponding to the homepage is updated in accordance with the latest total mobile unit information MD stored in the server terminal 21. With regard to time sequence data (such as the fuel quantity time sequence data shown in FIG. 29), the latest data is added, and, in addition, the oldest data is deleted.

Accordingly, when a WWW browser is started up on terminal 11, updated homepage data is read out from the server terminal 21 via the WWW browser. As a result of this, mobile unit information updated by the latest total mobile unit information MD is displayed on the display screen of the terminal 11 display device. In other words, when there is an input operation from the terminal 11 requesting the server terminal 21 for the latest total mobile unit information MD, the latest total mobile unit information MD is displayed on the display screen of the terminal 11.

Now, it is supposed that the display shown in FIG. 27 is being displayed at terminal 11.

When this happens, the icon of a mobile work machine 31 on the map shown in FIG. 27 is displayed by being switched to a location on the map corresponding to the latest (current) vehicle location data.

Further, when the display switches to the display screen shown in FIG. 28, the numerical values for "location data" and the numerical values for "fuel quantity" on the screen are displayed by being switched to the latest (current) numerical values for vehicle location data and numerical values for fuel quantity data, respectively. Further, when the display switches to the display screens shown either in FIG. 29 or FIG. 30, either a graph of changes in fuel quantity over time or an operation map are displayed by being converted to the latest one.

As described hereinabove, according to this embodiment, it is possible to display the latest total mobile unit information MD related to a plurality of mobile units 31–35, updated in accordance with request input operations from a plurality of terminals 11, 12 and so forth, on the display screen of an arbitrary terminal 11. Thus, there is achieved an effect whereby the latest mobile unit information for a plurality of mobile work machine 31–35 can be acquired via an arbitrary terminal, enabling the management and monitoring of all mobile units. That is, it becomes possible to centrally manage via an arbitrary terminal the latest mobile unit information related to a plurality of mobile work machine 31–35, requested by a plurality of requesters.

In this embodiment, databases are provided in each of server terminals 21, 22, and total mobile unit information MD is stored separately. Accordingly, by transmitting the stored data (total mobile unit information MD) of the database of the server terminal of the one side to the database of the other server terminal, it is possible to make shared use of total mobile unit information via the other server terminal database as well, and the stored content (total mobile unit information MD) of the databases of the respective server terminals can be made the same content. More specifically, this is achieved by a method, wherein e-mail (describing mobile unit information) sent back to the server terminal of the one side is automatically transmitted to the other server.

Now then, as mentioned above, a terminal 13 equivalent to terminal 11 and terminal 12 is mounted in the service vehicle 34, and the functions of the car navigation system 55 are incorporated into this terminal 13 and operated.

An embodiment, wherein work instructions are provided to a serviceman by sending work instruction data from the management-side terminal 11 to terminal 13 disposed in the service vehicle 34, will be explained hereinbelow. Servicemen often perform repairs, parts replacement and inspection work in the field, and have few opportunities to communicate directly with a manager. If the system of this embodiment is put to use, it is possible to receive work instructions efficiently since no limitations are placed on the time and place for receiving work instructions.

E-mail, which treats terminal 13 mounted in the service vehicle 34 as the display destination terminal (display destination identification data D4), and mobile work machine 31 as the request destination mobile unit (request destination identification data D2), and to which the respective data of a message stating "Failure E occurred, rush to site," is added, is sent from the management-side terminal 11 via the same operation as was explained in FIG. 33. Here, the message data stating "Failure E occurred, rush to site" is added to the e-mail by performing an input operation via a terminal 11 input device.

Figure 3:
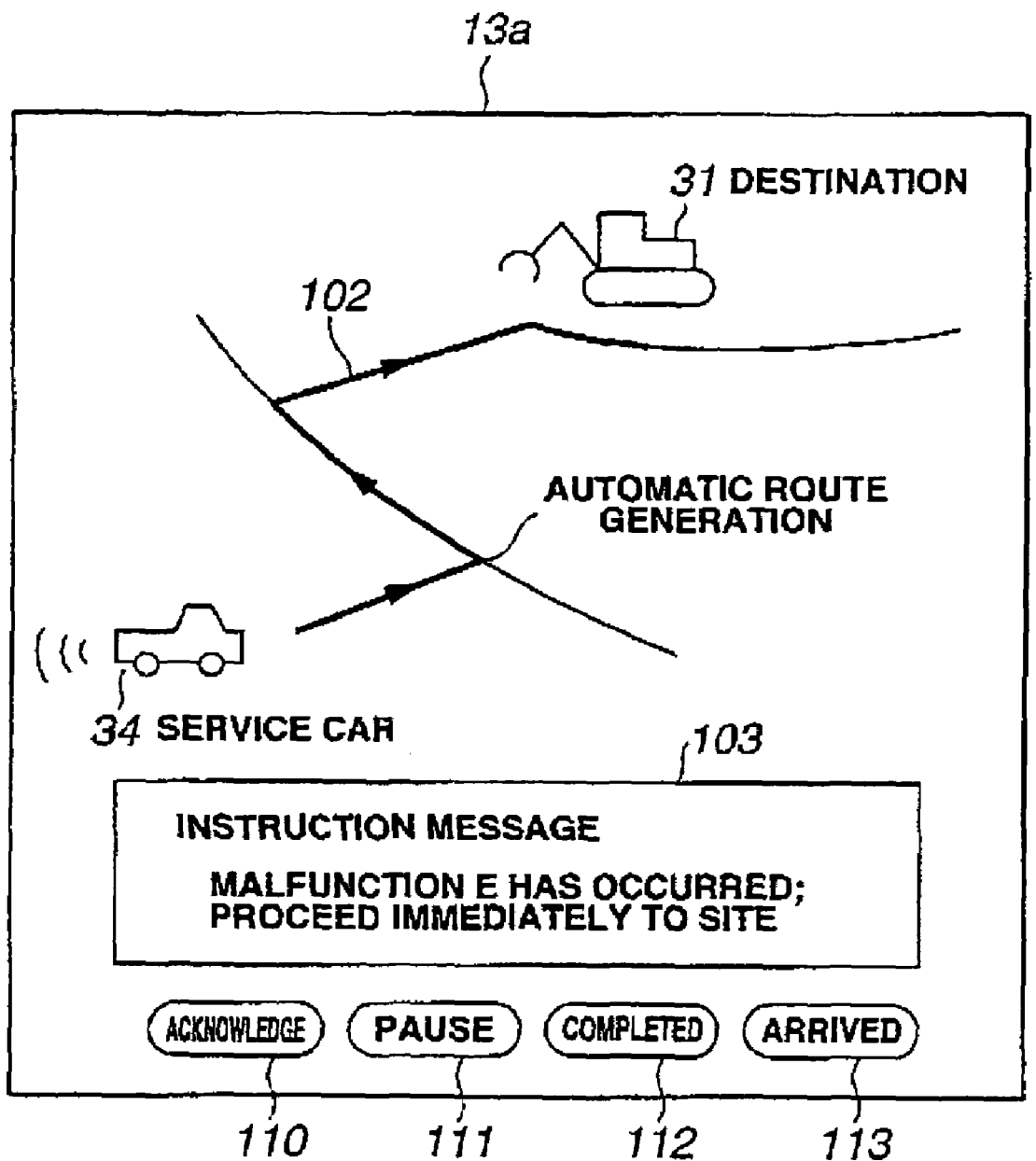
FIG. 3 is a diagram showing an example of a screen display of a display device mounted on a mobile unit.

Thus, as shown in FIG. 3, on the display screen 13*a* of service vehicle 34 terminal 13, which is the display destination terminal, the icon of a mobile work machine 31, which is the unit to be serviced, is displayed in the latest (current) location on the map, and, in addition, the icon of the service vehicle 34 itself is displayed in the current location on the map. Furthermore, the current location of the vehicle 34 itself is detected by the GPS sensor 57, which is mounted in the vehicle 34 itself, and displayed on screen 13*a*. In addition, in the message portion 103 of the display screen of terminal 13, the message ("Instruction message: Failure E occurred, rush to site") sent in the e-mail is displayed.

In accordance therewith, the serviceman riding in the service vehicle 34 can perceive from display screen 13*a* the fact that his next unit to be serviced (destination) is mobile work machine 31, and a message related to the current location and the job details thereof. Further, an automatic route generation program is stored in terminal 13. With this automatic route generation program, when the current location of the service vehicle 34 and the destination (current location of mobile work machine 31) are provided, processing for automatically generating the shortest travel route on the map is performed. Therefore, when this automatic route generation program is executed, the shortest travel route 102 from the current location of the service vehicle 34 to the current location of mobile work machine 31, which is the destination, is displayed on display screen 13*a* of terminal 13.

Consequently, it is possible for the serviceman to move service vehicle 34 and perform work at the destination in accordance with display screen 13*a* of terminal 13.

If it is possible to perform work according to the content of the work instructions, a click operation is performed on button 110 indicating "OK" on display screen 13*a*. Further, when the service vehicle 34 arrives at the destination, and work is started, a click operation is performed on button 113 indicating "Arrival" on display screen 13*a*. Further, when service work on mobile work machine 31 has been completed, a click operation is performed on button 112 indicating "Finished" on display screen 13a. Further, when work according to the content of the work instructions cannot be undertaken for some reason, a click operation is performed on button 111 indicating "Suspended" on display screen 13a. The content of input operations resulting from these click operations on terminal 13 is sent to the management-side terminal 11 from terminal 13 via e-mail. By receiving this e-mail at terminal 11, it is possible to comprehend the state of work progress of service vehicle 34. Furthermore, in addition to touch operations, such as click operations, key operations, and touch-panel operations, input operations can also make use of voice input operations.

In this manner, maintenance, inspection and other servicing is carried out extremely efficiently. According to this embodiment in particular, since the latest location of mobile work machine 31 is displayed on screen 13a, a serviceman can reliably move his own vehicle 34 without losing sight of the target even when the unit to be serviced 31 is moving around within the work area.

In the above-described embodiment, the constitution is such that e-mail, which makes terminal 13 of the service vehicle 34 the display destination terminal, is sent from the management-side terminal 11, and the content shown in FIG. 3 is displayed on terminal 13, but it is possible for the content of FIG. 3 to be displayed on terminal 13 by procedures like those hereinbelow. That is, 1) Management-side terminal 11 sends e-mail, which treats its own terminal 11 as the display destination terminal (display destination identification data D4), and treats mobile work machine 31 as the request destination mobile unit (request destination identification data D2). In accordance therewith, the latest location of mobile work machine 31 is acquired by terminal 11.

2) Terminal 11 sends to terminal 13 e-mail, which has as work instruction data the above-obtained current location of mobile work machine 31, and a message stating "Failure E occurred, rush to site."

Further, it is also possible for the content of FIG. 3 to be displayed on terminal 13 by procedures like those hereinbelow. That is, 1) Terminal 11 sends to terminal 13 e-mail message data stating "Failure E occurred, rush to site."

2) Terminal 13 starts up a WWW browser, and reads out updated homepage data from the server terminal 21 via the WWW browser. Thus, the latest location of mobile work machine 31 is displayed on a display screen of terminal 13 as the latest total mobile unit information MD.

Now then, the mobile unit location and the content of work instructions data indicating the job details sent from the management-side terminal 11 are arbitrary. For example, as the details of a job, a full day's worth of job details can be specified. Here, by the management-side terminal 11 requesting the server terminal 21 for an operation map (FIG. 30) for service vehicle 34, it is possible to comprehend the daily rate of operation of service vehicle 34. Accordingly, by collating this daily rate of operation against a day's worth of job details directed to service vehicle 34 from the management side, it is possible to automatically and accurately prepare a daily work report.

Further, not only the location of a unit to be serviced (location of mobile work machine 31) is sent from the management-side terminal 11 to terminal 13 of the service vehicle 34, but rather, the location of another service vehicle 34' can be sent as well. In accordance therewith, since the location of another service vehicle 34' is displayed on display screen 13a of service vehicle 34 terminal 13, traveling to and communicating with this service vehicle 34' is made easier, and service work can be performed even more efficiently. That is, it becomes possible to borrow tools, replacement parts, and the like from the other serviceman, and it also becomes possible to request assistance. Further, if it is an experienced serviceman, it is also possible to seek his advice.

Further, in the above-described embodiment, data on the location of a single mobile work machine 31 is sent to terminal 13 of the service vehicle 34 from the management-side terminal 11, but an embodiment, which is constituted so as to send the locations of a plurality of mobile work machine 31A, 31B, 31C, 31D, and which causes a service patrol of a plurality of mobile work machine 31A–31D to be carried out efficiently, is also possible.

In this case, work instructions data containing the current locations of a plurality of mobile work machine 31A–31D, and the service meter increment values ("3 H," "678 H," "10 H," and "500 H") of each mobile work machine 31A–31D from the last patrol until the present are sent to terminal 13 of the service vehicle 34.

Figure 5:
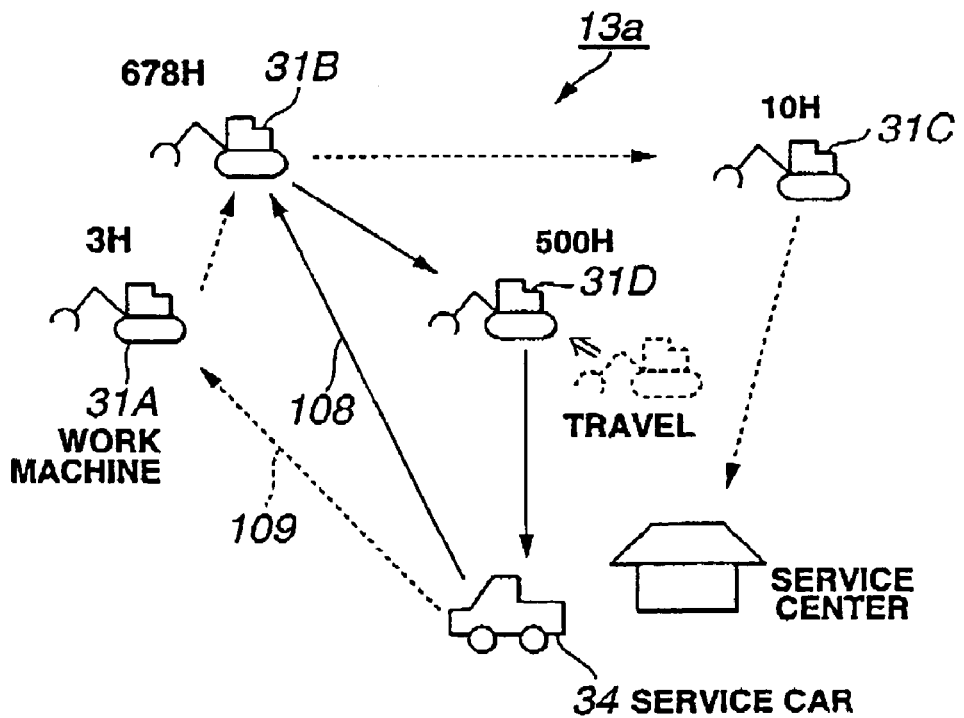
FIG. 5 is a diagram showing an example of a screen display of a display device mounted on a mobile unit.

In accordance therewith, on display screen 13a of service vehicle 34 terminal 13, the icons of the respective mobile work machine 31A–31D are displayed in their current locations on a map as shown in FIG. 5, and, in addition, the service meter increment values of the respective mobile work machine 31A–31D are displayed. Here, even when mobile work machine 31D has moved relative to its last location (indicated by dotted lines), its current location (indicated by solid line) is displayed on the map of screen 13a.

Further, an automatic patrol route generation program is stored in terminal 13. With this automatic patrol route generation program, when the current location of the service vehicle 34 itself, and a plurality of candidate sites for patrol (mobile work machine 31A–31D) are provided, processing for selecting only those patrol candidate sites having service meter increment values larger than the setting value, and for automatically generating the most efficient patrol travel route for passing through these selected patrol candidate sites is performed. Accordingly, when this automatic route generation program is executed, a patrol travel route 108, which is indicated by solid lines going from the current location of the service vehicle 34 itself to the mobile work machine 31B, 31D, which have large service meter increment values ("678 H," "500 H"), and returning once again to the vehicle 34 itself, is displayed on display screen 13a of terminal 13.

Accordingly, it is possible for a serviceman to perform a service patrol extremely efficiently by moving service vehicle 34 along the patrol travel route 108 indicated by solid lines, and performing work at each patrol site in accordance with display screen 13a of terminal 13. That is, in the past, if a fixed time had elapsed since the last service patrol, indicated by the dotted line in FIG. 5, patrol route 109, which goes to all the mobile work machine 31A–31B, was set indiscriminately, and work was performed on all the vehicles. By contrast, according to this embodiment, since work is performed by virtue of a patrol travel route 108, which avoids mobile work machine 31A, 31C, the operating hours for which have not increased since the last service patrol (service meter increment values "3 H" and "10 H"), futile work can be avoided.

Furthermore, the patrol travel route 108, indicated by solid lines in FIG. 5, need not be generated automatically, but rather, can be set according to the judgment of a serviceman.

Further, in the above-described embodiment, work instructions data is sent from the management-side terminal 11 to terminal 13 mounted in the service vehicle 34, but an embodiment, which causes transport loading work to be performed efficiently by sending work instructions data from the management-side terminal 11 to terminal 14 mounted in the mobile work machine transport vehicle 35, is also possible.

In this case, e-mail comprising the respective data of the current location of mobile work machine 31, which is at the loading site, the location of the off-loading site 106, where the loaded vehicle will be off-loaded, and a message stating "Return When Finished" is sent to terminal 14 of the mobile work machine transport vehicle 35.

Figure 4:
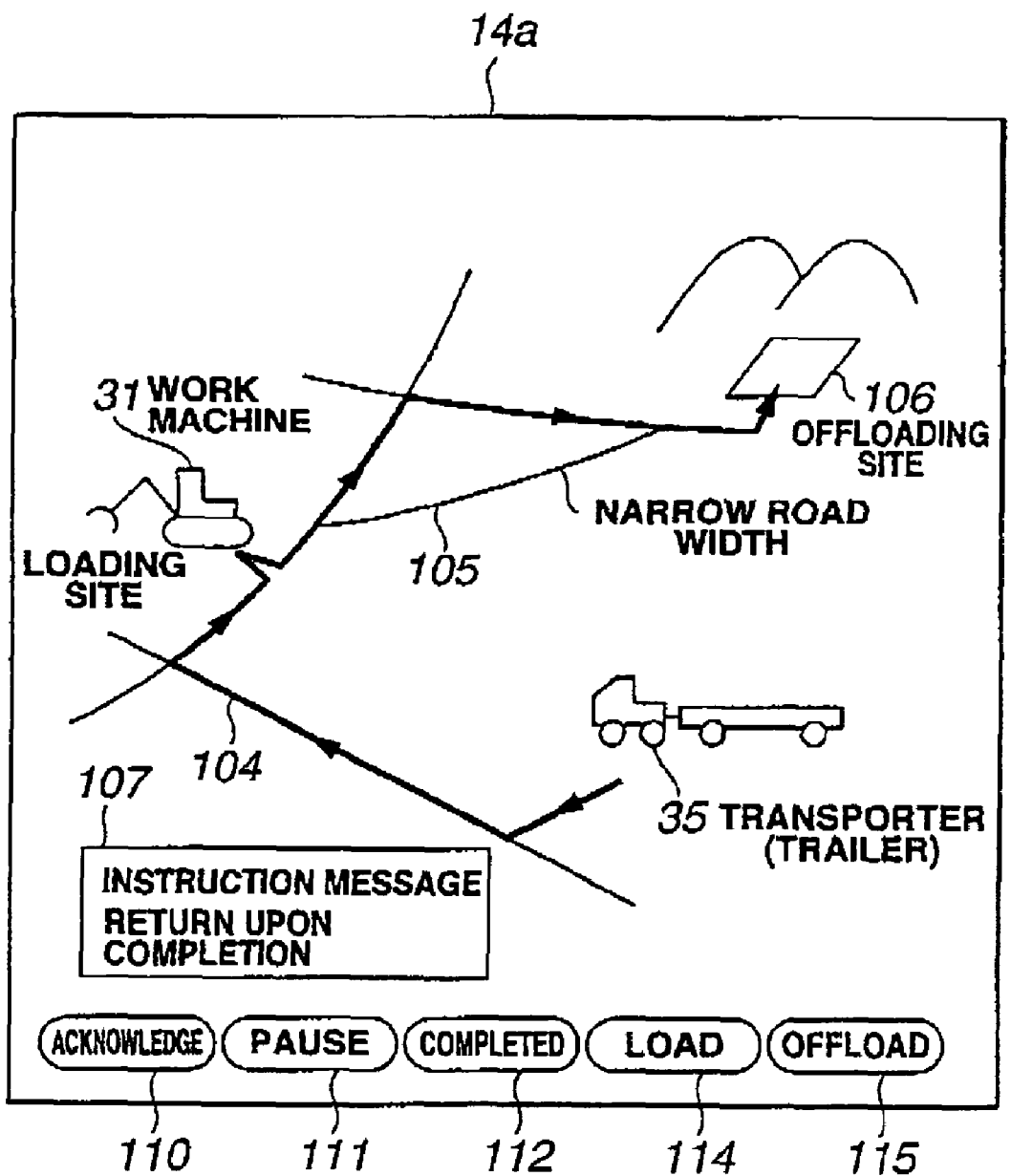
FIG. 4 is a diagram showing an example of a screen display of a display device mounted on a mobile unit.

In accordance therewith, on display screen 14a of terminal 14 of the transport vehicle 35, the icon of mobile work machine 31 is displayed in its current location on a map, and, in addition, the icon of off-loading site 106 is displayed in a corresponding location on the map as shown in FIG. 4. Furthermore, the current location of the transport vehicle 35 itself is detected by the GPS sensor 57 mounted in the transport vehicle 35, and displayed on screen 14a. In addition, the message ("Instruction message: Return when finished") sent via e-mail is displayed in the message portion 107 of the display screen of terminal 14. In accordance therewith, the operator riding in the transport vehicle 35 can perceive from display screen 14a the fact that the mobile work machine 31 is the next unit to be loaded, the current location thereof, the site, where this vehicle is to be off-loaded, and specific job details.

Further, an automatic transport route generation program is stored in terminal 14. With this automatic transport route generation program, processing for automatically generating the shortest transport travel route, which selects only roads wide enough to enable the vehicle 35 to pass through as the route from the current location of the vehicle 35, through the loading site 31 to the off-loading site 106. Accordingly, when this automatic transport route generation program is executed, the shortest transport travel route 104, which avoids narrow roads that are not wide enough for the vehicle 35 to pass through, and which goes from the vehicle 35 itself to mobile work machine 31 and on to off-loading site 106, is displayed on display screen 14a of terminal 14.

Here, if it is possible to perform work according to the content of the work instructions, a click operation is performed on button 110 indicating "OK" on display screen 14a. Further, when the transport vehicle 35 arrives at the loading site 31, and the job of loading is started, a click operation is performed on button 114 indicating "Loading" on display screen 14a. Further, when the transport vehicle 35 arrives at the off-loading site 106, and the job of off-loading is started, a click operation is performed on button 115 indicating "Off-loading" on display screen 14a. Further, when loading and transport (off-loading) work has been completed by the transport vehicle 35, a click operation is performed on button 112 indicating "Finished" on display screen 14a. Further, when work according to the content of the work instructions cannot be undertaken for some reason, a click operation is performed on button 111 indicating "Suspended" on display screen 14a. The content of input operations resulting from these click operations on terminal 14 is sent to the management-side terminal 11 from terminal 14 via e-mail. By receiving this e-mail at terminal 11, it is possible to comprehend the state of work progress of the transport vehicle 35. Furthermore, in addition to touch operations, such as click operations, key operations, and touch-panel operations, input operations can also make use of voice input operations.

Accordingly, it is possible for an operator to perform loading and transport (off-loading) work extremely efficiently by moving the transport vehicle 35 along the transport travel route 104 and carrying out work according to display screen 14a of terminal 14. Furthermore, transporting other mobile work machine 31–33 on the return route of the off-loaded transport vehicle 35 (unloaded state) can increase efficiency even more.

Furthermore, an embodiment for sending work instructions data to a terminal mounted in a hydraulic excavator or other such mobile work machine 31 from the management-side terminal 11, and causing excavation work to be performed efficiently, is also possible.

For example, by sending data, which indicates the excavation quantity target for that day, the work completion schedule, and the current location of a dump truck for loading, to the terminal of the mobile work machine 31, it is possible to display these data on the display screen of the terminal, and to enable the operator to operate the work machinery, and efficiently perform a series of jobs for excavating dirt and loading it into the dump truck according to the display screen.

Now, in this embodiment, data is sent and received by utilizing an Internet 2 e-mail service. In this case, the server terminal 21, as the mail server, regularly checks whether or not e-mail is inside a mailbox. Thus, a constant delay occurs from the time e-mail is sent from a terminal (for example, terminal 11) until it is actually received by a mobile unit (for example, mobile work machine 31) of the e-mail address destination.

In this embodiment, the sending and receiving of data is performed via satellite radio communications by the communication status satellite 9. In satellite radio communications, when the communication status environment between the sending and receiving equipment is not good, such as when the maximum angle of elevation of the satellite is small, and an unobstructed view of a mobile unit is not achievable, a communication status channel 5 cannot be secured, thus requiring that processing, which attempts to establish communications, be carried out many times. Thus, a communication status environment-caused delay occurs from the time data is sent from the satellite 9 until it is actually received by a mobile unit (for example, mobile work machine 31).

In this manner, in a communication device of this embodiment, a time difference of, for example, several minutes occurs from the time e-mail is sent by a request-origination terminal until it is received by a request-destination mobile unit. In a communication device with such low real-time capabilities, there is the danger of the unknown communication status causing an operator of a request-origination terminal to become apprehensive, thus affecting work efficiency. Further, because the communication status is unclear, there is the danger of re-sending duplicate e-mails, thus affecting communication status costs.

Accordingly, it is desirable to display the communication status with the respective mobile units on the display screens of terminals so as to avoid lower work efficiency and higher communication status costs due to unclear communication status.

Furthermore, in this embodiment, requests for mobile unit information are sent out from a plurality of terminals to a single mobile unit. Consequently, it is not possible to make a judgment using a single terminal alone as to how recent the mobile unit information currently available is (when the request for mobile unit information was made).

Accordingly, it is desirable to display on the display screen of terminals the elapsed time since the last request was made to a mobile unit, and to keep operators informed of mobile unit management information, such as how recent the mobile unit information currently available is.

The embodiment described hereinbelow responds to these requirements.

That is, as shown in FIG. 31, icons (a picture of a hydraulic excavator, a picture of a service vehicle, and a picture of a trailer, etc.) as mobile unit identifiers corresponding to a plurality of mobile units 31–35, respectively, are displayed on a terminal 11. And then, when e-mail requesting mobile unit information is sent from a request-origination terminal 11 to a request-destination mobile work machine 31, the display mode of the icon of this mobile work machine 31 changes to the modes shown in FIG. 16 (a) according to the communication status.

That is, as shown in FIG. 16 (a), the color of the icon of this mobile work machine 31 changes to "blue," "yellow," "green" and "red" according to changes in the communication status between the terminal 11 and the mobile work machine 31, that is, the communication status procedures "No Request," "Request in Progress," "Reply" and "No Reply."

This will be explained by referring to the flowchart shown in FIG. 15.

Figure 15:
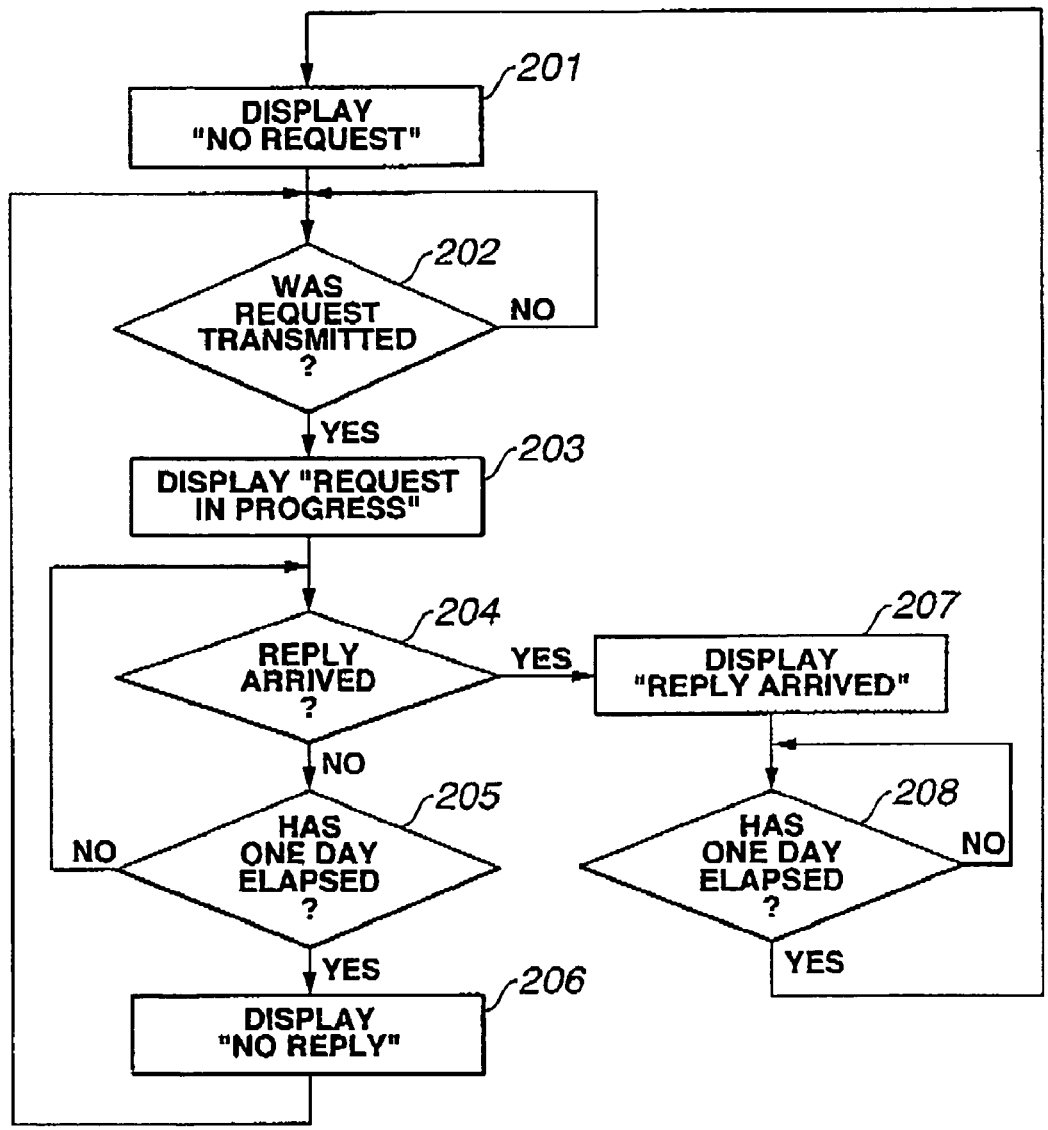
FIG. 15 is a flowchart showing the processing procedures for causing a display to transition in accordance with a communication state.

FIG. 15 shows the procedures of processing for transitioning a display in accordance with communication status procedures. This processing is performed by the server terminal 21, and the results of this processing are displayed on a display screen of the terminal 11.

First, in the initial state, the icon of a mobile work machine 31 is displayed in the "blue" color corresponding to "No Request" (Step 201).

At this point, when e-mail requesting mobile unit information is sent from the request-origination terminal 11 to the request-destination mobile work machine 31, and this e-mail is stored in the mailbox of the mobile work machine 31 (YES decision in Step 202), the icon of the mobile work machine 31 transitions to the "yellow" color display corresponding to "Request in Progress" (Step 203).

Here, when e-mail returned from the request-destination mobile work machine 31 is stored in a mailbox (YES decision in Step 204), the icon of the mobile work machine 31 transitions to the "green" color display corresponding to "Reply" (Step 207). When one day has elapsed from the transition to the "Reply" state (YES decision in Step 208), the icon of the mobile work machine 31 returns to the "blue" color display corresponding to "No Request" (Step 201). In this case, when the returned mobile unit information is sent to and displayed on a display-destination terminal (for example, terminal 12), it may be constituted such that the process moves from Step 207 to Step 201 to return to the "blue" color display corresponding to "No Request."

By contrast, when e-mail, which should have been returned from the request-destination mobile work machine 31 is not stored in a mailbox (NO decision in Step 204, YES decision in Step 205), a determination is made that it will be difficult to ensure a radio communication status channel 5, and the icon of the mobile work machine 31 transitions to the "red" color corresponding to "No Reply" (Step 206).

Furthermore, in the above explanation, it is supposed that a request for mobile unit information is made from terminal 11 to mobile work machine 31, but the icon of the request-destination mobile unit changes in accordance with the communication status of the request-origination terminal in the same way even when a request for mobile unit information is made from respective terminals 11, 12, and so forth to respective mobile units 31, 32, 33, 34, 35.

As described hereinabove, according to this embodiment, even when using communication means with low real-time capabilities, the display mode changes in accordance with the communication status, and the "degree of communication status delay" can be perceived on the display screen of terminal 11. Also, making requests that duplicate those of other terminals is eliminated. Thus, reduced work efficiency and increased communication status costs brought on by unknown communication status can be avoided.

Next, an embodiment, which enables operators to be kept informed of mobile unit management information, such as how recent the mobile unit information currently available is, by displaying the elapsed time from the last request made to a mobile unit on the display screen of a terminal 11, will be explained.

Figure 18:
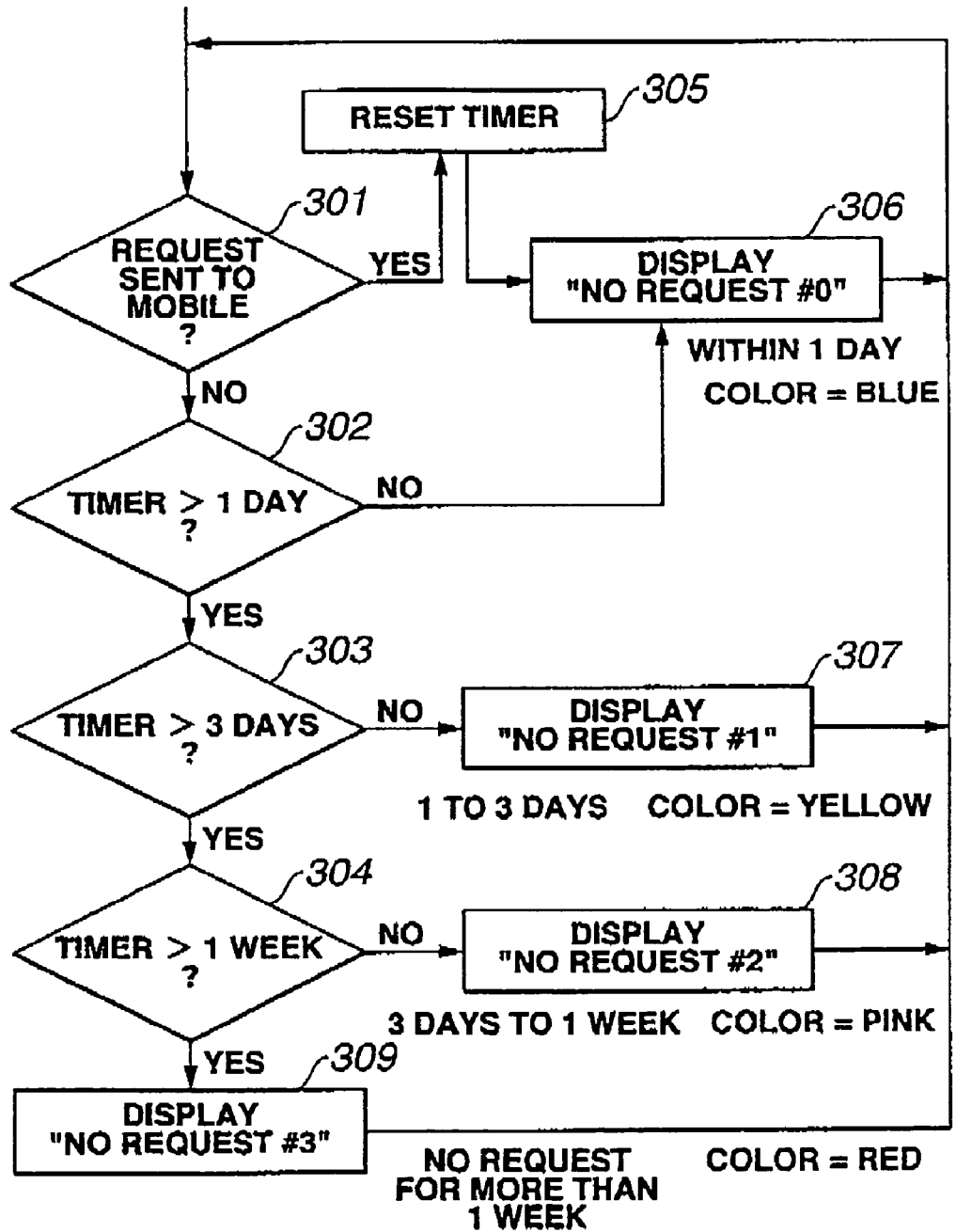
FIG. 18 is a flowchart showing the processing procedures for causing a display to transition in accordance with the communication status.

That is, as shown in FIG. 18, in accordance with the communication status between respective terminals 11, 12, and so forth and mobile work machine 31, in other words, the elapsed time from the last request from respective terminals 11, 12, and so forth to mobile work machine 31 changing from "No Request in Less Than One Day," to "No Request in Past One to Three Days," "No Request in Past Three Days to One Week" and "No Request in Over One Week," the color of the icon of this mobile work machine 31 changes from "blue" (No Request #0), "yellow" (No Request #1), "pink" (No Request #2) and "red" (No Request #3).

As shown in FIG. 18, when e-mail requesting mobile unit information is sent from terminals 11, 12, and so forth to the request-destination mobile work machine 31, and this e-mail is stored in the mailbox of mobile work machine 31 (Yes decision in Step 301), a timer is reset (Step 305), and the icon of the mobile work machine 31 transitions to the "blue" color display corresponding to "No Request #0" (Step 306).

Then, when the elapsed time following the resetting of the timer is less than one day (NO decision in Step 302), the icon of the mobile work machine 31 retains the "blue" color display corresponding to "No Request #0" (Step 306).

Further, when the elapsed time following the resetting of the timer is longer than one day but less than three days (YES decision in Step 302, NO decision in Step 303), the icon of the mobile work machine 31 transitions to the "yellow" color display corresponding to "No Request #1" (Step 307).

Further, when the elapsed time following the resetting of the timer is longer than three days but less than one week (YES decision in Step 303, NO decision in Step 304), the icon of the mobile work machine 31 transitions to the "pink" color display corresponding to "No Request #2" (Step 308).

Further, when the elapsed time following the resetting of the timer is longer than one week (YES decision in Step 304), the icon of the mobile work machine 31 retains the "red" color display corresponding to "No Request #3" (Step 309).

When e-mail requesting mobile unit information is sent from terminals 11, 12, and so forth to request-destination mobile work machine 31 while the timer is clocking time, and this e-mail is stored in the mailbox of mobile work machine 31 (Yes decision in Step 301), the timer is reset (Step 305), and the icon of a mobile work machine 31 transitions to the "blue" color display corresponding to "No Request #0" (Step 306).

Furthermore, in the above explanation, it is supposed that the elapsed time from a final request to mobile work machine 31 is displayed on terminal 11, but this elapsed time is similarly displayed for other mobile units 32–35 as well. Further, the elapsed time from a final request to the respective mobile work machine 31, 32, 33, 34, 35 is also displayed on other terminals, such as terminal 12 and so forth.

As described hereinabove, according to this embodiment, the state of elapsed time from the last request to the respective mobile units 31–35 can be perceived on the display screen of a terminal, and management-related information, such as how recent the mobile unit information currently available for mobile units 31–35 is, can be learned.

Many variations are possible for the above embodiment. Hereinbelow, explanations will be given with regard to FIG. 16 (b)–(d), FIG. 17, FIG. 19 and FIG. 20.

Next, an embodiment, which enables the display of the elapsed time since the last incoming e-mail indicating mobile unit information from a mobile unit on a display screen of terminal 11, and which enables an operator to be kept informed of mobile unit management information, such as how recent the mobile unit information currently available is, will be explained. Here, "Incoming Message" comprises both a case in which e-mail indicating mobile unit information from a mobile unit is returned, and, as will be explained below, a case in which e-mail indicating mobile unit information from a mobile unit is automatically transmitted without a request from the terminal side.

Figure 19:
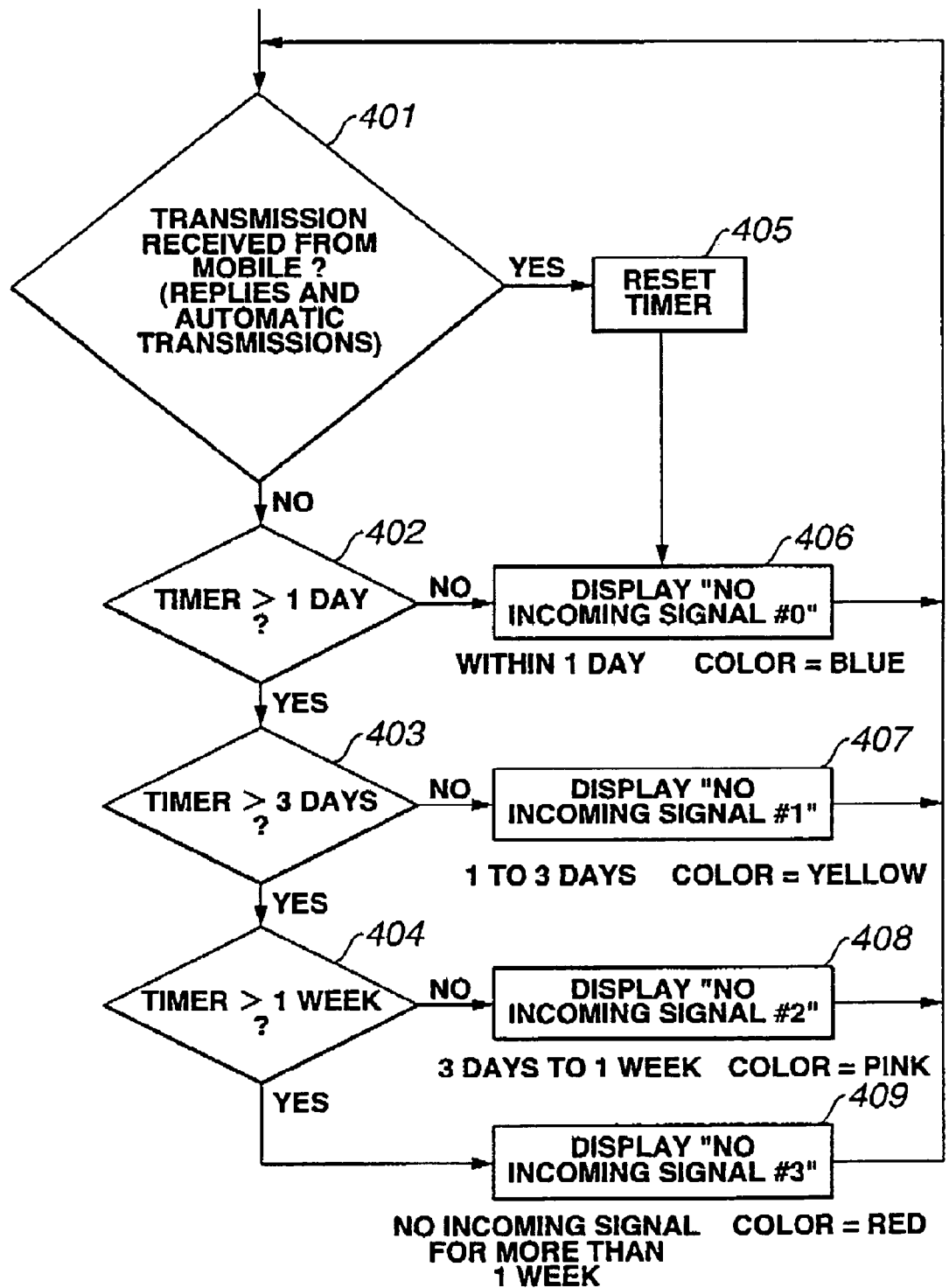
FIG. 19 is a flowchart showing the processing procedures for causing a display to transition in accordance with the communication status.

That is, as shown in FIG. 19, in accordance with the communication status with the mobile work machine 31, in other words, the elapsed time from the last incoming message (reply, automatic transmission) from the mobile work machine 31 to the server terminal 21 changing from "No Incoming Message in Less Than One Day," to "No Incoming Message in Past One to Three Days," "No Incoming Message in Past Three Days to One Week" and "No Incoming Message in Over One Week," the color of the icon of this mobile work machine 31 changes from "blue" (No Incoming Message #0), "yellow" (No Incoming Message #1), "pink" (No Incoming Message #2) and "red" (No Incoming Message #3).

As shown in FIG. 19, when a reply from the mobile work machine 31 or e-mail automatically transmitted by the mobile work machine 31 is stored in the mailbox of the server terminal 21 (YES decision in Step 401), a timer is reset (Step 405), and the icon of the mobile work machine 31 transitions to the "blue" color display corresponding to "No Incoming Message #0" (Step 406).

Then, when less than one day has elapsed from the time the timer was reset (NO decision in Step 402), the icon of the mobile work machine 31 retains the "blue" color display corresponding to "No Incoming Message #0" (Step 406).

Further, when more than one day but less than three days has elapsed from the time the timer was reset (YES decision in Step 402, NO decision in Step 403), the icon of the mobile work machine 31 transitions to the "yellow" color display corresponding to "No Incoming Message #1" (Step 407).

Further, when more than three days but less than one week has elapsed from the time the timer was reset (YES decision in Step 403, NO decision in Step 404), the icon of the mobile work machine 31 transitions to the "pink" color display corresponding to "No Incoming Message #2" (Step 408).

Further, when more than one week has elapsed from the time the timer was reset (YES decision in Step 404), the icon of the mobile work machine 31 transitions to the "red" color display corresponding to "No Incoming Message #3" (Step 409).

When a reply from the mobile work machine 31 or e-mail automatically transmitted by the mobile work machine 31 is stored in the mailbox of the server terminal 21 while the timer is clocking time (YES decision in Step 401), the timer is reset (Step 405), and the icon of the mobile work machine 31 transitions to the "blue" color display corresponding to "No Incoming Message #0" (Step 406).

Furthermore, in the above explanation, it is supposed that the elapsed time from a final incoming message from mobile work machine 31 is displayed, but this elapsed time is similarly displayed for other mobile units 32–35 as well. Further, the elapsed time from the last incoming message from the respective mobile work machine 31, 32, 33, 34, 35 is also displayed on other terminals, such as terminal 12 and so forth.

As described hereinabove, according to this embodiment, the state of elapsed time from a last incoming message from the respective mobile units 31–35 can be perceived on the display screen of a terminal, and management-related information, such as how recent the mobile unit information currently available for mobile units 31–35 is, can be learned. Further, when a mobile unit (for example, mobile unit 31) is automatically transmitting at regular periods, from the content of the display of elapsed time from the last incoming message from mobile unit 31, it is possible to discern at the terminal side whether or not a communication status malfunction of some sort occurred when mobile unit 31 made an automatic transmission.

Next, an embodiment, which enables the display of the elapsed time from the sending out of a request to a mobile unit until the receiving of a reply, and which enables a determination via a display screen of a terminal 11 as to whether or not communications are being carried out normally, will be explained by referring to FIG. 20.

Figure 20:
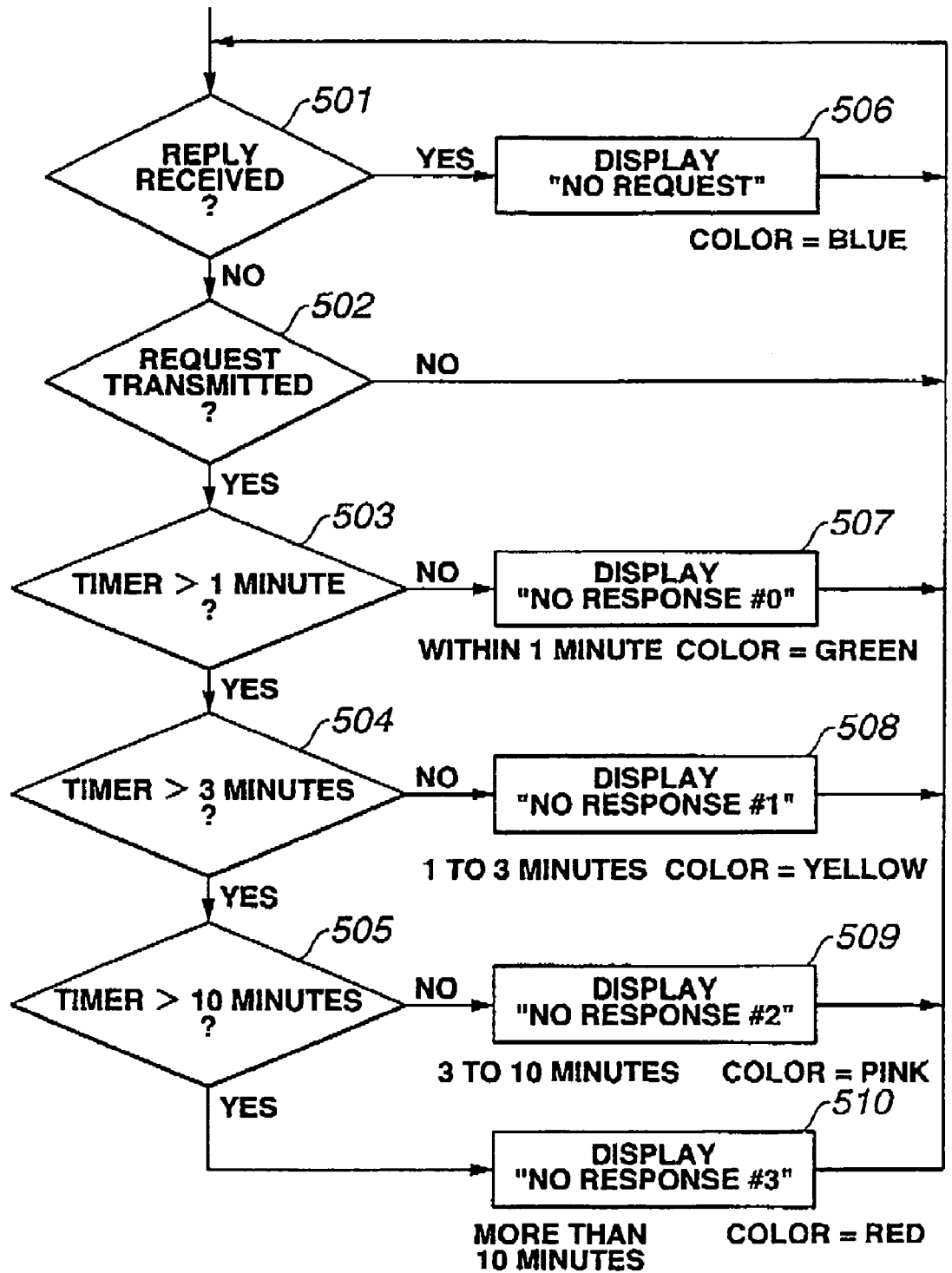
FIG. 20 is a flowchart showing the processing procedures for causing a display to transition in accordance with the communication status.

That is, as shown in FIG. 20, in accordance with a change in time during which a no-reply state continues from the last request made from a terminal 11 to a mobile work machine 31, in other words, changes from "No Reply in Less Than One Minute," to "No Reply in Past One to Three Minutes," "No Reply in Past Three to Ten Minutes" and "No Reply in Over Ten Minutes," the color of the icon of this mobile work machine 31 changes from "green" (No Reply #0), "yellow" (No Reply #1), "pink" (No Reply #2) and "red" (No Reply #3). Further, in a state, wherein there is no request (state in which there was a response) to the mobile work machine 31 from the respective terminals 11, 12 and so forth, "blue" ("No Request") is displayed.

As shown in FIG. 20, when e-mail requesting mobile unit information is sent to request-destination mobile work machine 31 from request-origination terminal 11, and e-mail returning from request-destination mobile work machine 31 as a reply thereto is stored in a mailbox (YES decision is Step 501), the icon of the mobile work machine 31 transitions to the "blue" color corresponding to "No Request" (Step 506).

Then, in a state, in which a reply e-mail from request-destination mobile work machine 31 is not stored in a mailbox (NO decision in Step 501), the process moves to the next Step 502.

In Step 502, a determination is made as to whether or not e-mail requesting mobile unit information was sent from request-origination terminal 11 to request-destination mobile work machine 31 and stored in the mailbox of mobile work machine 31, in other words, whether or not there was a request (Step 502).

When there was a request (YES decision in Step 502), a timer is reset, and when the elapsed time following the timer being reset is less than one minute (NO decision in Step 503), the icon of the mobile work machine 31 transitions to the "green" color display corresponding to "No Reply #0" (Step 507).

Further, when the elapsed time following the timer being reset is more than one minute but less than three minutes (YES decision in Step 503, NO decision in Step 504), the icon of the mobile work machine 31 transitions to the "yellow" color display corresponding to "No Reply #1" (Step 508).

Further, when the elapsed time following the timer being reset is more than three minutes but less than ten minutes (YES decision in Step 504, NO decision in Step 505), the icon of the mobile work machine 31 transitions to the "pink" color display corresponding to "No Reply #2" (Step 509).

Further, when the elapsed time following the timer being reset is more than ten minutes (YES decision in Step 505), the icon of the mobile work machine 31 transitions to the "red" color display corresponding to "No Reply #3" (Step 510).

When e-mail returned from request-destination mobile work machine 31 is stored in a mailbox while the timer is clocking time (YES decision in Step 501), the icon of the mobile work machine 31 transitions to the "blue" color corresponding to "No Request" (Step 506).

Furthermore, in the above explanation, it is supposed that the elapsed time until a reply is received following a request to mobile work machine 31 is displayed on terminal 11, but this elapsed time is similarly displayed for other mobile unit 32–35 as well. Further, the elapsed time from a request to the respective mobile work machine 31, 32, 33, 34, 35 is also displayed on other terminals, such as terminal 12 and so forth.

As described hereinabove, according to this embodiment, since the elapsed time following the sending of a request to a mobile unit until a reply is received is displayed, it can readily be determined from a display screen on a terminal whether or not communications are being performed normally.

Furthermore, in the above explanation, in accordance with the communication status between a terminal 11 and a mobile work machine 31, the color of the entire icon of this mobile work machine 31 is changed and displayed as shown in FIG. 16 (*a*), but the icon colors can be changed to color combinations, color arrangements, or shaded patterns. Further, a component other than color can be changed.

For example, in accordance with the communication status between a terminal 11 and a mobile work machine 31, the shape of the icon of this mobile work machine 31 can be changed and displayed as shown in FIG. 16 (*b*). For example, if it is an icon of a hydraulic excavator, the position or the rounded portion of the work machinery can be changed.

Further, in accordance with the communication status between a terminal 11 and a mobile work machine 31, the size of the icon of this mobile work machine 31 can be changed and displayed as shown in FIG. 16 (*c*). For example, in the case of "Request in Progress" shown in FIG. 16 (*c*), the size of the hydraulic excavator icon intermittently changes from large to medium and from medium to large.

Further, in accordance with the communication status between a terminal 11 and a mobile work machine 31, the movement of the icon of this mobile work machine 31 can be changed and displayed as shown in FIG. 16 (*d*). For example, in the case of "No Request" shown in FIG. 16 (*c*), the hydraulic excavator icon is still, in the case of "Request in Progress," the hydraulic excavator icon is rotating, in the case of "Reply," the hydraulic excavator icon moves linearly, and in the case of "No Reply," the hydraulic excavator icon jumps.

Further, in accordance with the communication status between a terminal 11 and a mobile work machine 31, the icon of this mobile work machine 31 can be changed and displayed as a flashing pattern. For example, changing the flash cycle is being considered.

Further, besides changing the picture of mobile work machine 31, this embodiment can be constituted such that characters or other such identification symbols identifying a mobile work machine 31 change. For example, changing the color or flashing the characters indicating the vehicle number or nickname of a mobile work machine 31 is being considered.

By so doing, as a result of the processing shown in FIG. 15, for example, the icons of a plurality of mobile work machine 31, 32, 33, 36, 37, 38 are displayed correspondent to mobile unit information ("vehicle number," "location," "service meter") in a display screen of a terminal 11 as shown in FIG. 17 (*a*). In this case, as shown in this same FIG. 17 (*a*), the icons of the respective mobile work machine 31, 32, 33, 36, 37, 38 can be displayed on a screen in a preset order.

Further, as shown in FIG. 17 (*b*), the icons of the respective mobile work machine 31, 32, 33, 36, 37, 38 can also be rearranged in accordance with the communication status, displaying the icons of mobile work machine 31, 32 corresponding to "Request in Progress" in the top positions, and displaying the icons of mobile work machine 33, 36, 37 corresponding to "No Request" in the bottom positions.

Further, as shown in FIG. 17 (*c*), out of the icons of the respective mobile work machine 31, 32, 33, 36, 37, 38, only the icons of mobile work machine 31, 32 corresponding to "Request in Progress" can be extracted and displayed.

As described hereinabove, according to this embodiment, since the content of a terminal display changes in accordance with changes in communication status, it is possible to prevent decreases in work efficiency resulting from unknown communication status, and it is also possible to prevent increases in communication status costs. Further, it is possible to obtain management information (whether or not maintenance and inspections have been performed recently), such as how recent the mobile unit information of the respective mobile unit is, from a display screen.

This embodiment, wherein the content of a terminal display changes in accordance with changes in communication status, is not limited to the communication device shown in FIG. 1, and can be applied to an arbitrary communication device. If a communication device comprises at a minimum two communication status stations, and performs communications between two communication status stations, then this embodiment is applicable.

Next, an embodiment, which enables wasteful communication status-related power consumption to be held in check by the mobile unit 31–35 side intermittently turning OFF power on its own, will be explained.

For mobile work machine such as construction machine, the time period during which the engine is not running (that is, the time period during which it is operating with the power OFF) is long.

Figure 21:
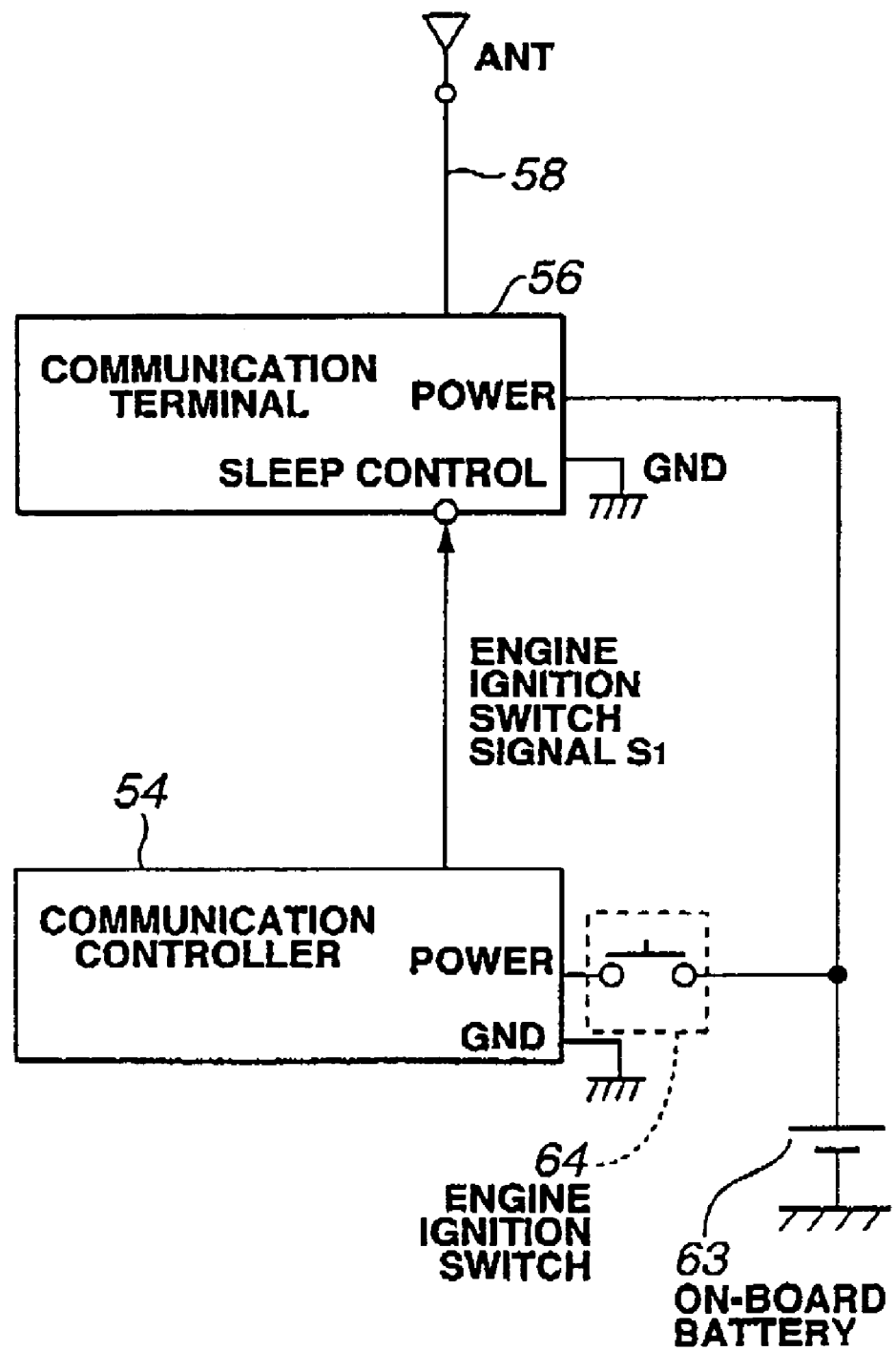
FIG. 21 is a diagram showing the connection mode between an in-vehicle communication terminal and another machine.

In FIG. 21, for instance, if a communication terminal 56 is constantly electrically connected to a battery 63 (rated voltage 24V) even while the engine is OFF, since the engine is not running, the battery 63 is not charged by an alternator. Thus, battery 63 discharge will occur rapidly. On the other hand, for instance, if the electrical connection between the battery 63 and the communication terminal 56 is constantly OFF while the engine is OFF, communications with a plurality of terminals 11, 12 and so forth, will become impossible. Thus, when there is a request for mobile unit information from a the terminal 11, 12 and so forth side when the engine is OFF, it is not possible to reply to this request.

Accordingly, the embodiment described hereinbelow is constituted so as to make it possible to communicate with a plurality of terminals 11, 12 and so forth while an engine is OFF, to enable a reply to be given to a request from a terminal 11, 12 and so forth, and, in addition, to enable wasteful power consumption to be held in check even for construction machine and other such mobile units 31–35 for which engine non-running time is long.

FIG. 21 shows the constitution of this embodiment.

As explained by FIG. 2, a communication terminal 56 is provided onboard a mobile work machine 31. And the power terminal of this communication terminal 56 is electrically connected to a battery 63. A main power circuit is disposed inside the communication terminal 56, and power is consumed by the power of the battery 63 being supplied to this main power circuit. Either an internal program (software timer) is stored inside the communication terminal 56, or an internal power circuit (hardware timer) is incorporated into the communication terminal 56, and in accordance therewith, the communication terminal 56 is operated such that main power circuit drive is intermittently turned ON and OFF, enabling power savings to be performed periodically by the main power circuit.

The level of an engine key switch signal S1 inputted to a sleep control terminal of the communication terminal 56 is monitored by software, and when it is an ON signal, and the main power circuit of the communication terminal 56 is OFF, processing for forcibly driving the main power circuit is performed. Further, it may be constituted such that the main power circuit is driven by hardware.

That is, when an OFF signal (logical "0" level signal) of an engine key switch signal S1 is inputted to the sleep control terminal of the communication terminal 56, the electrical connection between the main power circuit on the inside of the communication terminal 56 and the battery 63 is turned ON and OFF at a predetermined duty ratio, the drive of the main power circuit is turned ON and OFF, activation of the communication terminal 56 is turned ON and OFF, and communication status processing is performed on a fixed cycle (the communication terminal 56 sleep function is ON).

In accordance with an ON signal (logical "1" level signal) of an engine key switch signal S1 being inputted to the sleep control terminal of the communication terminal 56, the main power circuit on the inside of the communication terminal 56 and the battery 63 are electrically connected, the main power circuit is driven, the communication terminal 56 is started up, and communication status processing is performed (the communication terminal 56 sleep function is OFF (forcibly terminated). Accordingly, it becomes a state, in which the communication terminal 56 is constantly operating while the engine is ON.

Meanwhile, the power terminal of the communication status controller 54 is electrically connected to the battery 63 via the engine key switch 64. In accordance with the engine key switch 64 being turned OFF, the electrical connection between the communication status controller 54 and the battery 63 is cut off, and, in addition, the operation of the engine of the mobile work machine 31 is stopped.

In accordance with the engine switch key 64 being turned ON, an ON signal (logical "1" level signal) of an engine key switch signal S1 is outputted to the sleep control terminal of the communication terminal 56 from the communication status controller 54.

Next, the processing performed by the communication terminal 56 will be explained utilizing the timing charts shown in FIG. 7.

Figure 7:
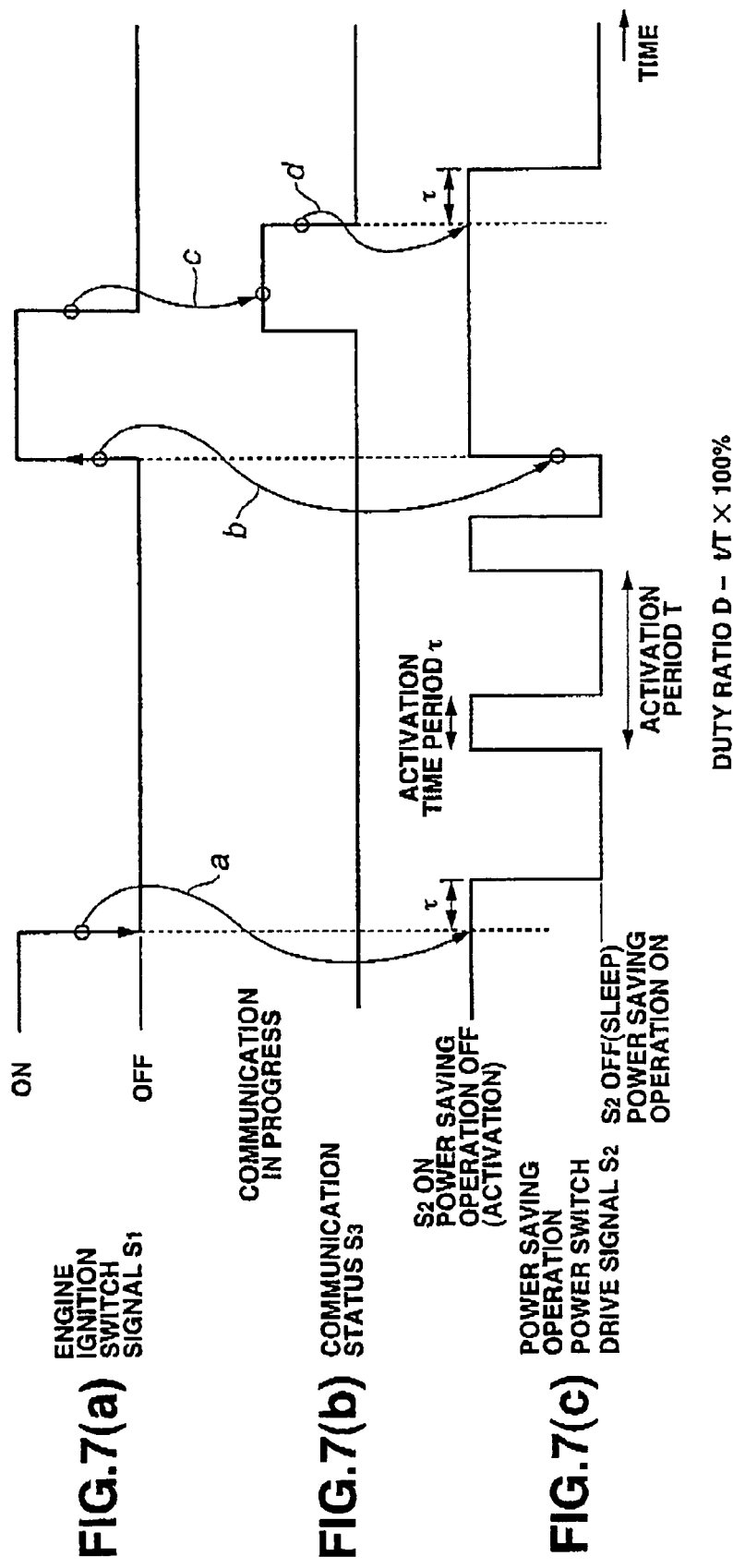
FIGS. 7(a) to 7(c) are timing charts illustrating a power-saving operation performed by a mobile unit.

FIG. 7 (a) shows an operating signal S1 of the engine key switch 64, and FIG. 7 (b) shows the communication status between the communication terminal 56 and the communication status satellite 9. Communications in progress is indicated by the logical "1" level. FIG. 7 (c) shows the activation status of the communication terminal 56. The logical "1" level corresponds to the activation state (power-saving operation OFF), and the logical "0" level corresponds to the activation OFF (sleep) state (power-saving operation ON). The activation of the communication terminal 56 is intermittently turned ON and OFF at duty ratio D ($=\tau/T \times 100\%$). At the timing at which a power-saving operation is OFF and the communication terminal 56 is started up, signals indicating mobile unit information, such as current location, service meter values, remaining fuel, battery voltage, and vehicle error codes, are sent to the communication status satellite 9 from the communication terminal 56 as needed.

As shown in FIG. 7, when the engine key switch S1 is maintained in the ON state, the communication terminal 56 is constantly activated.

When the engine key switch S1 is switched from ON to OFF, the activation of the communication terminal 56 is intermittently turned ON and OFF according to duty ratio D ($=\tau/T \times 100\%$) as indicated by arrow a (sleep function is ON).

Figure 8:
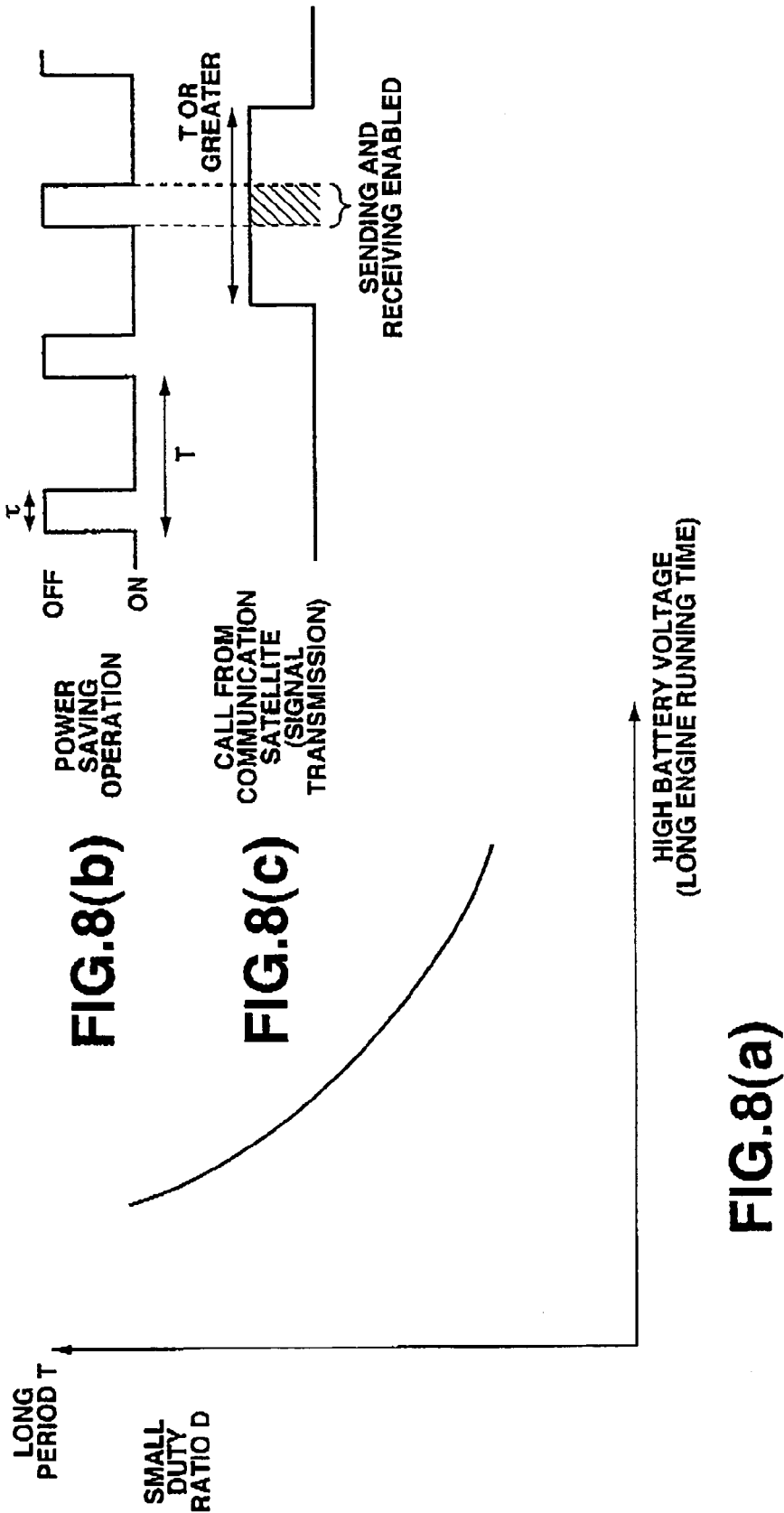
FIGS. 8(a) to 8(c) are diagrams used for explaining an embodiment in which a power-saving operation is performed.

That is, FIG. 8 (b) is a timing chart showing the ON, OFF of a power-saving operation corresponding to FIG. 7 (c), and FIG. 8 (c) shows the transmission state of a call request signal to the communication terminal 56 from the communication status satellite 9. The logical "1" level indicates a transmission in progress.

As shown in these figures, a time $\tau$ when the communication terminal 56 is inevitably active, in other words, a time when it is possible to send to and receive from the communication status satellite 9, exists within a fixed time (activation period) T (Refer to the slashes in FIG. 8 (c).). The expected value of communication reply time is T/2 (the average is T/2). Further, power consumption can be held down to $\tau/T$. To enable sending and receiving between the communication terminal 56, which is performing a power-saving operation during the activation period T, and the communication status satellite 9, it is necessary for the communication status satellite 9 to continuously send a signal to the communication terminal 56 for a period of time longer than T (Refer to FIGS. 8 (b), (c)). The activation period T is determined in accordance with the criticality of the communications, and the safety factor relative to the duration of the signal sent out from the communication status satellite 9.

Further, for the active time $\tau$, it is necessary to ensure a time period longer than that required for sending and receiving procedures. However, the shorter the active time $\tau$, the greater the power-saving effect.

By so doing, by regularly starting up the communication terminal 56 for a period constituting T, it is possible to ensure an expected value for communication status reply time, and, in addition, it is possible to hold down power consumption.

However, as shown in FIG. 7, even when the engine key switch signal S1 is switched from ON to OFF, if communications between the communication terminal 56 and the communication status satellite 9 are in progress as indicated by arrow c, the sleep function turns ON from that point in time when communications end as indicated by arrow d.

When the engine key switch signal S1 is switched from OFF to ON, the sleep function is forcibly terminated as indicated by arrow b.

As described hereinabove, according to this embodiment, because the sleep function is forcibly terminated when the engine is operated, and the communication terminal 56 is constantly active during engine operation, mobile unit information, such as a sudden vehicle abnormality that occurs during engine operation, can be transmitted, and safety can be ensured. Further, if communications are in progress, because the communication terminal 56 remains active as-is until the end of communications even when engine operation is stopped, communications can be performed with certainty.

The above-mentioned duty ratio D can be changed to conform to the terminal voltage of the battery 63.

The voltage of the battery 63 is inputted to a battery voltage input circuit, and duty ratio D changes in accordance with the characteristics shown in FIG. 8 (a).

That is, as the voltage of the battery 63 becomes lower, the duty ratio D becomes smaller, and the activation period T becomes longer, holding in check further drops in battery 63 voltage.

Further, due to the same characteristics as the characteristics shown in FIG. 8 (a), further reductions of the battery 63 voltage can be checked by the fact that, as engine operation time becomes shorter, the duty ratio D becomes smaller, and the activation period becomes longer. Engine operation time is determined from the incremental value of the service meter. The continuous operation time of the engine up until prior to the sleep function being turned ON (prior to the start of intermittent power-saving operations) is determined from the incremental value of the service meter, and the duty ratio D changes in conformance to this continuous operation time. In this case, the provision of a battery voltage input circuit becomes unnecessary.

According to the above-described constitution shown in FIG. 21, because a power-saving operation is carried out via processing inside the communication terminal 56, it is advantageous in that abnormalities in other equipment or wiring have no effect. The constitution shown in FIG. 22 can be used instead of the constitution of FIG. 21. That is, a power-saving operation control function at engine key switch 64 ON can be provided in equipment other than the communication terminal 56, for example, in the communication status controller 54, and the ON, OFF of the electrical connection between the communication terminal 56 and the battery 63 can by intermittently controlled by this communication status controller 54.

Figure 22:
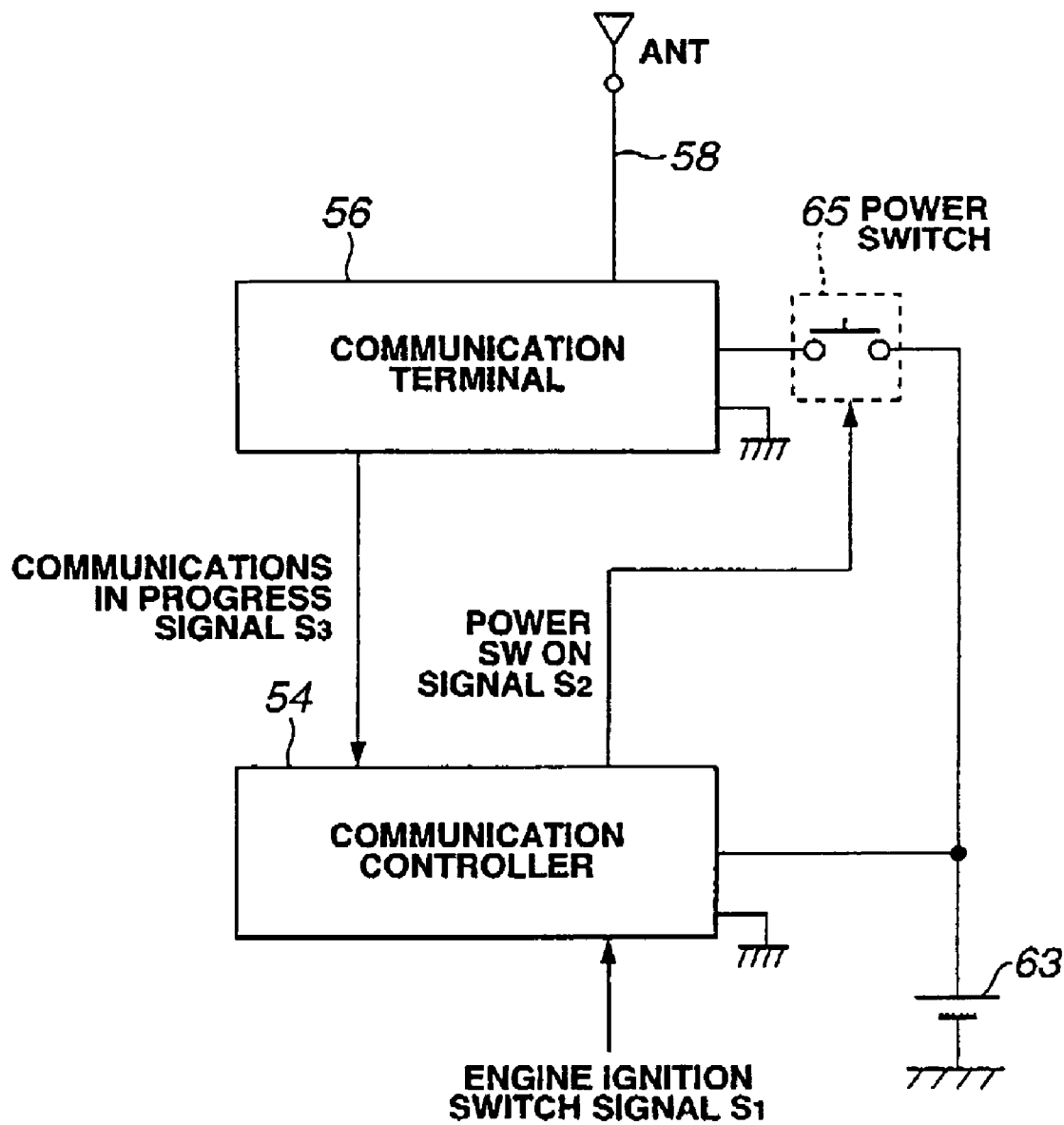
FIG. 22 is a diagram showing the connection mode between an in-vehicle communication terminal and another machine.
Figure 23A:
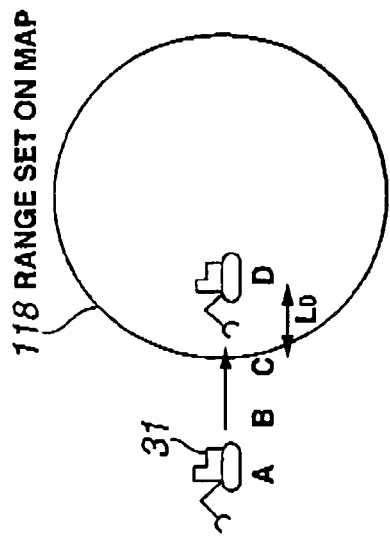
FIGS. 23(a) to 23(d) are diagrams illustrating the circumstances under which the duty ratio of a power-saving operation changes.
Figure 23B:
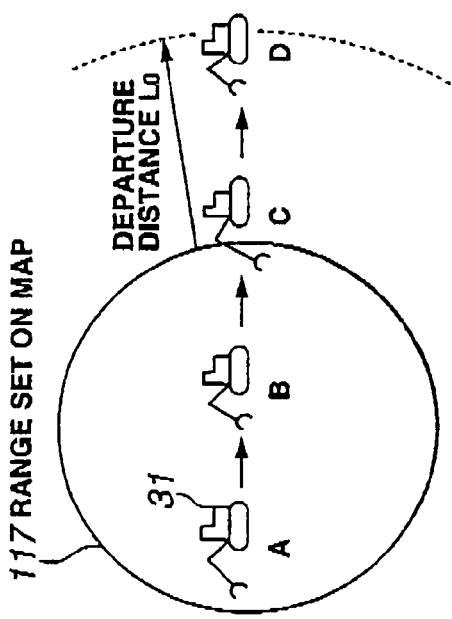
Figure 23C:
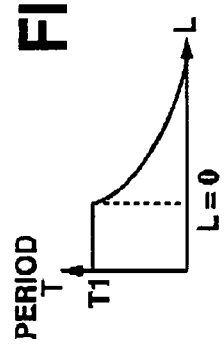
Figure 23D:
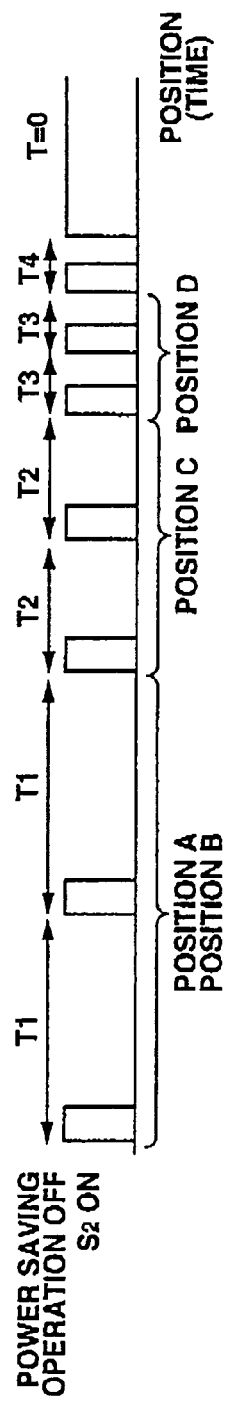

That is, as shown in FIG. 22, the power terminal of the communication terminal 56 is electrically connected to the battery 63 via a power switch 65. The electrical connection between the communication terminal 56 and the battery 63 is cut off in accordance with the power switch being turned OFF.

Meanwhile, the power terminal of the communication status controller 54 is electrically connected to the battery 63. Further, the operating signal S1 of engine key switch 64 is inputted into the communication controller 54. Further, a signal S3 indicating the communication status is inputted from the communication terminal 56 to the communication controller 54. When the communication terminal 56 is in the process of communicating with the communication satellite 9, the communication status signal S3 becomes a logical "1" level.

Either a software timer is stored, or a hardware timer is incorporated inside the communication controller 54, and a power switch drive signal S2 is outputted to the power switch 65.

The communication controller 54 executes the same processing as was explained using FIG. 7.

FIG. 7 (a) shows the operating signal S1 of the engine key switch 64, which is inputted to the communication controller 54, FIG. 7 (b) shows the communication status signal S3, which is inputted from the communication terminal 56 to the communication controller 54, and FIG. 7 (c) shows the power switch drive signal S2, which is outputted from the communication controller 54 to the power switch 65.

Accordingly, similar to the constitution shown in FIG. 21, when the engine stops running (signal S1 is OFF), the activation of the communication terminal 56 is controlled ON, OFF at a predetermined duty ratio D (signal S2 turns ON and OFF). Further, when the engine is running (signal S1 is ON), the above-described sleep function is forcibly terminated, and the communication terminal 56 is constantly in an active state during engine operation (signal S2 is ON). Further, even when engine operation is halted, if communications are in progress (S3 is ON), the communication terminal 56 remains in the active state until communications end (S2 is ON).

Furthermore, duty ratio D can similarly be changed in conformance to the battery 63 terminal voltage or engine operation time.

Many variations of the above-described embodiment are possible. Hereinbelow, explanations will be given with regard to FIG. 13, FIG. 23, FIG. 24 and FIG. 25.

The above-mentioned duty ratio D can be changed in accordance with the location information of a mobile work machine 31.

FIG. 23 shows an embodiment for changing the duty ratio D for mobile work machine 31 in accordance with a relative travel distance in relation to a set range.

FIG. 23 (a) shows a situation in which the activation period T is shortened and the duty ratio D is increased in conformance to mobile work machine 31 departing from a set range 117 on a map.

That is, most ordinary automobiles move under their own power. By contrast, construction machine and other mobile work machine 31 seldom travel long distances under their own power, and in most cases, shut off their own engines and are loaded on trailers and moved. And such cases are not limited to those in which the mobile work machine 31 is loaded and transported on a trailer 35, which is managed on the terminal 11 side, but rather, there are also cases in which mobile work machine 31 is loaded onto a trailer that is not managed, and is illegally transported overseas. Further, there is also the danger that mobile work machine 31 will be inadvertently transported by a trailer 35, and conveyed without permission to an administratively unapproved work area.

Therefore, when the operation of the engine of mobile work machine 31 is stopped, there is a need to manage and monitor the travel locus of the mobile work machine 31 by displaying the movement and location of this mobile work machine 31 on a terminal 11 in accordance with a request from the terminal 11, while holding down power consumption in line with communications.

Accordingly, a predetermined range 117, within which mobile work machine 31 is normally expected to be, is set on a map of a display screen of a terminal 11. For example, this set range 117 is a management area for which a manager on the terminal 11 side is responsible, or an administratively approved work area.

The activation of the communication terminal 56 of mobile work machine 31 is intermittently turned ON and OFF at a predetermined duty ratio D (=τ/T×100%) as shown in the above-described FIG. 7. And then, as shown in FIG. 7 (c), a power-saving operation is turned OFF (a power switch drive signal S2 is turned ON), and at the timing during which the communication terminal 56 is active, a signal indicating current location (in addition, mobile unit information, such as service meter values, remaining fuel, battery voltage, and vehicle error codes, can also be included) is sent to the communication satellite 9 from the communication terminal 56 in accordance with a request from a terminal 11. In accordance therewith, the sequential travel locations of the mobile work machine 31 are displayed on the terminal 11, which is the display-destination terminal.

The location of the mobile work machine 31 is detected by the GPS sensor 57 as shown in FIG. 2. In this case, if the power consumption of the GPS measurement devices (GPS antenna 59, GPS sensor 57, communication controller 54) is insufficient, these GPS measurement devices can be electrically connected directly to the battery 63 and operated at all times. Further, when the power consumption of these GPS measurement devices is high, similar to the communication terminal 56, the above-described sleep function can be turned ON, a power-saving operation can be turned ON and OFF, and the GPS measurement devices can be operated and measure a location only when a power-savings operation is ON (when the communication terminal 56 is active).

The location detected by the GPS sensor 57 for the mobile work machine 31, and the boundary location of the set range 117 are compared, and processing for changing the activation period T is executed in accordance with the results of this comparison.

FIG. 23 (d) shows a situation in which the activation period T is changed in accordance with a relative location (passage of time) in relation to the set range 117 of the mobile work machine 31.

As shown in FIG. 23 (a), when the mobile work machine 31 exists in locations A, B within the normal set range 117, the activation period T constitutes the maximum period T1.

However, when the mobile work machine 31 reaches the boundary location C of the normal set range 117, a determination is made that the mobile work machine 31 has departed the normal range, and that an abnormal situation has occurred (traveled outside authorized area), and to obtain detailed information of its travel locus, the activation period T becomes a period T2, which is shorter than the maximum period T1 (Refer to FIG. 23 (d)).

When the mobile work machine 31 reaches location D, which is further separated by a predetermined distance L0 from the boundary location of the normal set range 117, to obtain even more detailed information on its travel locus, the activation period T becomes a period T3, which is even shorter than the period T2 (Refer to FIG. 23 (d)). Thereafter, as the separation distance from the normal set range 117 increases, the activation period T can be set to T4 (<T3), and so forth, becoming sequentially shorter until it ultimately reaches period 0 (duty ratio D=1).

Furthermore, as shown in the graph of FIG. 23 (c), as the separation distance relative to the boundary location of the normal set range 117 becomes greater, the activation period T can be made consecutively shorter.

In line with the activation period T of the communication terminal 56 becoming shorter, the response to a request from a terminal 11 becomes faster. Furthermore, as will be explained hereinbelow, when the mobile work machine 31 is transmitting automatically, the transmission interval of mobile unit information, such as location information, becomes shorter.

Accordingly, in accordance with the mobile work machine 31 separating from the normal set range 117, a more detailed travel locus (a travel locus, the time interval between each displayed travel location of which is short) is displayed on a display screen of the terminal 11, which is the display-destination terminal. Thus, it is possible to deal quickly and accurately with an abnormal situation, such as mobile work machine 31 traveling outside of an authorized area. Moreover, because the ON, OFF duty ratio D of the activation of the communication terminal 56 increases in accordance with the mobile work machine 31 moving away from the normal set range 117, it is possible to hold down power consumption in line with communications, while at the same time accurately monitoring the abnormal situation.

FIG. 23 (b) shows a situation in which the activation period T becomes shorter and the duty ratio D becomes larger in conformance to mobile work machine 31 entering a set range 118 on a map.

The same as in FIG. 23 (a), a predetermined range 118, within which mobile work machine 31 would not normally be brought, is set on a map of a display screen of a terminal 11. This set range 118 is an abnormal area, for example, an area in which it is against the law to work, such as a foreign harbor, a hazardous work area, a nature conservation area, or the like.

Similar to the explanation given for FIG. 23 (a), the location of the mobile work machine 31 detected by the GPS sensor 57, and the boundary location of set range 118 are compared, and processing for changing the activation period T is executed in accordance with the results of this comparison.

FIG. 23 (d) shows a situation in which the activation period T is changed in accordance with a relative location (passage of time) in relation to the set range 118 of the mobile work machine 31.

As shown in FIG. 23 (b), when the mobile work machine 31 exists in locations A, B outside of the abnormal set range 118, the activation period T constitutes the maximum period T1.

However, when the mobile work machine 31 reaches the boundary location C of the abnormal set range 118, a determination is made that an abnormal situation has occurred (entered a hazardous area), and to obtain detailed information of the mobile work machine's 31 travel locus, the activation period T becomes a period T2, which is shorter than the maximum period T1 (Refer to FIG. 23 (d)).

When the mobile work machine 31 reaches location D, at which it has further penetrated the abnormal set range 118 by a predetermined distance L0 from the boundary location, to obtain even more detailed information on its travel locus, the activation period T becomes a period T3, which is even shorter than period T2 (Refer to FIG. 23 (d)). Thereafter, as the penetration distance into the abnormal set range 118 increases, activation period T can be set to T4 (<T3), and so forth, becoming sequentially shorter until it ultimately reaches period 0 (duty ratio D=1).

Furthermore, as shown in the graph of FIG. 23 (c), as the distance L relative to the boundary location of the abnormal set range 118 becomes greater, the activation period T can be made consecutively shorter.

In accordance with the mobile work machine 31 entering into the abnormal set range 118 like this, a more detailed travel locus (a travel locus, the time interval between each displayed travel location of which is short) is displayed on a display screen of the terminal 11, which is the display-destination terminal. Thus, it is possible to deal quickly and accurately with an abnormal situation, such as a mobile work machine 31 entering a hazardous area. Moreover, because the ON, OFF duty ratio D of the activation of the communication terminal 56 increases in accordance with the penetration of the mobile work machine 31 into the abnormal set range 118, it is possible to hold down power consumption in line with communications, while at the same time accurately monitoring the abnormal situation.

Furthermore, this embodiment is not limited to monitoring the abnormal situations hypothesized by FIGS. 23 (a), (b), but rather can also be used to monitor the route to the location where mobile work machine 31 is discarded and disposed of.

Further, the embodiment shown in FIGS. 23 (a) and 23 (b) is constituted such that the activation period T is univocally determined from only the distance L to a boundary line of a set range 117, 118, but the activation period T can also be determined by also taking factors other than distance L into consideration, such as orientation, surrounding geographical information, type of mobile unit, and mobile unit utilization period.

Figure 24A:
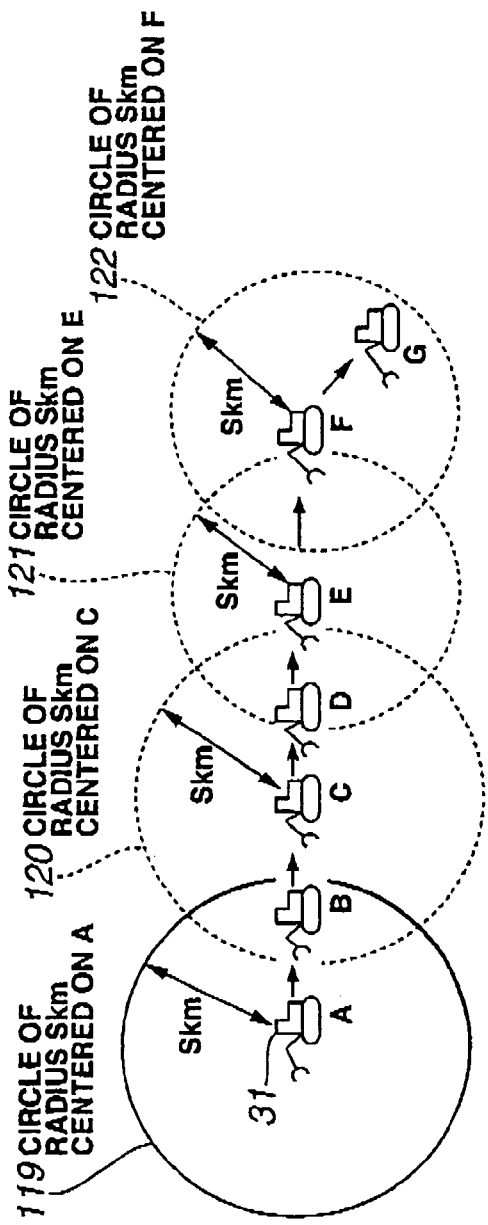
FIGS. 24(a) and 24(b) are diagrams illustrating the circumstances under which the duty ratio of a power-saving operation changes.
Figure 24B:
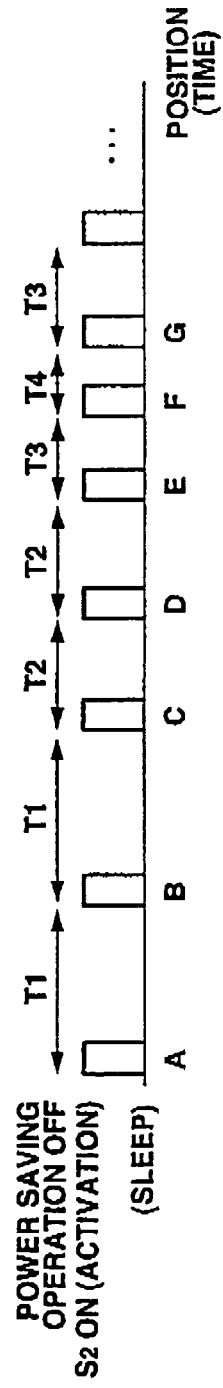

Further, the duty ratio D can also be changed in accordance with the extent of the change of location of mobile work machine 31 as shown in FIG. 24.

The activation of the communication terminal 56 of mobile work machine 31 is intermittently turned ON and OFF at a predetermined duty ratio D ($\times\pi/T\times100\%$) as shown in the above-described FIG. 7. And then, as shown in FIG. 7 (c), a power-saving operation is turned OFF (a power switch drive signal S2 is turned ON), and at the timing during which the communication terminal 56 is active, a signal indicating current location (in addition, mobile unit information, such as service meter values, remaining fuel, battery voltage, and vehicle error codes, can also be included) is sent to the communication satellite 9 from the communication terminal 56 in accordance with a request from a terminal 11. In accordance therewith, the sequential travel locations of the mobile work machine 31 are displayed on the terminal 11, which is the display-destination terminal.

The location of the mobile work machine 31 is detected by the GPS sensor 57 as shown in FIG. 2. In this case, if the power consumption of the GPS measurement devices (GPS antenna 59, GPS sensor 57, communication controller 54) is insufficient, these GPS measurement devices can be electrically connected directly to the battery 63 and operated at all times. Further, when the power consumption of these GPS measurement devices is high, similar to the communication terminal 56, the above-described sleep function can be turned ON and a power-saving operation can be turned ON and OFF, and the GPS measurement devices can be operated and measure a location only when a power-savings operation is ON (when the communication terminal 56 is active).

The current location detected for the mobile work machine 31 by the GPS sensor 57 at this activation, and the boundary location of circles 119, 120, and so forth of radius S, which have the locations detected at the last activation at their centers, are compared, and processing for changing the activation period T is executed in accordance with the results of this comparison.

FIG. 24 (b) shows a situation in which the activation period T changes in accordance to whether or not a mobile work machine 31 has moved outside of circles 119, 120 and so forth.

As shown in FIG. 24 (a), first the location A of mobile work machine 31 is detected by the GPS sensor 57, and a circle 119 of a radius S(km), which has location A at the center, is set on a map. The initial activation period T is set at the maximum period T1. Thus, the communication terminal 56 is started up after the period T1. It is supposed that the location detected by the GPS sensor 57 at that time was location B of the inside of circle 119. In this case, the activation period T is left at the maximum period T1 as-is. After another period T1, the communication terminal 56 is activated, and it is supposed that the location detected by the GPS sensor 57 at that time was location C of the outside of circle 119. In this case, a circle 120 of a radius S(km), which has location C at the center, is set on the map, and, in addition, the activation period T is changed to a period T2, which is shorter than the maximum period T1.

Thus, after the period T2, the communication terminal 56 is activated. It is supposed that the location detected by the GPS sensor 57 at that time was location D of the inside of circle 120. In this case, the activation period T is left at the period T2 as-is. After another period T2, the communication terminal 56 is activated, and it is supposed that the location detected by the GPS sensor 57 at that time was location E of the outside of circle 120. In this case, a circle 121 of a radius S(km), which has location E at the center, is set on the map, and, in addition, the activation period T is changed to a period T3, which is shorter than the period T2. Furthermore, after the period T3, the communication terminal 56 is activated, and it is supposed that the location detected by the GPS sensor 57 at that time was location F of outside of circle 121. In this case, a circle 122 of a radius S(km), which has location F at the center, is set on the map, and, in addition, the activation period T is changed to a period T4, which is shorter than the period T3. Thus, after the period T4, the communication terminal 56 is activated. It is supposed that the location detected by the GPS sensor 57 at that time was location G of the inside of circle 122. In this case, the activation period T is returned from the period T4 to the period T3, which is longer (Refer to FIG. 24 (b)).

Furthermore, in the embodiment shown in FIG. 24 (a), areas of circles 119, 120 and so forth of radius S are set, but instead of this, the embodiment can be constituted to set square areas having a side S.

In the case of a square area, it is advantageous in that, when the current location detected at this activation by the GPS sensor 57, and the boundary location of the area, which has the location detected at the last activation at its center, are compared, a determination as to whether or not the mobile work machine 31 is outside the area can be made simply by subtracting the latitude and the longitude on the map without having to perform a complex operation.

Further, an embodiment, which treats areas 119, 120 and so forth shown in FIG. 23 (a) as a shape other than a circle or square is also possible. For example, an elliptic or rectangular area, which is elongated in either of the two directions of latitude or longitude, can also be used. Alternatively, the area may take an elliptic or rectangular shape extending in the direction in which the mobile work machine 31 travels. In this case, a determination as to whether or not the mobile work machine 31 has gone outside an area can be made more rapidly and more accurately.

Further, the size of the areas 119, 120 and so forth, more specifically, the value of the radius S(km) if the areas are circles, can be changed in accordance with the amount of movement.

Thus, in the case of FIGS. 24 (*a*) and 24 (*b*), the activation period T becomes shorter, and a more detailed travel locus (a travel locus, the time interval between each displayed travel location of which is short) is displayed on a display screen of the terminal 11, which is the display-destination terminal, equivalently in accordance with the travel velocity of mobile work machine 31 increasing. For this reason, it is possible to accurately comprehend, via the terminal 11, a condition, in which work has been completed at one work site, and the mobile work machine 31 is moving to the next work site. Thus, the work efficiency of process management and transport management is dramatically improved. Moreover, because the ON, OFF duty ratio D of the activation of the communication terminal 56 is increased in conformance with the travel velocity of the mobile work machine 31 becoming greater, accurate monitoring during travel, and the curbing of power consumption in line with communications can be realized simultaneously.

Figure 25:
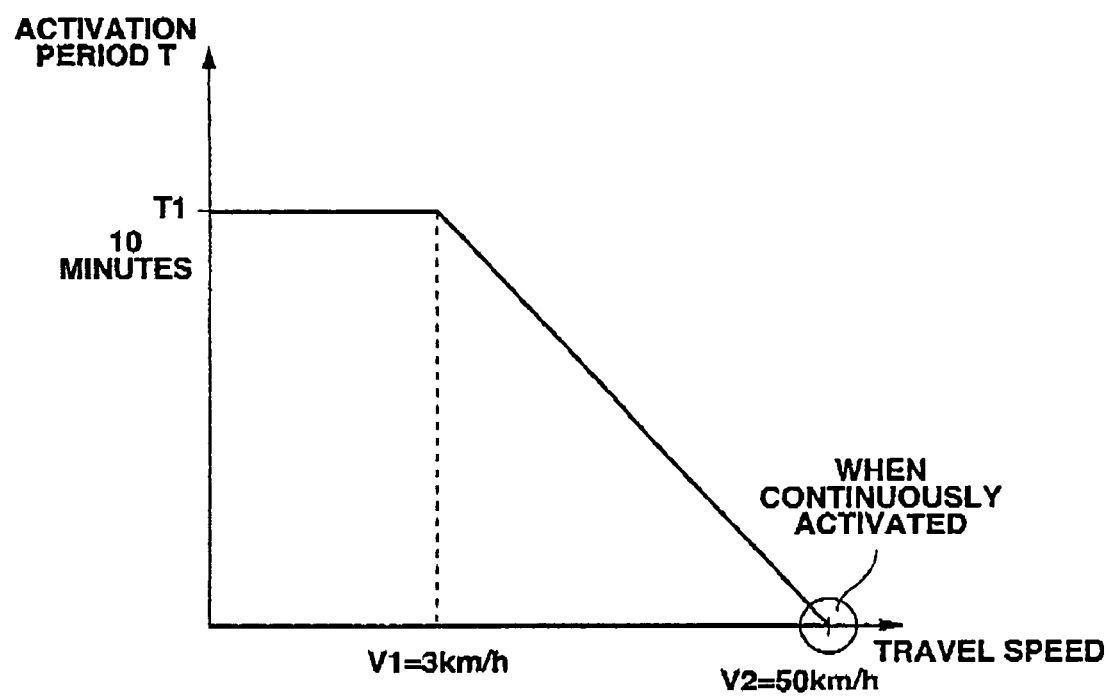
FIG. 25 is a graph showing the circumstances under which the start-up period of a communication terminal changes.

The embodiment shown in FIGS. 24 (*a*) and 24 (*b*) is constituted such that the activation period T is changed in accordance with whether or not the mobile work machine 31 has gone beyond areas 119, 120 and so forth, which are set up sequentially, but as shown in the graph of FIG. 25, the travel velocity V of the mobile work machine 31 can be computed for each activation period T, and the activation period T can be changed in accordance with the size of the computed velocity V thereof.

In the embodiment shown in this FIG. 25, similar to the embodiment of FIGS. 24 (*a*) and 24 (*b*), each time the communication terminal 56 is started up, the location of the mobile work machine 31 is detected by the GPS sensor 57.

And then, the travel velocity V is computed using the below equation:

*V*=(location detected at this activation−location detected at last activation)/current activation period *T*

The relationship between the travel velocity V and the activation period T is shown in the graph of FIG. 25. When the travel velocity V is slow enough, that is, less than velocity V1 (=3 km/h), the activation period T is set at the maximum period T1 (=10 minutes). As the travel velocity V increases from V1 to the cruising velocity V2 (=50 km/h) when transported by a trailer, the activation period T becomes shorter. And then, when the travel velocity V reaches the cruising velocity V2, the activation period T becomes 0 (duty ratio D is 1), that is, the communication terminal 56 is in a continuously active state.

The activation period T is determined by finding the activation period T corresponding to the travel velocity V determined by the above operational expression from the graph shown in FIG. 25.

Thus, in accordance with the travel velocity V of a mobile work machine 31 increasing, the activation period T becomes shorter, and a more detailed travel locus (a travel locus, the time interval between each displayed travel location of which is short) is displayed on a display screen of the terminal 11, which is the display-destination terminal. For this reason, it is possible to accurately comprehend on the terminal 11 side a condition, in which work has been completed at one work site, and the mobile work machine 31 is moving to the next work site. Further, at the cruising velocity V2 of a transport vehicle (trailer) 35, because the communication terminal 56 constitutes a continuously active state, and the travel location of the mobile work machine 31 is displayed at all times, it becomes possible to constantly monitor on a display screen of a terminal 11 a situation, in which, for example, a trailer 35, which according to the rules is not permitted to travel on an expressway, is traveling carrying the mobile work machine 31. Thus, the work efficiency of process management and transport management is dramatically improved. Moreover, because the ON, OFF duty ratio D of the activation of the communication terminal 56 increases in conformance with the travel velocity of the mobile work machine 31 becoming greater, accurate monitoring during travel, and the curbing of power consumption in line with communications can be realized simultaneously.

In the above-described embodiment, the activation of the communication terminal 56 is performed intermittently at predetermined periods T, but the activation of the communication terminal 56 can also be performed intermittently each time it becomes a specified time.

For example, an embodiment, which activates the communication terminal 56 when it is a specified time at which communications between the communication satellite 9 and mobile work machine 31 can be carried out satisfactorily, is also possible. This specified time corresponds to the location (altitude) of the communication satellite 9.

FIG. 13 (*a*) shows the physical relationship of the communication satellite 9 and the mobile work machine 31. Mountains, buildings and other obstacles 123 to communications exist in the communication satellite path (radio communication satellite channel 5) between the communication satellite 9 and the mobile work machine 31.

When the altitude of the communication satellite 9 is high (when the maximum angle of elevation is large), there is little communication satellite interference due to obstacles 123, and the state of communications is good. Accordingly, when it becomes the time at which the altitude of the communication satellite 9 is high, the communication terminal 56 is activated, and communications with the communication satellite 9 is performed.

However, to activate the communication terminal 56, it is necessary to store in advance data on the flight position of the communication satellite 9 at the mobile work machine 31 side.

The flight position data of the communication satellite 9 changes daily. Thus, if an attempt is made to store flight position data for all dates in mobile work machine 31 memory, this will give rise to insufficient memory capacity and memory occupation problems.

Accordingly, in this embodiment, a predetermined quantity of flight position data 124 is sent via a radio communication channel 5 to the mobile work machine 31 from the communication satellite 9 as shown in FIG. 13 (*a*).

A clock is provided on the inside of the communication terminal 56 of the mobile work machine 31. Consequently, by collating the received flight position data 124 against the time clocked by the clock, a determination is made as to whether or not to activate the communication terminal 56.

FIG. 13 (*b*) shows the flight position data of the communication satellite 9 for a certain date.

In this FIG. 13 (*b*), "AOS" indicates the time and azimuth angle at which the communication satellite 9 appears on the horizon, "MEL" indicates the time and azimuth angle when the communication satellite is at the maximum angle of elevation, and "LOS" indicates the time and azimuth angle at which the communication satellite 9 disappears over the horizon. The path of the communication satellite 9, which corresponds to an enclosed portion, is shown in FIG. 13 (c).

In the communication terminal 56 of the mobile work machine 31, processing, which activates the communication terminal 56 at a time when a maximum angle of elevation of greater than a predetermined threshold value (for example, 45 degrees) is obtained from the flight position data 124 shown in FIG. 13 (b), in other words, at the times 4:33, 16:28 at which maximum angles of elevation 66°, 54° are obtained, is executed. That is, when it becomes the specified times 4:33, 16:28, the main power circuit of the communication terminal 56 is driven, and a signal designating mobile unit information is sent to the communication satellite 9 via a radio communication channel 5.

Further, as for the flight position data 124, for example, new data is sent from the communication satellite 9 to the mobile work machine 31 via the radio communication channel 5 every day at the above specified times. In accordance therewith, the content of the flight position data 124 stored in the memory of the mobile work machine 31 is updated.

As described hereinabove, according to the embodiment shown in FIG. 13, because the communication terminal 56 is activated whenever it becomes a specified time at which communications between the communication satellite 9 and the mobile work machine 31 can be performed satisfactorily, power savings can be achieved, and, in addition, communications between the communication satellite 9 and the mobile work machine 31 can be carried out with certainty. Further, since the flight position data 124 is received from the outside via communications, insufficient memory capacity and memory occupation problems are not incurred.

Further, in the above-described embodiment, activation of the communication terminal 56 is performed intermittently at predetermined periods T, but, for example, an embodiment, in which this activation period T is arbitrarily changed from the management-side terminal 11, is also possible. In this case, as explained hereinabove, e-mail describing change-data to the effect that the activation period T is to be changed is sent from terminal 11 to mobile work machine 31 having this mobile work machine 31 as the e-mail address. And then, the change-data described in the e-mail is read out in the communication terminal 56 of the transmission-destination mobile work machine 31, and the activation period T is changed in accordance with the content of this change-data.

For example, when the service meter of the mobile work machine 31 goes beyond a predetermined value (when becomes obsolete), the activation period T is shortened to diligently perform status monitoring at short intervals, and when the mobile work machine 31 is rented to a certain user (when there is no need for monitoring), or when it is resting for a long time (when it is clear that operation has stopped), the activation period T is lengthened to increase the monitor interval, and to reduce wasteful power consumption and communication channel charges. Furthermore, it is also possible to simultaneously change to the same activation period T for a plurality of mobile units, which are working and traveling as a group.

In this manner, according to this embodiment, it is possible to change an activation period T at the terminal 11 side via a remote operation while monitoring the status of a mobile unit and the surrounding situation. Thus, it is not necessary to dispatch a worker to the respective sites of mobile units 31, 32, and so forth to perform the work of changing the activation period T, greatly reducing the workload.

In this manner, according to this embodiment, even construction machine and other mobile units 31–35, the engines of which are not operated for long periods of time, can communicate with a plurality of terminals 11, 12 and so forth while their engines are OFF, and are capable of responding to requests from terminals 11, 12 and so forth, and, in addition, wasteful power consumption can be held in check. Further, as shown in FIG. 7 (c), the electrical connection between the battery 63 and the communication terminal 56 is intermittently turned ON and OFF (duty ratio $D=(\tau/T) \times 100\%$), and the ON state of the electrical connection is not generated by receiving a request signal from a terminal 11, 12 and so forth. For this reason, it is possible for the mobile work machine 31 side to transmit mobile unit information on its own even when the engine is stopped.

The embodiment for intermittently turning ON this communication channel power source is not limited to the communication device shown in FIG. 1, and can be applied to an arbitrary communication device. This embodiment is applicable so long as a communication device comprises at the least two communication channel stations, and communications are performed between two communication stations.

Now, in the above-described embodiment, it is supposed that only when there is a request for mobile unit information from a request-origination terminal (for example, terminal 11) to a request-destination mobile unit (for example, mobile work machine 31) is mobile unit information displayed on a display-destination terminal (for example, terminal 12).

The embodiment described hereinbelow is constituted such that, if a parameter on the inside of a mobile unit is a specified value, specified mobile unit information is automatically transmitted, and this specified mobile unit information is displayed on a terminal even under conditions in which there is no request from the terminal side.

According to this embodiment, it is possible to recognize an abnormal condition (for example, a malfunction), which occurs in a mobile unit, which cannot be constantly managed and monitored by the terminal side, and it is possible to accurately comprehend an operating state and a resting state of the mobile unit.

Now, it is supposed that an internal parameter of mobile work machine 31, for example, the start state of the engine, is detected by a predetermined sensor from among a group of sensors 62 (for example, the sensor for detecting an alternator voltage value) as shown in FIG. 2. This sensor detection signal, as explained hereinabove, is inputted to the communication terminal 56 via the communication controller 54 by being described in a frame signal and sent out over the signal wire 52 by the electronic control controller 53. Furthermore, if the ON, OFF states of an engine can be monitored by the communication terminal 56, then a well-known technology other than this method can also be utilized.

Figure 26:
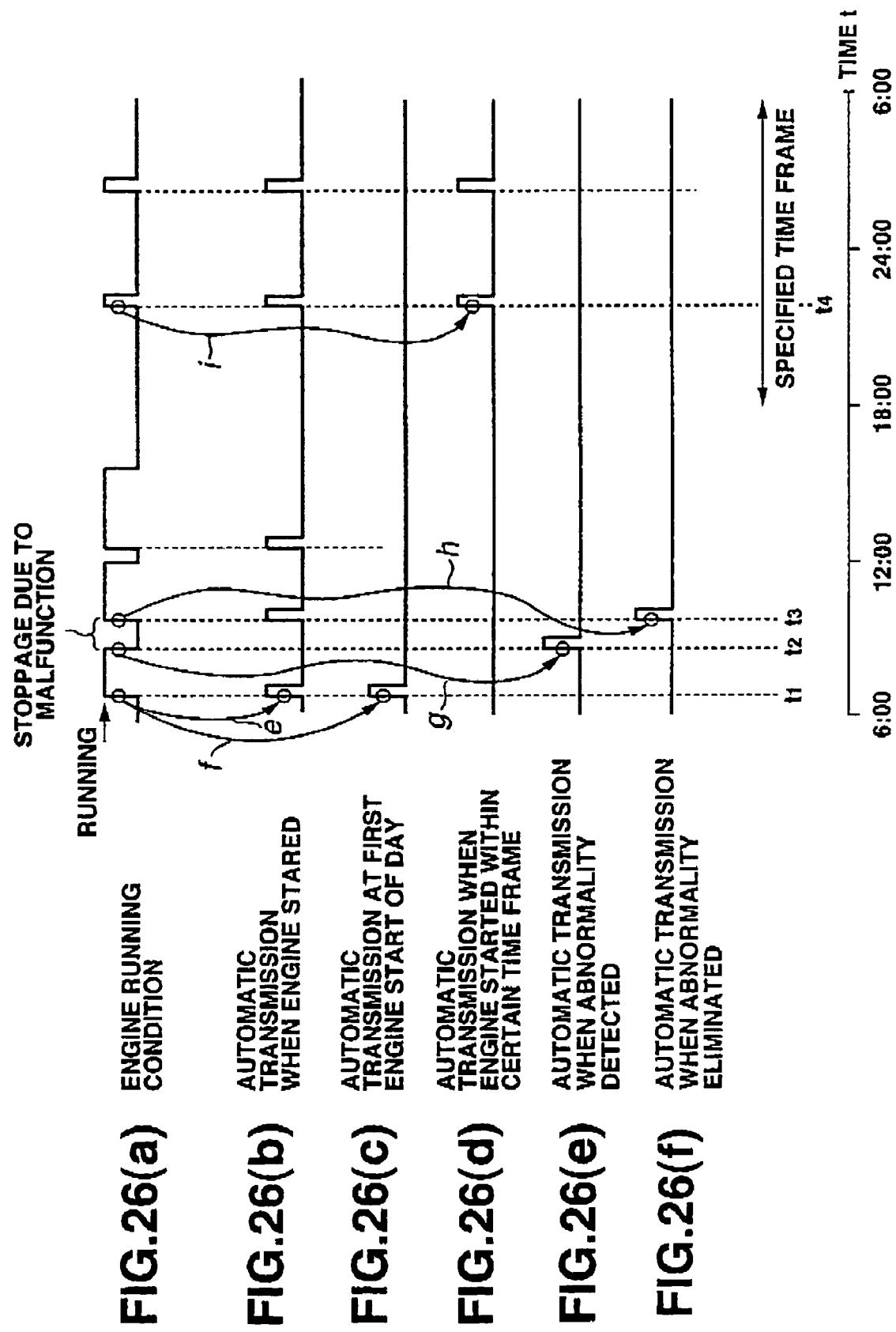
FIGS. 26(a) to 26(f) are timing charts illustrating the circumstances under which an automatic transmission is performed from a mobile unit.

FIG. 26 (a) shows a signal designating the start state of an engine, which is inputted into the communication terminal 56 of the mobile work machine 31. FIG. 26 (a) shows the engine start state of each time t of the day (from 6:00 AM until the 6:00 AM the next day), a logical "1" level corresponds to a state in which the engine is running (started), and a logical "0" level corresponds to a state in which engine operation is stopped.

An automatic transmission from the mobile work machine 31, for example, can be performed at the timing of each engine start as shown in FIG. 26 (*b*).

That is, as shown in FIG. 26 (*a*), when the engine is started at timing t1, and a signal indicating the engine is started is inputted into the communication terminal 56, this signal acts as a trigger as indicated by arrow e, and specified mobile unit information, in other words, the current location of the mobile work machine 31, is incorporated in e-mail, and sent to the communication satellite 9 as e-mail. It is supposed that the e-mail address to which this e-mail is addressed is server terminal 21. When the communication terminal 56 is sleeping as a result of an above-described power-saving operation, this e-mail is sent after the engine has been started and forcibly activated.

Consequently, if it is supposed that server terminal 21 is a management-side terminal, the sequential locations of each time the engine is started by the mobile work machine 31 are displayed on a display screen of the management-side terminal 21. Accordingly, it is possible for a manager to grasp the history of locations of each time the engine is started by a mobile work machine 31 on the display screen without having to carry out a request input operation on his own, it is possible to perceive an abnormal situation, which occurs to the mobile work machine 31, which is incapable of being managed and monitored at all times, and it is possible to accurately comprehend an operating state and a resting state of the mobile work machine 31.

Further, e-mail can also be sent from the mobile work machine 31 having another terminal 11, terminal 12, and so forth as the e-mail address.

Further, an automatic transmission from the mobile work machine 31 can also be performed at the timing of the initial engine start of the day as shown in FIG. 26 (*c*).

That is, as shown in FIG. 26 (*a*), when the engine is started at timing t1, a start signal indicating that the engine is started is inputted into the communication terminal 56. Here, a clock is provided on the inside of the communication terminal 56, and a determination is made as to whether or not this start signal is the signal initially inputted during the day (from 6:00 until 6:00 the next day). Only when the inputted start signal is determined to be the initially inputted start signal is this start signal treated as a trigger, and, as indicated by arrow f, the current location of the mobile work machine 31 is incorporated into e-mail, and sent to the communication satellite 9 as e-mail. Accordingly, a history of locations of the mobile work machine 31 is similarly displayed on a management-side terminal. According to this embodiment, since the automatic transmission interval is at the least one day, communication charges can be held down compared to the case of FIG. 26 (*b*).

Furthermore, this embodiment is constituted such that an automatic transmission is performed only when the engine is initially started for the day, but the period can be set arbitrarily, and, for example, can also be set such that automatic transmission is performed only when the engine is initially started for the week.

Further, this embodiment may be constituted such that an automatic transmission from the mobile work machine 31 is performed at engine starting time at a specified time period during the day (for example, for the time period 18:00 to 6:00) as shown in FIG. 26 (*d*).

That is, as shown in FIG. 26 (*a*), when the engine is started at timing t4 within the time period of 18:00 to 6:00, and a signal indicating the engine is started is inputted to the communication terminal 56, this signal serves as a trigger, and, as indicated by arrow i, the current location of the mobile work machine 31 is incorporated into e-mail, and is sent to the communication satellite 9 as e-mail. Accordingly, a history of locations at a specified time period of the mobile work machine 31 is similarly displayed on a management-side terminal. Here, the specified time period (night-time) of 18:00 to 6:00 is a time period during which construction machine and other such mobile work machine are normally not operated. It is also a time period during which long-term movement is not carried out. There is the danger that the starting of the engine and the moving of the mobile work machine 31 during this specified time period signifies that some sort of abnormality has occurred. Since a history of the locations of the mobile work machine 31 during this specified time period are displayed on a management-side terminal, by monitoring this display screen, it is possible to make a determination as to the fact that some sort of abnormality has occurred to the mobile work machine 31.

Further, this embodiment may also be constituted such that an automatic transmission from the mobile work machine 31 is performed at the timing at which the engine stops due to an abnormality as shown in FIG. 26 (*e*).

Here, as shown in FIG. 2, an abnormality, which has occurred in the mobile work machine 31, for example, an abnormality such as "high engine speed," "high engine exhaust temperature," "high cooling water temperature," "low battery voltage," or "low fuel quantity" is detected by a predetermined sensor among a group of sensors 62. This sensor detection signal, as explained hereinabove, is inputted to the communication terminal 56 via the communication controller 54 by being described as an error code (for example, "Abnormal item: low fuel quantity") in a frame signal and sent out over the signal wire 52 by the electronic control controller 53. Furthermore, if the vehicle abnormality can be monitored by the communication terminal 56, then a well-known technology other than this method can also be utilized.

As shown in FIG. 26 (*a*), when engine operation is stopped at timing t2, a stop signal indicating that the engine is stopped is inputted into the communication terminal 56. At this point, the above-mentioned error code is inputted into the communication terminal 56. And then, a determination is made as to whether or not the stop signal and error code were inputted at the same time. When the stop signal and error code are inputted at the same time, a determination is made that the engine was stopped due to an abnormality (malfunction), this stop signal serves as a trigger, and, as indicated by arrow g, the current location of the mobile work machine 31 is incorporated into e-mail, and is sent to the communication satellite 9 as e-mail. Accordingly, the location of the mobile work machine 31 is similarly displayed on a management-side terminal. According to this embodiment, since the location of a mobile work machine 31 is displayed on the terminal side only when an abnormality is detected and the engine is stopped, the location of the mobile work machine 31 at the time the abnormality occurred can be accurately grasped. Accordingly, the abnormality can be dealt with quickly, and the damage to the mobile work machine 31 can be held to the minimum.

Further, an automatic transmission is not simply carried out when an abnormality occurs, but rather, this embodiment can also be constituted such that specific abnormality items (serious abnormality items) are set in advance among the abnormality items (error codes), and an automatic transmission is performed only when these serious abnormalities occur.

Further, this embodiment can also be constituted such that an automatic transmission from the mobile work machine 31 is performed at the timing of engine start resulting from the annulment of an abnormality as shown in FIG. 26 (f).

That is, as shown in FIG. 26 (a), when the engine is started at timing t3, a start signal indicating that the engine has started is inputted to the communication terminal 56. At this point, the above-mentioned error code is inputted into the communication terminal 56. When a serviceman takes the prescribed actions related to the abnormality, and the abnormality (malfunction) is annulled, the error code is not longer inputted into the communication terminal 56. A determination is made as to whether or not the engine started when the error code ceased to be inputted into the communication terminal 56. When the engine started at the time the error code ceased to be inputted into the communication terminal 56, it is determined that the abnormality (malfunction) was annulled, and the engine was started, this start signal serves as a trigger, and, as indicated by arrow h, the current location of the mobile work machine 31 is incorporated into e-mail, and sent to the communication satellite 9 as e-mail. Accordingly, the location of the mobile work machine 31 is similarly displayed on a management-side terminal. According to this embodiment, since the location of the mobile work machine 31 is displayed on the terminal side only when an abnormality is annulled and the engine is started, it is possible to accurately grasp the location of the mobile work machine 31 when an abnormality was properly dealt with.

Further, this embodiment can also be constituted such that specified mobile unit information, for example, the operation map (record showing engine operation from a certain hour and minute to a certain hour and minute) up until 23:00 of this day, is automatically transmitted from mobile work machine 31 at a specified time (for example, at 23:00). In accordance therewith, as shown in FIG. 30, an operation map for each day is displayed on a display screen of the terminal side.

Further, this embodiment can also be constituted such that specified mobile unit information is automatically transmitted from mobile work machine 31 at a specified time every few days (for example, at 23:00 every third day).

Further, this embodiment can also be constituted such that specified mobile unit information is automatically transmitted from mobile work machine 31 at a specified time each specified day of the week (for example, at 23:00 every Saturday).

As described above, since specified mobile unit information is sent at a specified time, specified mobile unit information of mobile work machine 31 can be acquired regularly from a display screen of the terminal side.

Further, when the cumulative value of the operating time of mobile work machine 31 constitutes a specified operating-time cumulative value, for example, when the absolute value of the service meter reaches 100 hours, 300 hours, or 500 hours, specified mobile unit information (for example, "service meter," "vehicle warning 1 (error code 1)," "vehicle warning 2 (error code 2)," "battery voltage," "engine water temperature," "engine speed," "pump pressure" or "oil quantity") can be automatically transmitted.

Thus, since specified mobile unit information is sent when the cumulative operating time constitutes a specified operating-time cumulative value, preliminary information for carrying out regular inspections authorized by law can be acquired via a display screen of the terminal side. Further, since this specified operating-time cumulative value is automatically transmitted in accordance with the progress of operating time (load), wasteful communications can be avoided during rest periods, and communication costs can be held in check.

Further, each time the cumulative value of the operating time of the mobile work machine 31 increases by a specified amount, for example, each time the incremental value of the service meter increases by 100 hours from the last automatic transmission (or each time 500 hours elapses), specified mobile unit information (for example, "service meter," "vehicle warning 1 (error code 1)," "vehicle warning 2 (error code 2)," "battery voltage," "engine water temperature," "engine speed," "pump pressure" or "oil quantity") can be automatically transmitted. Furthermore, setting the incremental value of the service meter can be done by matching it up with the patrol time of a service vehicle 34.

Thus, since specified mobile unit information is sent each time the operating-time cumulative value increases by a specified amount, preliminary information for carrying out regular inspections authorized by law can be acquired via a display screen of the terminal side. Further, when this specified operating-time cumulative value is displayed on a management-side terminal, patrol instructions can readily be given to the service vehicle 34. Further, when this specified operating-time cumulative value is displayed on the terminal of the serviceman side, the mobile work machine requiring service can be readily specified, and service can be rapidly carried out by the service vehicle 34. Further, since this specified operating-time cumulative value is automatically transmitted in accordance with the progress of operating time (load), wasteful communications can be avoided during rest periods, and communication costs can be held in check.

Many variations are possible regarding the above-described embodiment. Hereinbelow, explanations will be given with regard to FIG. 9, FIG. 10, FIG. 11, FIG. 12 and FIG. 14.

The above-mentioned automatic transmission may be performed when the location of mobile work machine 31 changes.

The location of mobile work machine 31 is detected by the GPS sensor 57 as shown in FIG. 2. The detection results of the GPS sensor 57 are inputted into the communication controller 54. When a determination is made by the communication controller 54 that the location of mobile work machine 31 has changed, post-change location information is sent to the communication terminal 56 as transmission data. Then, e-mail, in which the location information is described, is automatically transmitted from the communication terminal 56 via the satellite communication antenna 58.

Thus, since location information is sent each time the location of the mobile work machine 31 changes, the movement history of the mobile work machine 31 can be acquired via a display screen of the terminal side.

Further, this embodiment can also be constituted such that an automatic transmission is performed when mobile work machine 31 departs from a specified set range 129 as shown in FIG. 10.

The location of the mobile work machine 31 is detected by the GPS sensor 57 as shown in FIG. 2. The detection results of the GPS sensor 57 are inputted into the communication controller 54. Work site location information is stored in the communication controller 54. This set range 129 of the work site is a circle of radius S(km). Accordingly, the detected location of the mobile work machine 31 is compared against the boundary location of the set range 129, and a determinations is made as to whether or not the mobile work machine 31 has departed from the set range 129. When the mobile work machine 31 reaches the boundary location J of the set range 129, the location information of the mobile work machine 31 at that time is sent to the communication terminal 56 as transmission data. Then, e-mail, in which the location information is described, is automatically transmitted from the communication terminal 56 via the satellite communication antenna 58.

Thus, since location information is sent when the mobile work machine 31 departs from the set range 129 (when it goes beyond a set location), monitoring whether or not the mobile work machine 31 is operating within a work site can be readily performed via a display screen on the terminal side. Further, the set range 129 is not limited to the fixed range of a work site, but can also be a range having at its center a location, where the mobile work machine 31 was in the past. In other words, a set range can be updated in line with the passage of time.

Further, the shape of a set range 129 is not limited to a circle, but rather can be an arbitrary shape, such as an elliptic, a square or a rectangle, or an elliptic or rectangle, which has the direction of travel of the mobile work machine 31 as the longitudinal direction.

The set range 129 shown in FIG. 10 can also be a range equivalent to the normal range 117 shown in FIG. 23 (*a*).

Further, this embodiment can also be constituted such that an automatic transmission is carried out when the quantity of change of the mobile work machine 31 movement location exceeds a set value as shown in FIG. 10.

The location of the mobile work machine 31 is detected by the GPS sensor 57 as shown in FIG. 2. The detection results of the GPS sensor 57 are inputted into the communication controller 54 at a fixed sampling cycle. In the communication controller 54, the travel velocity V of a mobile work machine 31 is computed based on the difference value between the location detected last time and the location detected this time, and the sampling time. Accordingly, the travel velocity V of the mobile work machine 31 is compared against the set value V2 (FIG. 25), and a determination is made as to whether or not the travel velocity V of the mobile work machine 31 has exceeded the set value V2. When the travel velocity V of the mobile work machine 31 exceeds the set value V2, the location information of the mobile work machine 31 at that time is sent to the communication terminal 56 as transmission data. Then, e-mail, in which the location information is described, is automatically transmitted from the communication terminal 56 via the satellite communication antenna 58.

Thus, since location information is sent when the travel velocity V of the mobile work machine 31 exceeds the set value V2, monitoring the movement status of the mobile work machine 31 can be readily performed via a display screen of the terminal side. That is, construction machine and other such mobile work machine 31 travel at extremely low speeds. Therefore, if the set value V2 is set at a high speed not normally attainable by a mobile work machine 31 traveling under its own power, for example, the speed when a trailer 35 cruises on an expressway, when the travel velocity V of the mobile work machine 31 exceeds the set value V2, a determination can be made that the mobile work machine 31 is being transported by a trailer 35. Further, when the mobile work machine 31 is being transported by a trailer at a time, and under conditions which transport is not normally carried out, it is possible to recognize that an abnormal situation has occurred, and it becomes possible to take appropriate action quickly.

Figure 9:
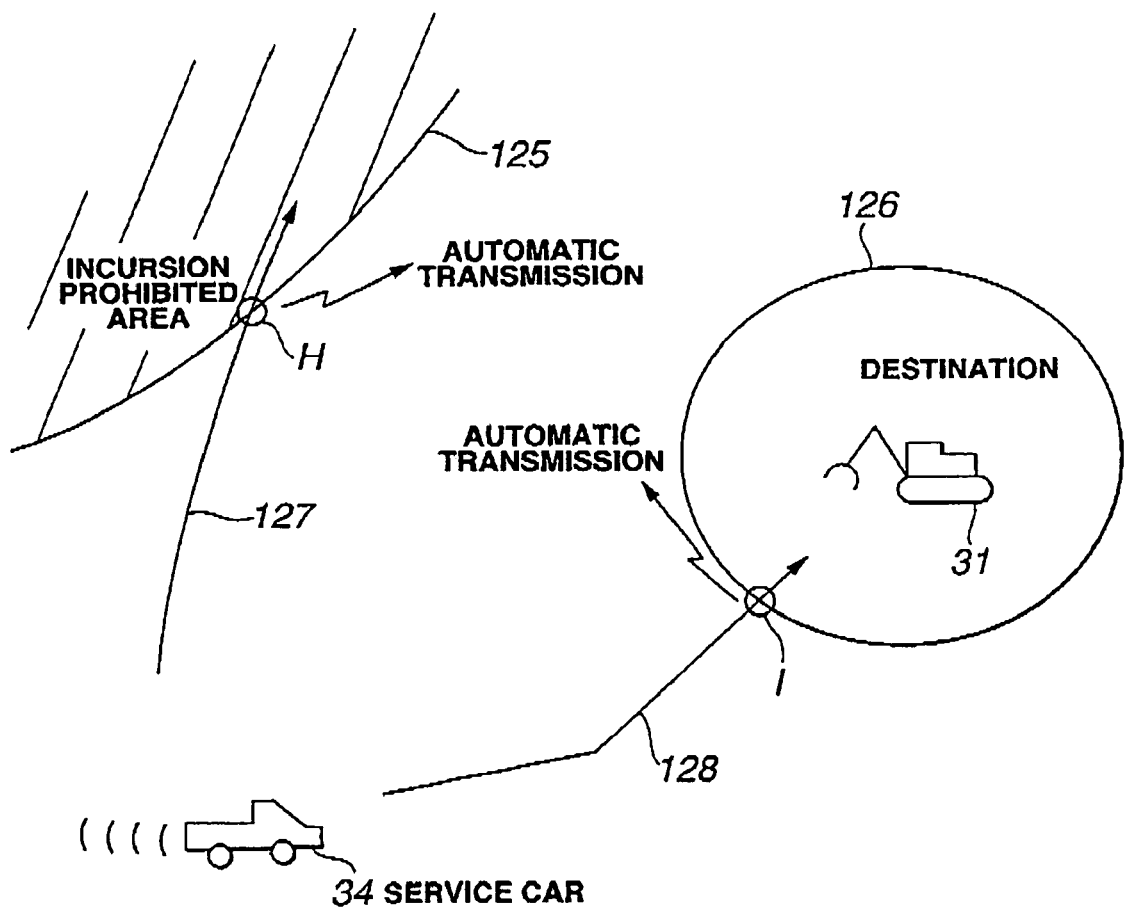
FIG. 9 is a diagram illustrating the circumstances under which an automatic transmission is made from a mobile unit.
Figure 14:
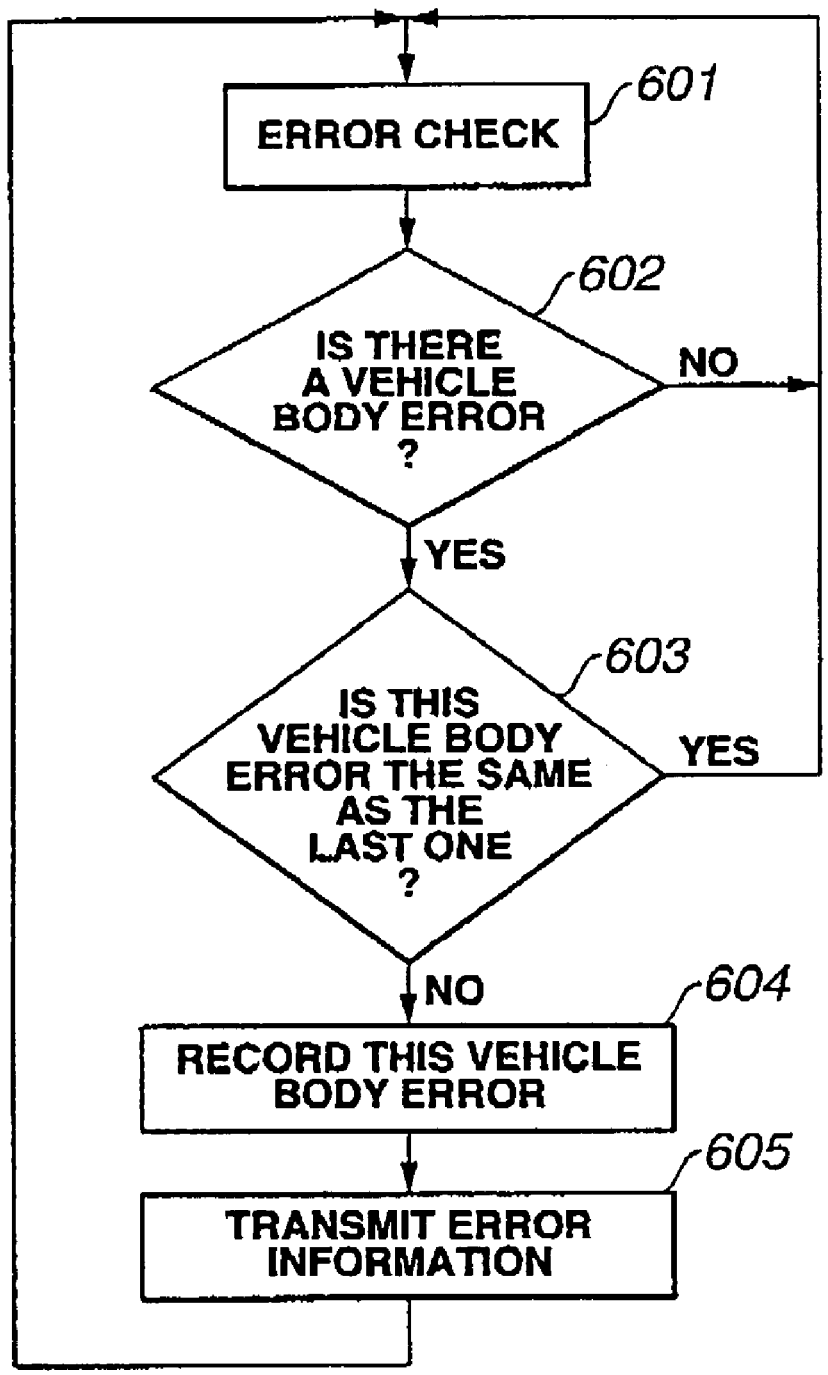
FIG. 14 is a flowchart showing the processing procedures when an automatic transmission from a mobile unit is performed.

Further, this embodiment can also be constituted such that an automatic transmission is performed, when a service vehicle 34 enters a specified set range 125, 126 as shown in FIG. 9.

The location of a service vehicle 34 is detected by the GPS sensor 57 as shown in FIG. 2. The detection results of the GPS sensor 57 are inputted into the communication controller 54. Location information of a destination 126, where the mobile work machine 31 targeted for service is located, and an access prohibited area 125 is stored in the communication controller 54. The set range 126 of this destination is a circle of a predetermined radius having the location of the mobile work machine 31 at its center. The access-prohibited area 125, for example, is a road under restriction due to heavy rains, or an area in which the foundation is not solid.

Accordingly, the detected location of the service vehicle 34 is compared against the boundary location of a set range 125, 126, and a determination is made as to whether or not the service vehicle 34 has entered either set range 125 or 126. When the service vehicle 34 travels along route 127 or route 128, and reaches either boundary location H or I of set range 125 or 126, the location information of the service vehicle 34 at that time is sent to the communication terminal 56 as transmission data. Then, e-mail in which the location information is described is automatically transmitted from the communication terminal 56 via the satellite communication antenna 58.

Thus, since location information is sent when the service vehicle 34 enters either set range 125 or 126, monitoring of whether or not the service vehicle 34 has reached the destination, or whether or not it had entered the access-prohibited area can be readily performed via a display screen of the terminal side. That is, a manager can perceive from the terminal display screen that the service vehicle 34 has reached the destination 126 and will commence service work, and, in addition, the manager can perceive a dangerous situation, in which the service vehicle 34 as entered an access-prohibited area 125. Thus, appropriate work instructions data (Message: "Return when finished," or "Avoid access-prohibited area") can be sent to the service vehicle 34 from a management-side terminal as described above (Refer to FIG. 4).

Furthermore, the shape of the set range 126 of the destination is not limited to a circle, and can be an arbitrary shape, such as an elliptic, square or rectangle.

Further, the set ranges 125, 126 shown in FIG. 9 can be ranges equivalent to the abnormal range 118 shown in FIG. 23 (*b*).

Further, this embodiment can be constituted such that an automatic transmission is performed when the amount of data to be sent either accords with a set value or exceeds a set value as shown in FIG. 11.

In a communication device, which utilizes a meter-rate billing system, the communication charge paid per usage is a fixed monthly amount up to a predetermined quantity of data Do as shown in FIG. 11 (*a*). When the quantity of data D exceeds a set value Do, it is necessary to pay additional charges in proportion to the quantity of excess data.

Accordingly, specified mobile unit information, which is transmitted automatically from mobile work machine 31 is collected and stored in the communication controller 54. The stored data quantity D is compared against the set value (80% of Do) in the communication controller 54. Then, as shown in FIG. 11 (*b*), when the stored data quantity D coincides with the set value (80% of Do), stored mobile unit information is sent to the communication terminal 56 as transmission data. And then e-mail, in which the mobile unit information is described, is automatically transmitted from the communication terminal 56 via the satellite communication antenna 58.

Thus, since mobile unit information is sent when the data quantity D to be automatically transmitted coincides (or exceeds) the set value, the maximum quantity of mobile unit information within a fixed payment amount can be displayed on a display screen of the terminal side.

Further, this embodiment can also be constituted such that an automatic transmission is performed when the fuel quantity either coincides with a set value or is less than the set value as shown in FIG. 12 (*a*).

Fuel quantity is detected by a group of sensors 62 inside mobile work machine 31, and sequentially sent to the communication controller 54. In the communication controller 54, the detected fuel quantity is compared against a set value. Then, as shown in FIG. 12 (*a*), when the detected fuel quantity coincides with the set value, mobile unit information ("location," "fuel quantity") is sent to the communication terminal 56 as transmission data. And then, e-mail, in which the mobile unit information is described, is automatically transmitted from the communication terminal 56 via the satellite communication antenna 58.

Thus, since mobile unit information is sent when the fuel quantity coincides with the set value (or is less than the set value), it is possible to perceive when the time has come to replenish the fuel from a display screen on the terminal side. For this reason, it is possible to send appropriate work instructions data (Message: "Replenish fuel") to a service vehicle 34, which carries out refueling patrol services, from a management-side terminal the same as in FIG. 3 and FIG. 4.

Further, this embodiment can also be constituted such that an automatic transmission is performed when the voltage of the battery 63 either coincides with a set value or is less than the set value as shown in FIG. 12 (*b*).

Battery 63 voltage values are detected by a group of sensors 62 inside mobile work machine 31, and sequentially sent to the communication controller 54. In the communication controller 54, the detected battery voltage is compared against a set value. Then, as shown in FIG. 12 (*b*), when the detected battery voltage coincides with the set value, mobile unit information ("location," "battery voltage") is sent to the communication terminal 56 as transmission data. And then, e-mail, in which the mobile unit information is described, is automatically transmitted from the communication terminal 56 via the satellite communication antenna 58.

Thus, since mobile unit information is sent when the voltage of the battery 63 coincides with the set value (or is less than the set value), it is possible to perceive when the time has come for maintenance and inspections, such as charging or replacing the battery 63, from a display screen on the terminal side. For this reason, it is possible to send appropriate work instructions data (Message: "Inspect battery") to a service vehicle 34 from a management-side terminal the same as in FIG. 3 and FIG. 4. Further, by perceiving on a display screen of the terminal side a state in which a battery 63 is nearly discharged, it is possible to subsequently send a request to turn ON the sleep function, and to make a setting such that mobile work machine 31 communications are only carried out intermittently, thus curbing further discharge.

Further, an embodiment, in which an automatic transmission is not performed when the content of the mobile unit information automatically transmitted the last time is the same as the content of the mobile unit information to be automatically transmitted this time, is also possible.

As shown in FIG. 2, an abnormality, which occurs in mobile work machine 31, for example, an abnormality such as "high engine speed," "high engine exhaust temperature," "high cooling water temperature," "low battery voltage" or "low fuel quantity," is detected by a prescribed sensor from among a group of sensors 62. The detection signals of this sensor are sequentially inputted to the communication controller 54 by being described as an error code (for example, "Abnormal item: low fuel quantity") in a frame signal and sent out over the signal wire 52 by the electronic control controller 53.

In the communication controller 54, the error code automatically transmitted last time is compared against the currently inputted error code. Then, only when the content of the error code automatically transmitted last time differs from the currently inputted error code is the currently inputted error code sent to the communication terminal 56 as transmission data. And then, e-mail, in which the mobile unit information is described, is automatically transmitted from the communication terminal 56 via the satellite communication antenna 58.

Thus, since an automatic transmission is performed only when the content of the error code automatically transmitted last time differs from the error code to be automatically transmitted this time, and automatic transmission is not performed when the content of the error code automatically transmitted last time is the same as the error code to be automatically transmitted this time, it is possible to avoid the uselessness of transmitting the same information a plurality of times. Further, the same also holds true for the automatic transmission of mobile unit information other than error codes.

Further, in the embodiment described hereinabove, when a parameter inside a mobile unit constitutes a specified value, specified mobile unit information is automatically transmitted, but an embodiment, which arbitrarily changes the content of a "parameter" (stored data, such as the quantity of data D, and sensor detected data, such as battery voltage), a "specified value" or "specified mobile unit information" in this case from, for example, a management-side terminal (server terminal 21, terminal 11), is also possible. In this case, as explained hereinabove, e-mail describing change-data to the effect that the above-mentioned parameter is to be changed is sent from a terminal to the mobile work machine 31 having this mobile work machine 31 as the e-mail address. And then, the change-data described in the e-mail is read out in the communication terminal 56 of the transmission-destination mobile work machine 31, and the parameter is changed in accordance with the content of this change-data.

For example, when the service meter of the mobile work machine 31 goes beyond a predetermined value (when the mobile work machine 31 becomes obsolete), the interval between monitoring is shortened, and when the mobile work machine 31 is rented to a certain user (when there is no need for monitoring), or when it is resting for a long time (when it is clear that operation has stopped), the content of "parameter," "specified value," "specified mobile unit information" are changed such that the interval between monitoring is lengthened, and wasteful power consumption and communication charges are reduced. Furthermore, it is also possible to simultaneously change to the same content for a plurality of mobile units, which are working and traveling as a group.

For example, with regard to "specified mobile unit information," the content can be reduced to only essential monitoring items.

Thus, according to this embodiment, it is possible to change a time period and content to be automatically transmitted via a remote operation at the terminal side while monitoring the status of a mobile unit and the surrounding situation. Thus, it is not necessary to dispatch a worker to the respective sites of mobile units 31, 32 and so forth to perform the changing work, greatly reducing the workload.

Furthermore, when the mobile unit information to be sent out via an automatic transmission is the location of a mobile unit, the longitude and latitude on a map can also be sent as the location information, or a relative location in relation to specified criteria can also be sent as the location information.

Further, the quantity of change in the voltage of a battery 63 can be automatically transmitted instead of automatically transmitting a voltage value of the battery 63 as mobile unit information.

Further, operational load information, quantity of work, and quantity of fuel consumed can also be automatically transmitted as mobile unit information.

As explained hereinabove, according to this embodiment, when a specified parameter reaches a specified value, it is possible to comprehend specified mobile unit information on a display screen of the terminal side without having to perform a request input operation on one's own at the terminal side. Accordingly, it is possible to recognize an abnormal condition (for example, a malfunction), which occurs in a mobile unit, which cannot be constantly managed and monitored, and it is possible to accurately comprehend the operating states and resting states of the mobile unit.

This automatic transmission embodiment is not limited to the communication device shown in FIG. 1, and can be applied to an arbitrary communication device. If a communication device comprises at a minimum two communication stations, and performs communications between two communication stations, then this embodiment is applicable.

Now then, the information displayed on the terminals 11, 12 is voluminous. Accordingly, an embodiment, which presets only the essential information from among a huge volume of information, and which collects and displays only this essential information on specified display screens, will be explained. In accordance therewith, rapid decisions and actions regarding abnormal situations become possible on the management side.

The following embodiment will be explained using mobile work machine 31. Further, it is supposed that terminal 11 is the terminal of the management side, which manages this mobile work machine 31. Further, it is supposed that the server for terminal 11 is server terminal 21.

Although not shown in FIG. 2, a start-lock circuit is incorporated inside the body 50 of mobile work machine 31. This start-lock circuit is constituted from a relay and the like, and is interposed between a key switch 64 (FIG. 21) and a fuel injection apparatus.

When a start-lock set command is outputted from the communication controller 54, the start-lock circuit relay is biased and a start-lock set state results. That is, even if the key switch 64 is turned ON, fuel is not injected, and the engine cannot be started. By contrast thereto, when a start-lock release command is outputted from the communication controller 54, the start-lock circuit relay is unbiased and a start-lock release state results. That is, by turning the key switch 64 ON, fuel is injected and the engine is started.

There are cases when a vehicle 31 moves on its own power, and cases where it is loaded onto a trailer or other such transport vehicle and moved. Here, it is supposed that the vehicle 31 is moved by being loaded onto a trailer. Furthermore, the following processing can be similarly applied to a case in which the vehicle 31 moves under its own power as well.

The homepage display screen called an "Information Screen" shown in FIG. 34 is prepared by the server terminal 21. This "Information Screen" is set on the front page of the homepage. Only the following essential information is collected and displayed on this "Information Screen."

a) Information stating that the vehicle 31 is outside the set range b) Information stating that the engine of vehicle 31 was started outside regular hours c) Information stating that the battery voltage of vehicle 31 has dropped d) Information stating that start-lock set or release has been performed e) Information stating that communications between vehicle 31 and server terminal 21 have stopped f) Information stating that a request made to vehicle 31 has not been fulfilled (for example, information stating that start-lock set has not been performed for vehicle 31 despite the fact that a start-lock set command was issued).

That is, when an automatic transmission is performed from the vehicle 31 side, and the mobile unit information automatically transmitted thereby is received by the server terminal 21, a determination is made by the server terminal 21 as to whether or not this mobile unit information should be displayed on the "Information Screen" of the homepage.

Now, when the engine is started on the vehicle 31 side outside of regular hours (17:00 to 8:00), information stating "Vehicle 31 engine was started" is automatically transmitted as e-mail to the server terminal 21. Since this mobile unit information is the specified information of the above-mentioned b), a determination is made by the server terminal 21 that it should be displayed on the "Information Screen," and the display content of the "Information Screen" are updated.

Thus, when a WWW browser is started up on the terminal 11, which manages vehicle 31, homepage data is read out from the server terminal 21 via the WWW browser, and displayed on a display screen of the display device of terminal 11.

FIG. 34 shows the first page of the homepage, that is, the screen at start-up, which is displayed on the display device of terminal 11.

As shown in this FIG. 34, content stating "Vehicle engine started outside regular hours" is displayed together with content specifying "Time of Occurrence," and the "Manufacturer," "Type of Machine," "Model Number," "Machine Number" and "ID" of vehicle 31. From this display screen, a manager can learn that vehicle 31 "had an engine start after regular hours," and can quickly and accurately take action to deal with an abnormal situation, such as mischief.

A manager can put vehicle 31 in a start-lock set state via a remote operation. This is executed by changing the display screen of terminal 11 to the "Engine Restart Prohibited Setting Screen," and clicking on the button "Prohibit Engine Restart." In accordance therewith, e-mail to the effect that vehicle 31 is to be placed into a start-lock set state is sent from terminal 11 to vehicle 31.

On the vehicle 31 side, when data to the effect a start-lock set state is to be established is received by the communication terminal 56 via the satellite communication antenna 58, this data is read into the communication controller 54. In accordance therewith, a start-lock set command is outputted from the communication controller 54 to the start-lock circuit. Thus, the start-lock circuit relay is biased, and a start-lock set state results. That is, even if the key switch 64 is turned ON, fuel is not injected, and the vehicle 31 engine does not restart.

A determination as to whether or not start-lock has been set is made by the vehicle 31 side. When it is determined on the vehicle 31 side that start-lock has been set, information stating "Vehicle 31 start-lock has been set remotely" is automatically transmitted to the server terminal 21 via e-mail. Since this mobile unit information is the specified information of the above-mentioned d), a determination is made by the server terminal 21 that it should be displayed on the "Information Screen," and the display content of the "Information Screen" is updated.

Thus, content stating "Lock setting established remotely" is displayed on a display screen of terminal 11 together with content specifying "Time of Occurrence," and the "Manufacturer," "Type of Machine," "Model Number," "Machine Number" and "ID" of vehicle 31 as shown in FIG. 34. From this display screen, a manager can confirm that vehicle 31 "has had start-lock set remotely."

The fact that e-mail to the effect that a start-lock set state was established for vehicle 31 has been sent is stored in server terminal 21. Accordingly, if information stating "start-lock has been set remotely" is not sent back via e-mail from vehicle 31 once a predetermined period of time has elapsed following this e-mail having been sent to vehicle 31, then a determination is made at server terminal 21 that "start-lock has not been set for vehicle 31 despite the fact that a start-lock set command was issued." In other words, a determination is made that "request to vehicle 31 has not been fulfilled." The cause of this can be considered as one of two factors, either the operational failure of the vehicle 31 start-lock circuit on the vehicle 31 side, or a poor state of communications between vehicle 31 and server terminal 21. Since this mobile unit information or communication status information is the specified information of the above-mentioned f), a determination is made by the server terminal 21 that it should be displayed on the "Information Screen," and the display content of the "Information Screen" is updated.

Thus, content stating "Lock confirmation not received from vehicle" is displayed on a display screen of terminal 11 together with content specifying "Time of Occurrence," and the "Manufacturer," "Type of Machine," "Model Number," "Machine Number" and "ID" of vehicle 31 as shown in FIG. 34. From this display screen, a manager can learn that "lock has not been confirmed" for vehicle 31. And then, action to deal with this abnormal situation can be taken quickly and accurately.

A manager can put vehicle 31 in a start-lock release state via a remote operation. This is executed by changing the display screen of terminal 11 to the "Engine Restart Release Screen," and clicking on the button "Release Engine Restart." In accordance therewith, e-mail to the effect that vehicle 31 is to be placed into a start-lock release state is sent from terminal 11 to vehicle 31.

On the vehicle 31 side, when data to the effect that a start-lock release state is to be established is received by the communication terminal 56 via the satellite communication antenna 58, this data is read into the communication controller 54. In accordance therewith, a start-lock release command is outputted from the communication controller 54 to the start-lock circuit. Thus, the start-lock circuit relay is unbiased, and a start-lock release state results. That is, by turning the key switch 64 ON, fuel is injected, and the vehicle 31 engine is able to restart.

A determination as to whether or not start-lock has been released is made by the vehicle 31 side. When it is determined on the vehicle 31 side that start-lock has been release, information stating "Vehicle 31 start-lock has been released remotely" is automatically transmitted to the server terminal 21 via e-mail. Since this mobile unit information is the specified information of the above-mentioned d), a determination is made by the server terminal 21 that it should be displayed on the "Information Screen," and the display content of the "Information Screen" is updated.

Thus, content stating "Lock release established remotely" is displayed on a display screen of terminal 11 together with content specifying "Time of Occurrence," and the "Manufacturer," "Type of Machine," "Model Number," "Machine Number" and "ID" of vehicle 31. From this display screen, a manager can confirm that vehicle 31 "has had start-lock released remotely"

The fact that e-mail to the effect that a start-lock release state was established for vehicle 31 has been sent is stored in server terminal 21. Accordingly, if information stating "start-lock has been released remotely" is not sent back via e-mail from vehicle 31 once a predetermined period of time has elapsed following this e-mail having been sent to vehicle 31, then a determination is made at server terminal 21 that "start-lock has not been released for vehicle 31 despite the fact that a start-lock release command was issued." In other words, a determination is made that "request to vehicle 31 has not been fulfilled." The cause of this can be considered as one of two factors, either the operational failure of the vehicle 31 start-lock circuit on the vehicle 31 side, or a poor state of communications between vehicle 31 and server terminal 21. Since this mobile unit information or communication status information is the specified information of the above-mentioned f), a determination is made by the server terminal 21 that it should be displayed on the "Information Screen," and the display content of the "Information Screen" is updated.

Thus, content stating "Lock release confirmation not received from vehicle" is displayed on a display screen of terminal 11 together with content specifying "Time of Occurrence," and the "Manufacturer," "Type of Machine," "Model Number," "Machine Number" and "ID" of vehicle 31. From this display screen, a manager can learn that "lock release has not been confirmed" for vehicle 31. And then, action to deal with this abnormal situation can be taken quickly and accurately.

Furthermore, in a case in which the starting apparatus has been operated despite the fact that vehicle 31 was in a start-lock state, a message to that effect can be automatically transmitted from vehicle 31. That is, information stating "Vehicle was started despite the fact that start-lock had been set remotely" can be displayed in the "Information Screen" of FIG. 34.

Now then, it is supposed that an automatic transmission from vehicle 31 is performed at 23:00 each day. As shown in FIG. 30, the content of a daily operation map is updated, and at 23:00 each day an updated operation map is automatically transmitted from vehicle 31. Thus, a state, in which a transmission from vehicle 31 has not been made for a predetermined time period, for example, for 36 hours or longer in a row, signifies that an abnormality has occurred in the communication status. This "36 hours" is a time period, which adds to a one-day period (24 hours) the subsequent-day's normal operating time (12 hours: 8:00 AM to 8:00 PM).

The time at which the last e-mail was sent from vehicle 31 to server terminal 21 is stored in server terminal 21. Accordingly, if a continuous non-transmission state continues for a predetermined time period (36 hours) after the last e-mail was sent from vehicle 31, then a determination is made at server terminal 21 that "There has been no communication with vehicle 31 for more than 36 hours." In other words, it is determined that communications between vehicle 31 and server terminal 21 have been cut off. The cause of this can be considered as one of two factors, either a malfunction of or damage to the vehicle 31 communication device on the vehicle 31 side, or a poor state of communications between vehicle 31 and server terminal 21. Since this mobile unit information or communication status information is the specified information of the above-mentioned e), a determination is made by the server terminal 21 that it should be displayed on the "Information Screen," and the display content of the "Information Screen" is updated.

Thus, content stating "No communication with vehicle for more than 36 hours" is displayed on a display screen of terminal 11 together with content specifying "Time of Occurrence," and the "Manufacturer," "Type of Machine," "Model Number," "Machine Number" and "ID" of vehicle 31 as shown in FIG. 34. From this display screen, a manager can learn that "communications are cut off" with vehicle 31. And then, action to deal with this abnormal situation can be taken quickly and accurately.

Furthermore, in this embodiment, the fact that communications have been cutoff with vehicle 31 is determined on the basis that even though a predetermined time has elapsed since the last automatic transmission there has been no subsequent automatic transmission. However, a determination that communications with vehicle 31 have been cutoff can also be made based on the fact that there has been no reply from vehicle 31 even though a predetermined time has passed since the last time there was an input operation from a terminal 11, 12 and so forth requesting vehicle 31 for information.

Now then, as was explained hereinabove, the voltage of the battery 63 in vehicle 31 is detected by a group of sensors 62, and inputted into the communication controller 54. A determination is made by the communication controller 54 as to whether or not the voltage of the battery 63 has dropped below a predetermined level (for example, 23V) for a continuous period (for example, more than one minute). A drop in the voltage of the battery 63 signifies not only that it will become difficult to start vehicle 31, but also that onboard communication functions will go down, and is a serious abnormal situation. Since power is consumed by the start-lock circuit relay when the start-lock circuit of vehicle 31 is operated, the voltage of the battery 63 is apt of drop.

Accordingly, when it is determined on the vehicle 31 side that the voltage of the battery 63 has dropped below a predetermined level (for example, 23V) for a continuous period (for example, more than one minute), information stating "Voltage of vehicle 31 battery 63 has dropped" is automatically transmitted via e-mail to server terminal 21. Since this mobile unit information is the specified information of the above-mentioned c), a determination is made by the server terminal 21 that it should be displayed on the "Information Screen," and the display content of the "Information Screen" is updated.

Thus, content stating "battery voltage has dropped" is displayed on a display screen of terminal 11 together with content specifying "Time of Occurrence," and the "Manufacturer," "Type of Machine," "Model Number," "Machine Number" and "ID" of vehicle 31. From this display screen, a manager can learn that "the voltage of battery 63 has dropped" on vehicle 31. And then, action to deal with this abnormal situation can be taken quickly and accurately.

Now then, as already explained using FIG. 9 and FIG. 10, an automatic transmission is performed when the location of vehicle 31 has changed.

That is, an automatic transmission is performed when vehicle 31 departs from a specified set range 129 as shown in FIG. 10. This specified set range 129, for example, is set as the management area for vehicle 31 (for example, "Tokyo"), or the range within which vehicle 31 is able to travel (for example, "throughout Japan"). When vehicle 31 departs from the set range, a determination can be made that an abnormal situation has occurred.

Accordingly, when it has been determined on the vehicle 31 side that vehicle 31 has departed from a specified set range 129, information stating "Vehicle 31 is outside its range" is automatically transmitted via e-mail to server terminal 21. Since this mobile unit information is the specified information of the above-mentioned a), a determination is made by the server terminal 21 that it should be displayed on the "Information Screen," and the display content of the "Information Screen" is updated.

Thus, content stating "Vehicle is outside its range" is displayed on a display screen of terminal 11 together with content specifying "Time of Occurrence," and the "Manufacturer," "Type of Machine," "Model Number," "Machine Number" and "ID" of vehicle 31. From this display screen, a manager can learn that vehicle 31 "is outside its range." And then, action to deal with this abnormal situation can be taken quickly and accurately.

Furthermore, an automatic transmission is performed when vehicle 31 departs from a specified set range 129, and information stating "Vehicle outside its range" is displayed on the "Information Screen," but an automatic transmission can also be performed when vehicle 31 enters into a specified set range 129, and information stating "Vehicle inside set range" can also be displayed on the "Information Screen." The specified set range 129 in this case is set for an area into which vehicle 31 does not normally enter.

Further, the "Information Screen" of FIG. 34 is displayed on terminal 11, and can be similarly displayed on a display screen of other terminals such as terminal 12 as well. In accordance therewith, the "Information Screen" of FIG. 34 can also be displayed on terminal 12, making it possible to check important information generated up until the previous day.

Further, an embodiment, which permits the display of the "Information Screen" of FIG. 34 only on a display screen of management terminal 11, which manages vehicle 31, and does not display the "Information Screen" on display screens of other terminals, such as terminal 12, is also possible. This can be achieved, for example, by making the display of the "Information Screen" of FIG. 34 conditional on an operation that inputs a specified ID number and specified password (number corresponding to terminal 11).

In this embodiment, the specified information to be displayed on the "Information Screen" of FIG. 34 is not limited to the information shown in a) through f).

For example, information regarding the fact that the vehicle 31 rental period for a client is coming to an end can also be displayed on the "Information Screen." It is possible for vehicle 31 to detect that a rental period is coming to an end by a service meter value, or that the end of a rental period is approaching by a clock provided inside the communication terminal 56.

Further, when vehicle 31 travels more than a predetermined distance, an automatic transmission can be made from vehicle 31, and information stating "Traveled more than predetermined distance" can be displayed on the "Information Screen." This predetermined distance, for example, is set at a distance, which it is felt vehicle 31 will not normally travel.

Further, when an error code is inputted to the communication terminal 56 of vehicle 31, an automatic transmission can be made from vehicle 31, and information stating that an error has occurred can be displayed on the "Information Screen." Furthermore, an embodiment, which limits the content of error codes to be displayed on the "Information Screen" to specified abnormal items (serious abnormal items) only, is also possible.

Further, the display items for the "Information Screen" of FIG. 34 can be made to differ for respective vehicles 31, 32 and so forth. For example, it is possible to display only display item a) for vehicle 31, and only display item b) for vehicle 32 on the "Information Screen."

Further, in this embodiment, the "Information Screen" is displayed on a terminal 11 that is affixed in one location, but an embodiment, which displays the content of the "Information Screen" on a portable terminal, is also possible.

For example, the content of the "Information Screen" can be displayed on a portable cellular telephone equipped with a WWW browser.

In this case, the packet-switched communication network of the portable cellular telephone is connected to the Internet 2 via a gateway. Then, the conversion of the packet-switched communication network protocol and the Internet 2 TCP/IP protocol is performed by the gateway, and the content of a homepage on the Internet 2 is displayed on a display screen of the portable cellular telephone. Every time the "Information Screen" is updated anew at the server terminal 21, a voice message to the effect "New information received" is generated at the portable cellular telephone. In accordance therewith, the newly updated "Information Screen" content is displayed on a display screen of the portable cellular telephone. Furthermore, an embodiment, which sets the display items of the "Information Screen" to be displayed on the portable cellular telephone to only specified display items from among a) through f), is also possible. For example, it is possible to display only b) information, stating "Vehicle 31 engine was started outside regular hours," on a display screen of the portable cellular telephone. In accordance therewith, even when a manager is at a location away from terminal 11, he can acquire emergency information regarding vehicle 31 in real-time from a display screen of a portable cellular telephone.

Now then, because construction machine is very expensive, it is most often provided on a rental basis. The rental of construction machine is done under a system call group rental. This is a system, whereby, due to the fact that there are various kinds of construction machine (small-sized hydraulic excavator, medium-sized hydraulic excavator, large-sized hydraulic excavator, and so forth), these many kinds of construction machine are shared by a plurality of business offices. For this reason, when a certain business office has a request from a client for a specific type of rental, and the business office does not have the pertinent type of construction machine, the business office can get another business office to loan it this specific type of construction machine, thereby not missing out on a business opportunity.

To meet the rental requests of clients, each business office must reliably manage the storage and dispatch of its construction machine. Next, an embodiment for managing storage and dispatch will be explained.

Figure 35:
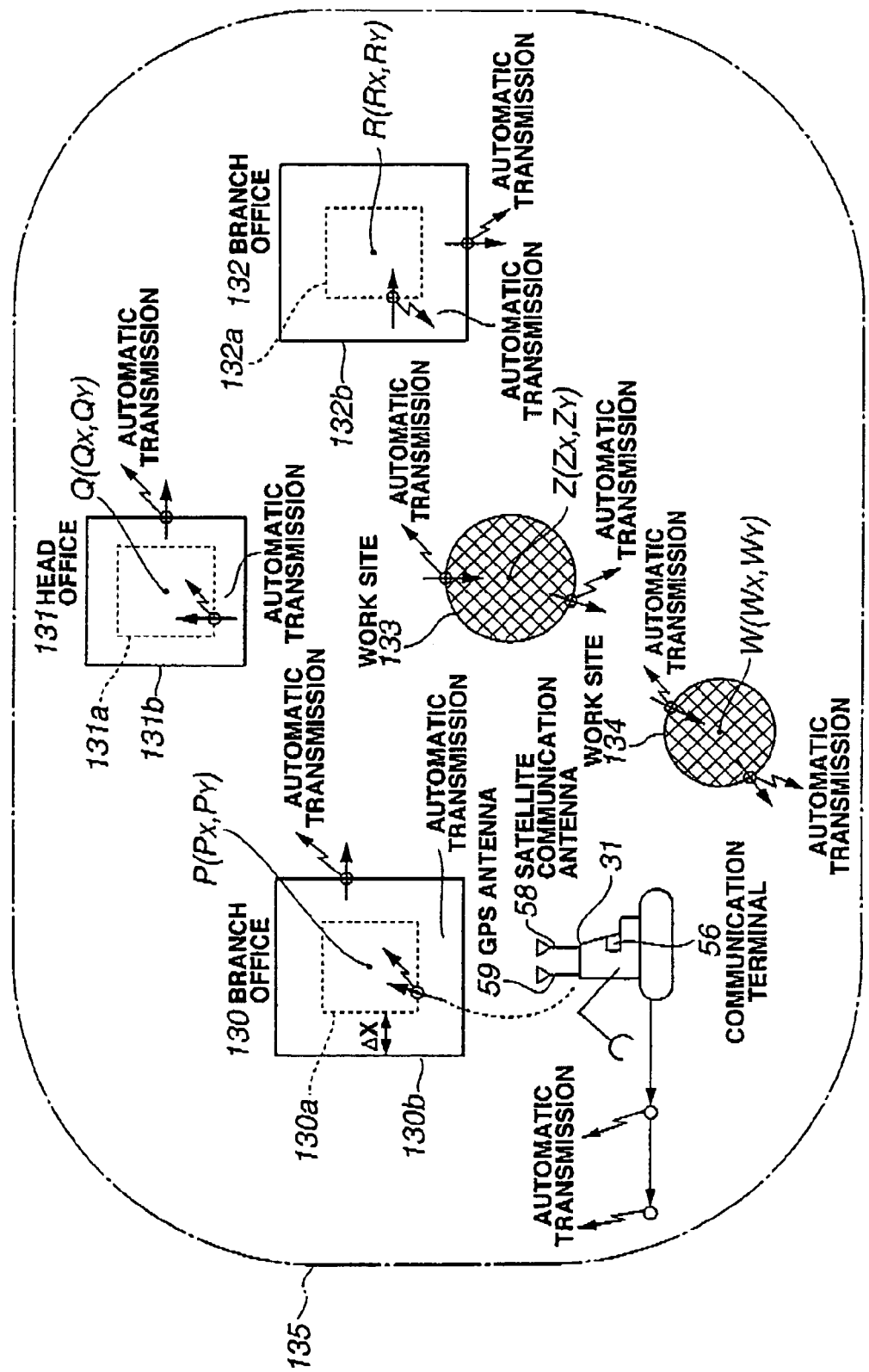
FIG. 35 is a diagram showing an example of the layout of a storage and dispatch area.

FIG. 35 shows an example of a constitution of the embodiment. FIG. 35 shows, for example, respective business offices 130, 131, 132 located in an area 135 called "Tokyo." Business office 130 is in "West Tokyo," business office 131 is in "North Tokyo," and business office 132 is in "South Tokyo." Client work areas are given as 133, 134. Vehicles 31, 32 are managed by business offices 130 through 132. Furthermore, in actuality, much larger numbers of business offices, work areas and vehicles (mobile work machine) exist, but these have been omitted for the sake of expediting the explanation.

It is supposed that of the business offices 130, 131, 132, business office 131 is the headquarters, and business offices 130, 132 are branch offices. The headquarters 131 manages vehicles 31, 32 in a centralized manner. A terminal 11 is provided at the headquarters 131. Furthermore, the same terminal as terminal 11 can also be provided at the branch offices 130, 132.

The location of the respective business offices 130, 131, 132 are represented using an X-Y coordinate system as P (Px, Py), Q (Qx, Qy) and R (Rx, Ry). Further, the locations of the respective work areas 133, 134 are represented by an X-Y coordinate system as Z (Zx, Zy) and W (Wx, Wy). Furthermore, the locations can also be represented by longitude and latitude on a globe so as to correspond to a GPS map.

Storage and dispatch areas are established at each of the respective business offices 130, 131, 132 centered on the above-mentioned points P, Q, R. For example, at branch office 130, a storage area 130a is established centered on point P. Furthermore, a dispatch area 130b is established centered on point P. The dispatch area 130b is larger than the storage area 130a. Hysteresis ΔX is provided between the boundary line of dispatch area 130b and the boundary line of storage area 130a.

Similarly, a storage area 131a and a dispatch area 131b are established at the headquarters 131 centered on point Q, and a storage area 132a and a dispatch area 132b are established at the branch office 132 centered on point R. Furthermore, the size of the storage and dispatch area is determined by taking into consideration GPS measurement system errors and the size of a business office. For example, a storage and dispatch area is determined to be a size having a length and breadth of several hundred meters each.

Further, at each work site 133, 134, work areas 133, 134 are established centered on the above-mentioned points Z, W.

Location information of the storage and dispatch areas of the respective business offices 130, 131, 132, and location information of the work areas of the work sites 133, 134 are stored in the communication controller 54 of vehicle 31. Similarly, the same information is also stored in the communication controller 54 of vehicle 32.

Furthermore, to commence communications by mounting new communication terminals 56 in the vehicles 31, 32, a procedure for requesting communications must be performed, and receipt of this request by the server terminal 21, which manages communications, must be confirmed. In this embodiment, this communication request procedure can be performed on a screen of terminal 11.

That is, after communication terminals 56 are mounted in the vehicles 31, 32, a communication request input operation is performed from a display screen of terminal 11. As a result of this, a communication connection between server terminal 21 and the communication terminals 56 of the vehicles 31, 32 is confirmed. Simultaneous to this, location information of the respective business offices 130, 131, 132, and location information of the work sites 133, 134 are sent from server terminal 21 to the vehicles 31, 32. In accordance therewith, the location information of the storage and dispatch areas of the respective business offices 130, 131, 132, and location information of the work areas of the work sites 133, 134 are stored in the communication controllers 54 of the vehicles 31, 32. When the communication connection is confirmed, a message to the effect that communication requests from the vehicles 31, 32 have been received is displayed on a display screen of terminal 11. When receipt of these requests is confirmed by terminal 11, subsequent communications with the vehicles 31, 32 become possible.

The operation when a vehicle 31 is dispatched will be explained hereinbelow using vehicle 31 to represent the vehicles 31, 32.

As already explained using FIG. 9 and FIG. 10, the location of vehicle 31 is detected by the GPS sensor 57 via the GPS antenna 59. The detection results of the GPS sensor 57 are inputted into the communication controller 54. In the communication controller 54, the detected location of vehicle 31 and the locations of the storage and dispatch areas of the respective business offices 130, 131, 132 are compared, and a determination is made as to whether or not vehicle 31 has been stored in or dispatched from a storage and dispatch area.

For example, it is supposed that vehicle 31 is stored at branch office 130.

A determination as to whether or not vehicle 31 is stored at branch office 130 is made according to whether or not vehicle 31 enters from the outside to the inside of storage area 130a of branch office 130, and stays on the inside of the storage area 130a for a predetermined time (for example, two or three minutes). Furthermore, making storage conditional on vehicle 31 staying in storage area 130a for more than a predetermined time takes into consideration cases in which a vehicle simply passes through branch office 130. As a result thereof, when it is determined that vehicle 31 has entered storage area 130a, at that point in time, an identification code specifying vehicle 31 ("Vehicle 31"), an identification code specifying branch office 130 ("West Tokyo Office"), and an identification code indicating "Storage" (these codes are referred to as "storage data") are sent from the communication controller 54 to the communication terminal 56 as transmission data. Then, e-mail in which the above-mentioned storage data is described, is automatically transmitted to server terminal 21 from the communication terminal 56 via satellite communication antenna 58. Here, it is supposed that server terminal 21 is provided at the location of the manufacturer that manufactured the vehicles 31, 32.

At the server terminal 21, a homepage display screen called the "Storage and Dispatch Screen," which is shown in FIG. 36, is prepared.

That is, when an automatic transmission is performed from the vehicle 31 side, and the storage data automatically transmitted thereby is received by the server terminal 21, server terminal 21 describes this storage data in the "Storage and Dispatch Screen" of the homepage, and updates the display content of the "Storage and Dispatch Screen."

Thus, when a WWW browser is started up at terminal 11, which manages vehicle 31, the homepage data is read out from server terminal 21 via the WWW browser, and displayed on a display screen of the display device of terminal 11.

FIG. 36 shows the homepage screen, which is displayed on the display device of terminal 11. FIG. 36 is a "Storage and Dispatch Screen" showing the storage and dispatch history of vehicle 31.

As shown in this FIG. 36, content stating that vehicle 31 is "Stored at West Tokyo Office" is displayed in real-time together with the "Time of Storage." From this display screen, a manager can learn that vehicle 31 is "Stored at West Tokyo Office," enabling him to make reliable arrangements with a client.

Similarly hereinbelow, a determination is made that vehicle 31 has been dispatched from branch office 130 by determining that vehicle 31 has departed from the inside to the outside of the dispatch area 130b of branch office 130, and has stayed outside the dispatch area 130b for a predetermined time (for example two or three minutes). At the time of this determination, information stating that vehicle 31 has been dispatched from the "West Tokyo" branch office 130 (this is called "Dispatch Data") is automatically transmitted to server terminal 21 via e-mail. Thus, as shown in FIG. 36, content stating that vehicle 31 has been "Dispatched from West Tokyo Office" is displayed in real-time on the "Storage and Dispatch Screen" of the display device of terminal 11 together with the "Time of Dispatch."

Here, as explained above, hysteresis $\Delta X$ is provided between the boundary line of the dispatch area 130b and the boundary line of the storage area 130a. Thus, it is possible to prevent hunching when vehicle 31 is traveling in the proximity of branch office 130.

Similarly hereinbelow, when it is determined that vehicle 31 has entered the storage area 132a of branch office 132, at that point in time, storage data stating that vehicle 31 has been stored at the "South Tokyo" branch office 132 is automatically transmitted to server terminal 21 via e-mail. Thus, as shown in this FIG. 36, content stating that vehicle 31 is "Stored at South Tokyo Office" is displayed in real-time on the display device of terminal 11 together with the "Time of Storage."

Furthermore, when it is determined that vehicle 31 has departed from the dispatch area 132b of branch office 132, at that time storage information stating that vehicle 31 has been dispatched from the "South Tokyo" branch office 132 is automatically transmitted to server terminal 21 via e-mail. Thus, as shown in FIG. 36, content stating that vehicle 31 has been "Dispatched from South Tokyo Office" is displayed in real-time on the "Storage and Dispatch Screen" of the display device of terminal 11 together with the "Time of Dispatch."

Furthermore, by doing the same thing when vehicle 31 either enters the storage area 131a of the "North Tokyo" headquarters 131, or when it departs from the dispatch area 131b of the "North Tokyo" headquarters 131, content stating that vehicle 31 has been either "Stored at North Tokyo Office" or "Dispatched from North Tokyo Office" is displayed on the "Storage and Dispatch Screen" of the display device of terminal 11.

By so doing, the latest storage and dispatch history for vehicle 31 is displayed in real-time as shown in FIG. 36. Further, a similar "Storage and Dispatch Screen" can also be produced for a vehicle 32 other than vehicle 31, and the latest storage and dispatch history for vehicle 31 can be displayed in real-time. Thus, managing the storage and dispatch of the vehicles 31, 32 can be performed reliably without mistakes. As a result of this, there are no missed business opportunities, and business revenues are greatly enhanced.

Further, when a determination is made that vehicle 31 has entered a client's work area 133, which is the rental destination, at that point in time, transport information stating that vehicle 31 has been transported to work site 133 is automatically transmitted to server terminal 21 via e-mail. Thus, content stating that vehicle 31 has been "Transported to Work Site 133" is displayed on the display device of terminal 11 in real-time together with the "Time of Transport."

Furthermore, when it is determined that vehicle 31 has departed work area 133, at that point in time, transport information stating that vehicle 31 has been transported from work site 133 is automatically transmitted to server terminal 21 via e-mail. Thus, content stating that vehicle 31 has been "Transported from Work Site 133" is displayed on the display device of terminal 11 in real-time together with the "Time of Transport."

Similarly, by doing the same thing when vehicle 31 either enters work site 134, or departs from work site 134, content stating that vehicle 31 has been either "Transported to Work Site 134" or "Transported from Work Site 134" is displayed on the display device of terminal 11. In this manner, the transport history of vehicle 31 is updated.

Further, the movement history of vehicle 31 following its dispatch from the respective business offices 130–132 can also be displayed on terminal 11. This can be achieved by vehicle 31 automatically transmitting location information every time it travels 10 kilometers, for example. In accordance therewith, the movement history and current location of vehicle 31 can be checked at terminal 11.

A determination can be made via a screen of terminal 11 as to whether or not vehicle 31 is located at a work site 133, 134 by comparing the current location of vehicle 31 against the known locations Z, W of the work sites 133, 134.

Further, when vehicle 31, which is under management, departs from the management area ("Tokyo") 135, information stating that vehicle 31 "Departed the Management Area" can be automatically transmitted, and displayed on the above-described "Information Screen" of FIG. 34. In accordance therewith, a manager can learn that vehicle 31 has "departed the management area," and can quickly and accurately take action to deal with an abnormal situation.

Furthermore, an embodiment, which permits the display of the "Storage and Dispatch Screen" of FIG. 36 only on a display screen of management terminal 11, which manages the vehicles 31, 32, and does not display the "Storage and Dispatch Screen" on display screens of terminals other than terminal 11, is also possible. This can be achieved, for example, by making the display of the "Storage and Dispatch Screen" of FIG. 36 conditional on an operation that inputs a specified ID number and specified password (number corresponding to terminal 11).

Now then, the transport of construction machine 31, 32 to a rental destination, and the recovery of construction machine 31, 32 from a rental destination are performed by loading the construction machine 31, 32 onto a trailer 35. Since the cost of transportation by trailer 35 is high, it is necessary to hold down transportation costs by increasing the efficiency of trailer 35 transport. Further, there is a need to increase rental opportunities and to boost business revenues by rapidly transporting construction machine 31, 32 to a rental destination, and rapidly recovering construction machine 31, 32 from a rental destination by increasing the efficiency of trailer 35 transport.

Next, an embodiment for enabling construction machine 31, 32 transport efficiency to be heightened will be explained by referring to FIG. 37.

Now then, as explained using FIG. 36, information as to whether or not the vehicles 31, 32 are being stored at or dispatched from the respective business offices 130–132, and information as to whether or not the vehicles 31, 32 are being transported to or from the respective work sites 133, 134 is managed at terminal 11.

Figure 37A:
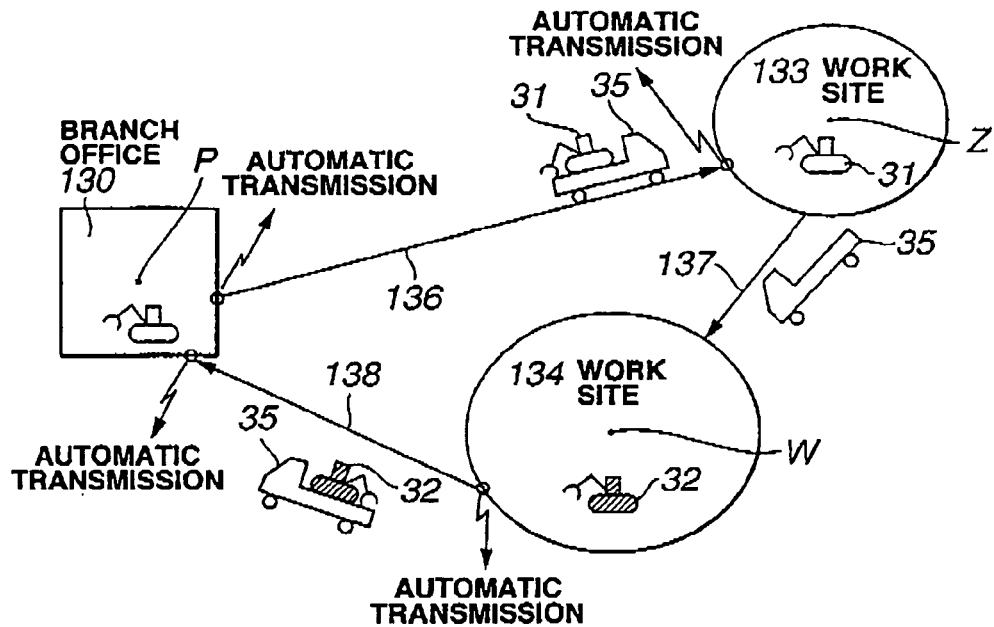
FIGS. 37(*a*) and 37(*b*) are diagrams illustrating transportation routes of a trailer.
Figure 37B:
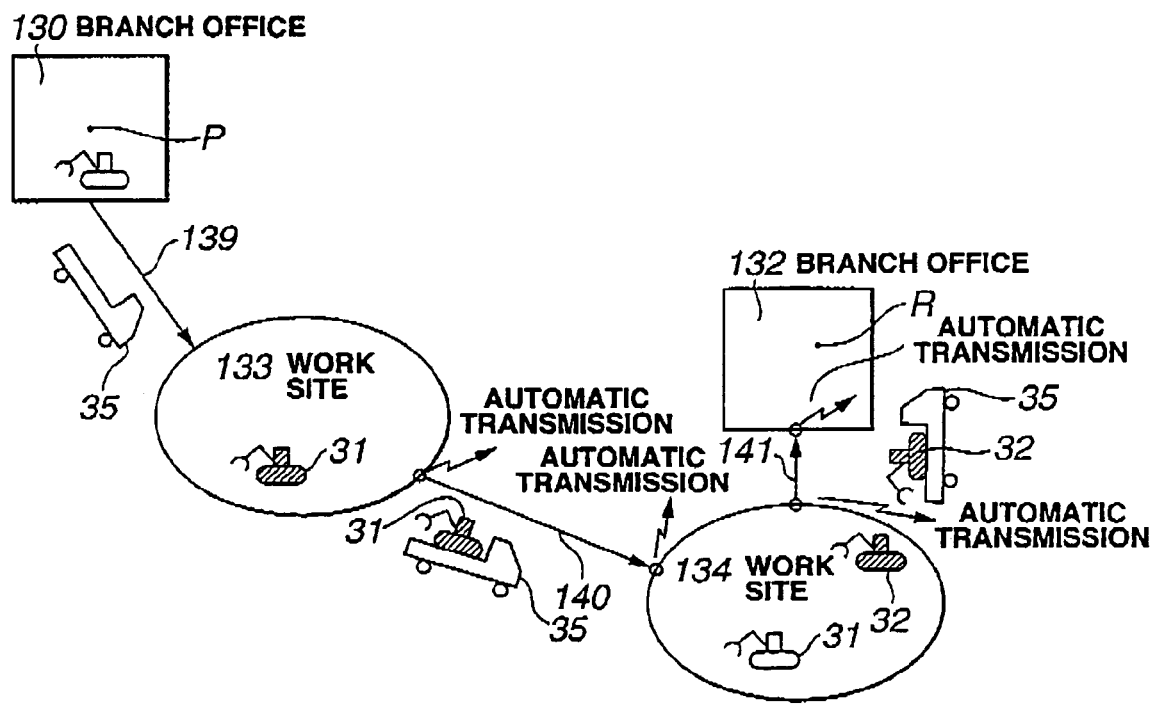

Now, it is supposed that, as shown in FIG. 37 (*a*), storage and dispatch information and transport information stating "Vehicle 31 is stored at branch office 130 and vehicle 32 is being transported to work site 134" is acquired by the terminal 11 side. It is supposed that there was a request at this time stating "Transport vehicle 31 to work site 133, and transport vehicle 32 from work site 134." Thus, based on the above-mentioned storage and dispatch information and transport information, it is possible to send work instructions data stating "Transport vehicle 31 at branch office 130 to work site 133, and on the return trip, recover vehicle 32 from work site 134 and transport it to branch office 130" from terminal 11 to trailer 35 via e-mail. In this case, by doing the same as has already been explained using FIG. 4, "the current location of the trailer 35 itself, the current location of vehicle 31 (location of branch office 130), the location of work site 133, the current location of vehicle 32 (location of work site 134) and a work instructions message" are displayed on a display screen of terminal 14 onboard the trailer 35. The operator of trailer 35 can perform his work efficiently in accordance with the display screen of terminal 14.

That is, the trailer 35 moves to branch office 130, loads vehicle 31 and departs from branch office 130. At this time, dispatch data stating that vehicle 31 has been dispatched from branch office 130 is automatically transmitted from vehicle 31, and the content of the "Storage and Dispatch Screen" of FIG. 36 is updated. The trailer 35, carrying vehicle 31, takes route 136 and enters work site 133. At this time, transport data stating the vehicle 31 has entered work site 133 is automatically transmitted from vehicle 31, and the transport history is updated.

The trailer 35, in an empty state, takes route 137 and enters work site 134. Vehicle 32 is loaded onto the trailer 35 and transported from work site 134. At this time, transport data stating that vehicle 32 has been transported from work site 134 is automatically transmitted from vehicle 32, and the transport history is updated.

The trailer 35, carrying vehicle 32, takes route 138 and enter branch office 130. At this time, storage data stating that vehicle 32 has been stored at branch office 130 is automatically transmitted from vehicle 32, and the storage and dispatch history related to vehicle 32 is updated.

As described hereinabove, the trailer 35 can transport vehicle 31 and transport and recover vehicle 32 in one deployment. Thus, the time that trailer 35 constitutes an empty state can be reduced, enhancing transport efficiency.

FIG. 37 (*b*) shows another example of transport work.

Now, it is supposed that, as shown in FIG. 37 (*b*), storage and dispatch information and transport information stating "Vehicle 31 is being transported to work site 133 and vehicle 32 is being transported to work site 134 (vehicles 31, 32 are being dispatched from branch offices 130, 132)" is acquired by the terminal 11 side. It is supposed that there was a request at this time stating "Transport vehicle 31 to work site 134, and transport vehicle 32 from work site 134." Thus, based on the above-mentioned storage and dispatch information and transport information, it is possible to send work instructions data stating "Transport vehicle 31 from work site 133 and transfer it to work site 134, and recover vehicle 32 from work site 134 and transport it to branch office 132" from terminal 11 to trailer 35 via e-mail. In this case, by doing the same as has already been explained using FIG. 4, "the current location of the trailer 35 itself, the current location of vehicle 31 (location of work site 133), the current location of vehicle 32 (location of work site 134), the location of branch office 132, and a work instructions message" are displayed on a display screen of terminal 14 onboard the trailer 35. The operator of trailer 35 can perform his work efficiently in accordance with the display screen of terminal 14.

That is, the trailer 35 takes route 139, and moves to work site 133, loads vehicle 31 and departs from work site 133. At this time, transport data stating that vehicle 31 has been transported from work site 133 is automatically transmitted from vehicle 31, and the transport history is updated. The trailer 35, carrying vehicle 31, takes route 140 and enters work site 134. At this time, transport data stating the vehicle 31 has entered work site 134 is automatically transmitted from vehicle 31, and the transport history is updated.

Vehicle 32 is loaded onto the trailer 35 and is transported from work site 134. At this time, transport data stating that vehicle 32 has been transported from work site 134 is automatically transmitted from vehicle 32, and the transport history is updated.

The trailer 35, carrying vehicle 32, takes route 141 and enter branch office 132. At this time, storage data stating that vehicle 32 has been stored at branch office 132 is automatically transmitted from vehicle 32, and the storage and dispatch history related to vehicle 32 is updated.

As described hereinabove, the trailer 35 can transfer vehicle 31 and transport and recover vehicle 32 in one deployment. Thus, the time that trailer 35 constitutes an empty state can be reduced, enhancing transport efficiency.

Furthermore, in FIG. 37, a determination is made as to whether or not the vehicles 31, 32 are located at the work sites 133, 134 by comparing the locations of the vehicles 31, 32 against work areas 133, 134 having a fixed size. However, it is also possible to make a determination as to whether or not the vehicles 31, 32 are located at the work sites 133, 134 by comparing the current location of vehicle 31 against the locations Z, W in the center of the work sites 133, 134.

Now then, in the above-described embodiment, vehicle 31 was placed in a start-lock set state (hereinafter start-lock) via a remote operation, and vehicle 31 was placed in a start-lock release state (hereinafter start-unlock) by a remote operation. Meanwhile, there is a fixed time period during which construction machine 31 is not normally operated (Outside regular hours: 17:00 to 8:00). If it is supposed that the engine of construction machine 31 was started and operated during this time period, this could be thought of as the occurrence of mischief or some other abnormality. However, the task of carrying out start-lock and start-unlock for vehicle 31 via a remote operation from terminal 11 at the same time period every day is troublesome.

Accordingly, an embodiment, in which specified time period data is sent from the terminal 11 side to vehicle 31 beforehand, and vehicle 31 itself sets a start-lock state when this specified time period is reached, and sets a start-unlock state when this specified time period has elapsed, will be explained.

Figure 38:
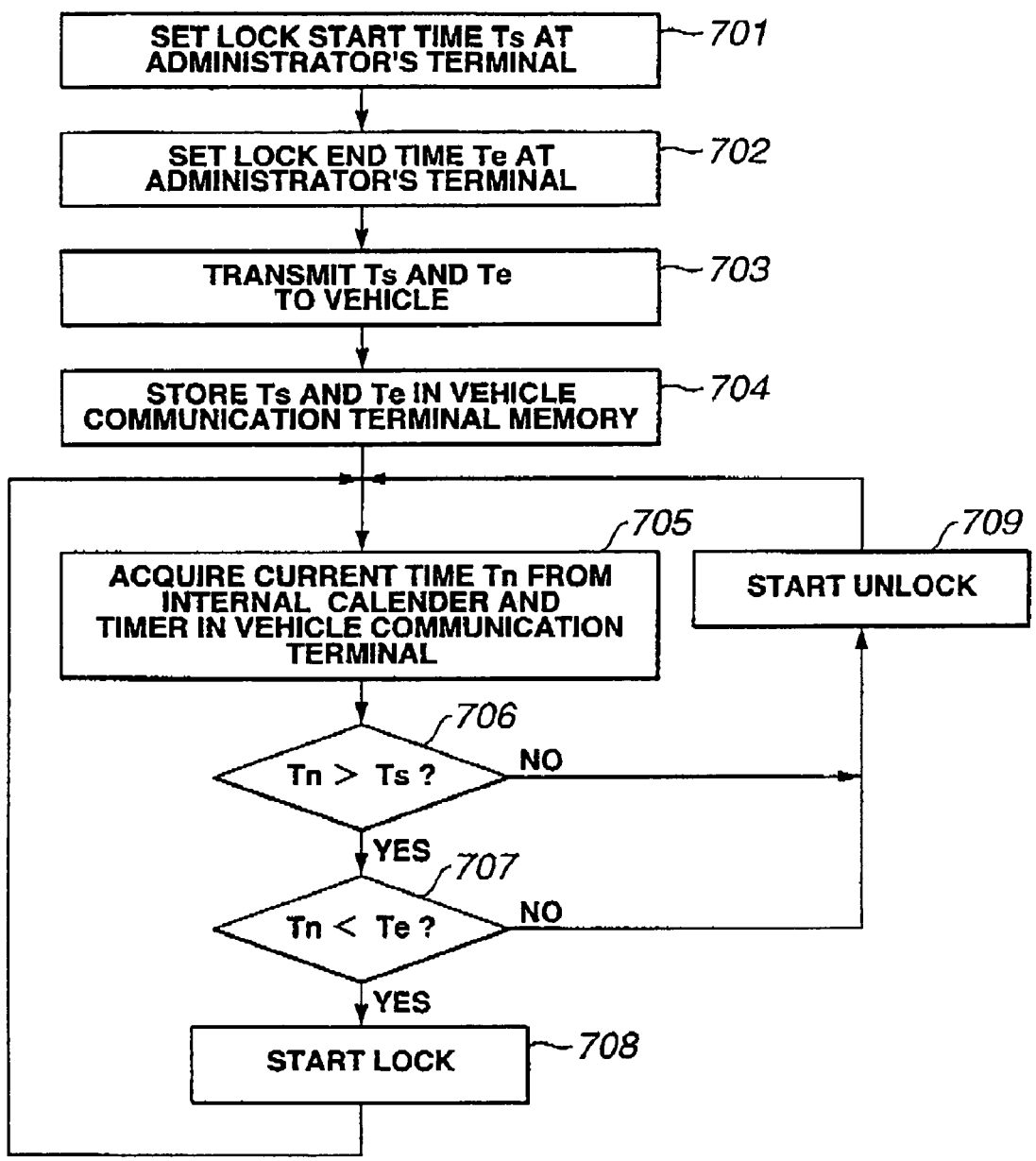
FIG. 38 is a flowchart showing the processing procedures for start-lock.

FIG. 38 is a flowchart showing the processing procedure of the embodiment.

First, when the display screen of terminal 11 is changed to the "Engine Restart Prohibited Setting Screen," and the button "Specify Time Period" is clicked, a prompt for specifying the "Lock Starting Time Ts" is displayed. In response thereto, the content of "Lock Starting Time Ts," for example, "17:00 PM," is inputted. In accordance therewith, the lock starting time Ts for vehicle 31 is set at "17:00 PM" (Step 701).

Next, a prompt for specifying "Lock Ending Time Te" is displayed. In response thereto, the content of "Lock Ending Time Te," for example, "8:00 AM," is inputted. In accordance therewith, the lock ending time Te for vehicle 31 is set at "8:00 AM" (Step 702).

As a result of this, setting data for lock starting time Ts and lock ending time Te are sent to the vehicle 31 side from terminal 11 via e-mail (Step 703).

On the vehicle 31 side, when the data Ts, Te is received by the communication terminal 56 via the satellite communication antenna 58, this data is stored in memory inside the communication terminal 56 (Step 704). A calendar and timer are provided inside the communication terminal 56 of vehicle 31. The current time Tn is acquired from the internal calendar and timer (Step 705). Next, the current time Tn is compared against the lock starting time Ts and lock ending time Te (Steps 706, 707).

If the current time Tn is past the lock starting time Ts (17:00 PM), but before the expiration of the lock ending time Te (8:00 AM) (YES decision in Steps 706, 707), a start-lock set command is outputted to the start-lock circuit from the communication terminal 56 via the communication controller 54. Thus, the start-lock circuit relay is biased, and a start-lock state is set. That is, even if the key switch 64 is turned ON, fuel is not injected, and the engine of the vehicle 31 is not restarted (Step 708).

If the current time Tn is either a time prior to the lock starting time Ts (17:00 PM), or a time subsequent to the lock ending time Te (8:00 AM) (NO decision in Step 706, NO decision in Step 707), a start-lock release command is outputted to the start-lock circuit from the communication terminal 56 via the communication controller 54. Thus, the start-lock circuit relay is unbiased, and a start-unlock state is set. That is, when the key switch 64 is turned ON, fuel is injected, and the engine of the vehicle 31 can be restarted (Step 709).

As explained hereinabove, when a daily specified time period (17:00 to 8:00) is reached, vehicle 31 is automatically set to a start-lock state, and when this specified time period expires, vehicle 31 is automatically set to a start-unlock state.

Furthermore, in FIG. 38, start-lock is performed for vehicle 31 every day, but start-lock can be performed only on specified days of the week. In this case, the specified days of the week on which start-lock is to be performed (for example, Saturday and Sunday) are set in Steps 701, 702.

Since construction machine 31 is not operated during specified periods (for example, at the end of the year and the beginning of the year), the construction machine 31 must be set to the start-lock state in advance to prevent mischief during these periods. Further, for construction machine 31 provided on a rental basis, it is necessary to set the construction machine 31 to the start-lock state upon termination of a rental period in order to prevent it being used in breach of contract following the termination of this rental period.

Figure 39:
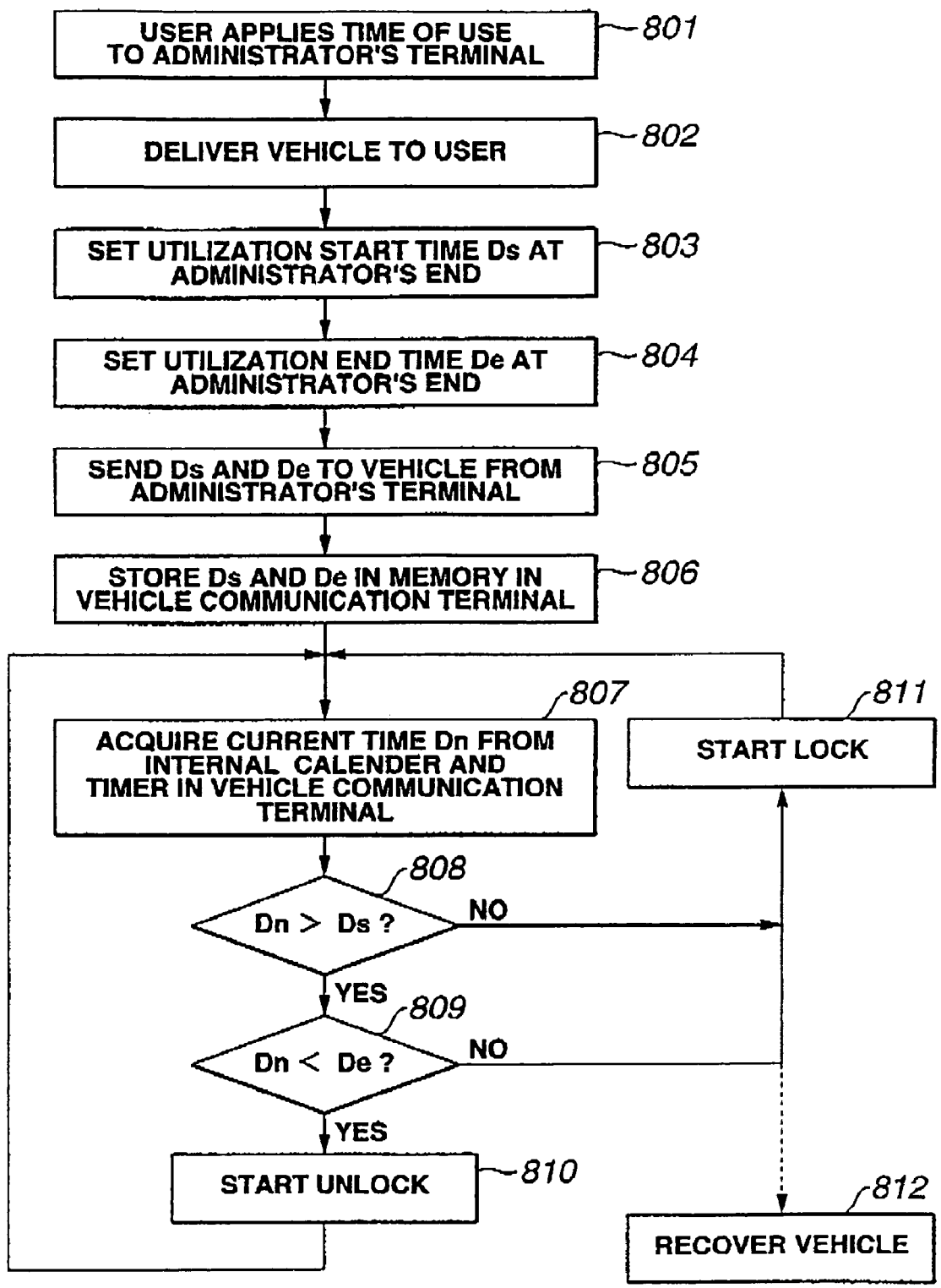
FIG. 39 is a flowchart showing the processing procedures for start-lock.

FIG. 39 is a flowchart showing the processing procedure of an embodiment for setting start-lock upon expiration of a rental period.

First, a client (user) makes a request for a utilization period (for example, from 8:00 AM on March 3 to 8:00 PM on March 15) to terminal 11, which manages vehicle 31 (Step 801). Next, vehicle 31 is delivered to the user (Step

802). Furthermore, the request and delivery procedures of Steps 801, 802 can be performed via Internet 2 communications.

Next, when the display screen of the management terminal 11 is changed to the "Engine Restart Prohibited Setting Screen," and the button "Specify Utilization Period" is clicked, a prompt for specifying the "Utilization Starting Date/Time Ds" is displayed. In response thereto, the content of "Utilization Starting Date/Time Ds," for example, "8:00 AM on March 3," is inputted. In accordance therewith, the utilization starting time Ds for vehicle 31 is set at "8:00 AM on March 3" (Step 803).

Next, a prompt for specifying "Utilization Ending Date/Time De" is displayed. In response thereto, the content of "Utilization Ending Date/Time De," for example, "8:00 PM on March 15," is inputted. In accordance therewith, the utilization ending date/time De for vehicle 31 is set at "8:00 PM on March 15" (Step 804).

As a result of this, setting data for utilization starting date/time Ds and utilization ending date/time De are sent to the vehicle 31 side from terminal 11 via e-mail (Step 805).

On the vehicle 31 side, when the data Ds, De is received by the communication terminal 56 via the satellite communication antenna 58, this data is stored in memory inside the communication terminal 56 (Step 806). A calendar and timer are provided inside the communication terminal 56 of vehicle 31. The current date/time Dn is acquired from the internal calendar and timer (Step 807). Next, the current date/time Dn is compared against the utilization starting date/time Ds and utilization ending date/time De (Steps 808, 809).

If the current date/time Dn is past the utilization starting date/time Ds (8:00 AM on March 3), but before the expiration of the utilization ending date/time De (8:00 PM on March 15) (YES decisions in Steps 808, 809), a start-lock release command is outputted to the start-lock circuit from the communication terminal 56 via the communication controller 54. Thus, the start-lock circuit relay is unbiased, and a start-unlock state is set. That is, when the key switch 64 is turned ON, fuel is injected, and the engine of the vehicle 31 can be restarted (Step 810).

If the current date/time Dn is either a time prior to the utilization starting date/time Ds (8:00 AM on March 3), or a time subsequent to the utilization ending date/time De (8:00 PM on March 15) (NO decision in Step 808, NO decision in Step 809), a start-lock set command is outputted to the start-lock circuit from the communication terminal 56 via the communication controller 54. Thus, the start-lock circuit relay is biased, and a start-lock state is set. That is, even if the key switch 64 is turned ON, fuel is not injected, and the engine of the vehicle 31 is not restarted (Step 811). In accordance therewith, when a rental period (Ds to De) ends, utilization in breach of the contract is prohibited. Further, vehicle 31, the engine of which cannot be started, can be recovered at an arbitrary time following the end of the rental period (Ds to De) (Step 812).

Furthermore, in FIG. 39, to set start-lock for the end-of-year to start-of-year period, and to set start-unlock upon termination of the end-of-year to start-of-year period, the end-of-year to start-of-year period (Ds to De) can be set in Steps 803, 804, the content of Step 810 can be changed to "Start-Lock," and the content of Step 811 can be changed to "Start-Unlock." In accordance therewith, a start-lock state is set for the end-of-year to start-of-year period (Ds to De) (Step 810), a start-unlock state is set for times other than the end-of-year to start-of-year period (Ds to De) (Step 811).

Furthermore, in FIG. 38 and FIG. 39, data is sent from terminal 11 to one vehicle 31, and this vehicle 31 is automatically set to start-lock. However, data can be simultaneously sent from terminal 11 to a plurality of vehicles (for example vehicles 31, 32), and this plurality of vehicles can be automatically set to start-lock.

By combining the embodiment of FIG. 39 with the embodiment of FIG. 37, it is possible to prevent utilization in breach of contract following the termination of a rental period, and, in addition, it is possible to carry out recovery efficiently following the termination of a rental period. That is, if the case of FIG. 37 (*a*) is taken as an example, upon termination of the rental period for vehicle 32, the client leaves this vehicle 32 at the work site 134. Since a start-lock state is set at the end of the rental period (Ds to De), the client is not able to utilize vehicle 32 in breach of contract even if vehicle 32 is left at the work site 134. Then, when it comes time to transport vehicle 32 to another work site 133, a trailer 35 can transport vehicle 31 to work site 133, and at the same time pick-up and recover vehicle 32, which was left at work site 134. In accordance therewith, the job of recovering vehicle 32 following the termination of the rental period can be performed efficiently.

In this embodiment, it is supposed that vehicle 31 is construction machine, for the most part. In the case of construction machine, by making it impossible to restart the engine, the operation of the revolving superstructure and working machinery is disabled. Accordingly, by setting construction machine in the start-lock state, it is possible to avoid the danger resulting from the inadvertent operation of the working machinery and revolving superstructure. In other words, in addition to being used to prevent unauthorized utilization following the expiration of a rental period, this embodiment can also be applied to safety measures designed to prevent erroneous operation. For example, when a control lever for the working machinery of construction machine 31 is erroneously operated by a person utterly unskilled in the operation thereof (for example, an elementary school child), the working machinery will be carelessly operated, resulting in a dangerous situation. According to this embodiment, by setting the construction machine in the start-lock state, it is possible to prevent erroneous operation such as the careless operation of the working machinery.

Now then, for the manager of a company, which undertakes a civil engineering construction project, and performs civil engineering construction work by having an operator operate construction machine, operator labor management and work process management are important. Thus, an operator is required to prepare a daily work report. However, in the past, because this required that the operator read and input service meter values, the job of preparing a daily work report was troublesome, and placed a great burden on an operator. Further, because the job of inputting had to be done manually, there were cases in which inputting errors resulted in the preparation of inaccurate daily work reports.

Further, a daily work report is useful information not only for a construction company, which is the user of construction machine, but also for a rental company that rents out construction machine, a used machine dealer that sells used construction machine, and a manufacturer that manufactures construction machine. That is, by comprehending the daily work report history, it is possible for a rental company to distinguish between a client that makes harsh use of construction machine and a client that does not, and to put this information to good use in the management of its clients. Further, by comprehending the daily work report history, it is possible for a used machine dealer, which sells used construction machine, to calculate the past utilization time and rate of operation of construction machine, and to put this information to good use in setting the price of a used vehicle. Further, by comprehending the daily work report history, it is possible for a manufacturer, which manufactures construction machine, to calculate the durability of construction machine, and to put this information to good use in the design of next-generation models.

For this reason, it needs to be constituted such that the information in a daily work report can be easily obtained from the respective terminals in real-time.

Accordingly, an embodiment, which enables a daily work report to be accurately prepared without placing a burden on an operator, and which enables the information in a daily work report to be readily obtained in real-time, will be explained next.

The server terminal 21 is a terminal provided to a manufacturer, and a homepage display screen called a "Daily Work Report Screen," which is shown in FIG. 40, is prepared on this terminal.

At 23:00 each day, an operation map, date, and the operating time up until 23:00 of that day (FIG. 40) are automatically transmitted by vehicle 31. Here, an operation map is a chart, which indicates the time periods during which an engine is operated by collating on the hour the output of a service meter provided in vehicle 31 (the presence or absence of engine operation) and the output of a calendar and timer provided in vehicle 31. In FIG. 40, the time periods rendered in black are equivalent to the time periods during which the engine of vehicle 31 was operated. Further, operating time refers to the daily cumulative service meter value (the number of hours a day the engine was operated).

That is, when an automatic transmission is performed from the vehicle 31 side, and the mobile unit information, such as "Operation Map," "Date" and "Operating Time" automatically transmitted thereby, are received by the server terminal 21, processing is performed by the server terminal 21 to update the "Daily Work Report Screen" of the homepage according to this mobile unit information.

Thus, when a WWW browser is started up on terminal 11, homepage data is read out from the server terminal 21 via the WWW browser, and the "Daily Work Report Screen" is displayed on a display screen of the display device of terminal 11.

Thus, as shown in FIG. 40, the "Date," "Operation Map" and "Operating Time" of vehicle 31 operation is updated by the latest data and displayed. Furthermore, the "Client" (ABC Construction Co.), which is using vehicle 31, the "Work Site" (IROHA Saiseki Site), the "Operator" for each day, and the maintenance and other "Remarks" are collectively displayed on the "Daily Work Report Screen." Furthermore, the procedures for inputting "Client," "Work Site," "Operator" and "Remarks" can be carried out via communications over the Internet 2. When "Client," "Work Site," "Operator" and "Remarks" are inputted at a terminal on the client side, the inputted data is sent to server terminal 21 via the Internet 2, and the content of the "Daily Work Report Screen" is updated in accordance with the inputted data.

By doing as described hereinabove, the latest daily work report is displayed in real-time on a display screen of terminal 11, and can be readily obtained from the display screen of terminal 11. In other words, a daily work report is accurately prepared without putting a burden on an operator.

In accordance therewith, a construction company is able to accurately carry out labor management and work process management.

Further, when terminal 11 is provided at a rental company, it is possible to comprehend the daily work report history from a display screen of terminal 11, making it possible to distinguish between a client that makes harsh use of construction machine and a client that does not. In accordance therewith, it is possible to put this information to good use in the management of clients. For example, warnings can be issued to a client that makes harsh use of machine, and a decision can be made to disapprove a rental application. Further, by comprehending the daily work report history, it is possible to discover a client, who is hardly operating vehicle 31 at all, and to advise that client to return the construction machine. Further, by comprehending the daily work report history, the time period for performing maintenance on vehicle 31 can be estimated.

Further, when terminal 11 is provided at a used machine dealer, which sells used construction machine, the daily work report history can be grasped from a display screen of terminal 11, and the past utilization time and rate of operation of a piece of construction machine can be calculated. In accordance therewith, it is possible to accurately set a price on a used vehicle.

Further, when terminal 11 is provided at a manufacturer, which manufactures construction machine, the daily work report history can be grasped from a display screen of terminal 11, and the durability of construction machine can be calculated. In accordance therewith, it is possible to put this information to good use in designing a next-generation model.

Figure 41:
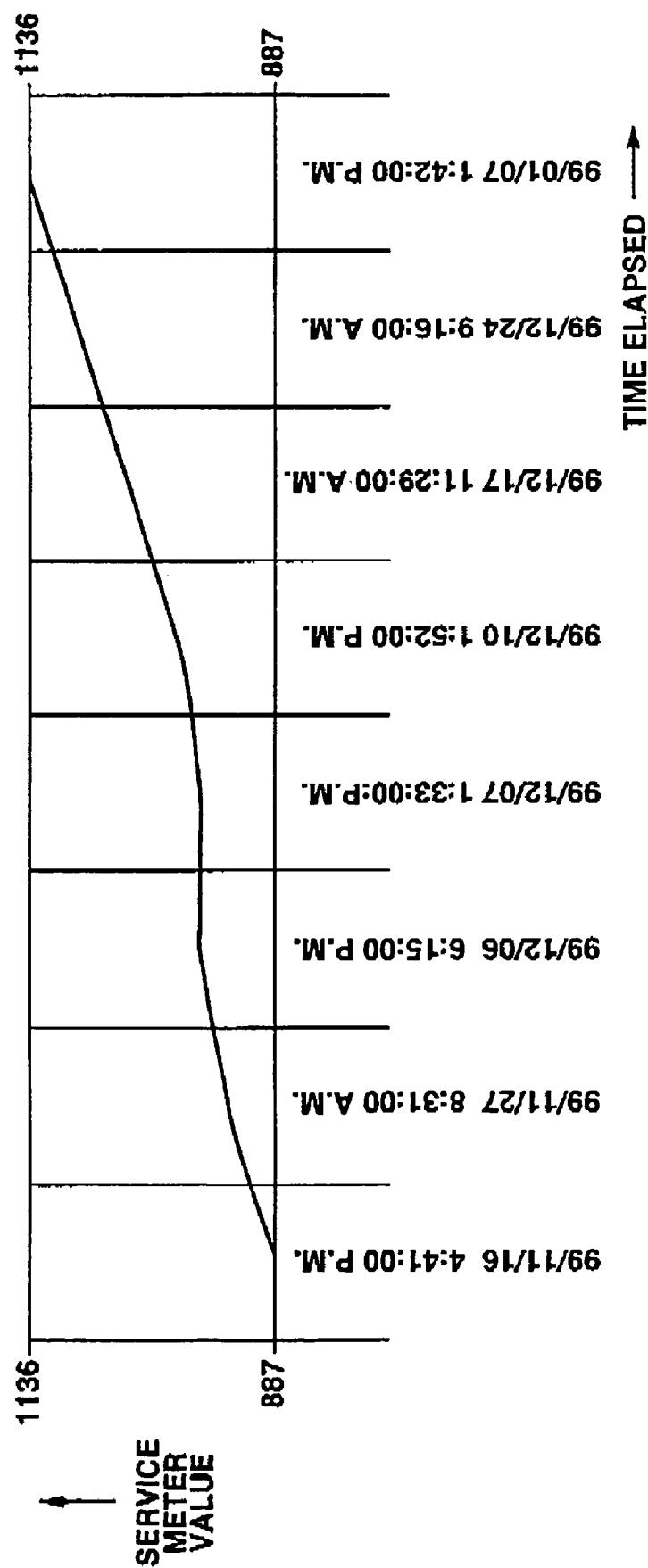
FIG. 41 is a diagram showing an example of a display on a terminal display screen.

Further, as shown in FIG. 41, a service meter history can be displayed as a graph on a display screen of terminal 11. The horizontal axis of the graph of FIG. 41 represents the date/time, and the vertical axis is the cumulative value of engine operating time measured by the service meter. From the graph of FIG. 41, it is possible to estimate regular inspection times and other maintenance periods.

Furthermore, an embodiment, which permits the display of FIG. 40 and FIG. 41 only on a display screen of terminal 11, which manages vehicle 31, and does not display FIG. 40 and FIG. 41 on a display screen of a terminal other than terminal 11, is also possible. This can be achieved, for example, by making the display of FIG. 40 and FIG. 41 conditional on an operation for inputting a specified ID number and a specified password (a number corresponding to terminal 11).

In the embodiment described hereinabove, an operation map is generated with the passage of each day, a daily work report is prepared, and a daily work report screen is updated. However, the operation map unit is not limited to one day, and can be an arbitrary period. For example, an operation map can be generated in one-month units, a "Monthly Work Report" can be prepared, and a "Monthly Work Report Screen" can be updated. Further, an embodiment, which prepares a work report for each period that a machine is rented to a client, is also possible. In other words, an operation map can be generated in rental period units, a "Work Report" can be prepared, and a "Work Report Screen" can be updated.

Now then, when construction machine 31 is rented, the machine is generally rented out by setting a fee in accordance with the length of the rental period. However, the fact is that, even for rental periods of the same duration, there exist both those clients that operate the construction machine 31 for long periods of time, and those clients that hardly operate the machine at all. In this case, charging both the same rental fee is neither fair nor rational.

Accordingly, the billing amount can be automatically calculated in accordance with the length of time an engine is operated.

That is, "Operating Time" data automatically transmitted from vehicle 31 is received by server terminal 21, and an operation for totaling the operating hours up until the present time is performed. Meanwhile, the corresponding relationship between the cumulative value of operating time and the billing amount is set beforehand. Accordingly, a billing amount corresponding to the cumulative value of operating hours up until the present time is computed from this corresponding relationship. Server terminal 21 performs processing for updating the "Daily Work Report Screen" of the homepage based on the latest billing amount.

Thus, when a WWW browser is started up on terminal 11, homepage data is read out from the server terminal 21 via the WWW browser, and the "Daily Work Report Screen" is displayed on a display screen of the display device of terminal 11. Now, it is supposed that the rental period is from January 21 until January 30. On the "Daily Work Report Screen" of FIG. 40, there is displayed a billing amount XXXXXXX yen corresponding to a value (49 hours 6 minutes), which is the cumulative value of the operating hours for the rental period (January 21 until January 30), that is, the total of the "Operating Time" for each day during the rental period. In accordance therewith, the client can readily acquire real-time information on the billing amount corresponding to the hours, which the engine was operated during the rental period, from the screen.

In the above-described embodiment, a billing amount is simply calculated in accordance with a cumulative value of operating time.

However, in actuality, demand for construction machine changes greatly according to the time period. More specifically, demand for construction machine increases during periods when construction work is prevalent. Further, even during a single day, demand is greater during the afternoon hours than at night. Accordingly, a billing amount can be set according to the extent of demand for construction machine. More specifically, since demand for construction machine increases during a period when construction work is prevalent, the billing amount can be set higher, and conversely, during the off-season period, the billing amount can be set lower. Further, the billing amount can be set higher during the afternoon hours, and can be set lower during the nighttime hours. Accordingly, a billing amount can be determined not only by a cumulative value of operating time, but the operating period, operating hours, and operating time can also be taken into consideration.

Furthermore, in the embodiment explained hereinabove, communication means 1 comprising the Internet 2 are supposed, but communication means 1 of the present invention are not limited thereto, and can also be constituted by communication means, which do not comprise the Internet 2. In other words, if communications are performed the same as explained in the embodiment, it is possible to substitute another communication means. Further, in this embodiment, communication means 1, which combine radio communications and wire communications, are supposed, but, of course, radio communications alone can be used, or wire communications alone can be used.

Furthermore, in this embodiment, a presentation format, which displays mobile unit information on a terminal as image data, is supposed, but for the present invention, mobile unit information can also be presented by being outputted to a terminal by voice, and can also be printed out on a terminal as printed data. In other words, the presentation format of mobile unit information on a terminal is arbitrary.

Further, in this embodiment, it is supposed, for the most part, that a plurality of mobile units comprising construction machine are managed and monitored, but the present invention is not limited to this, and can also be applied to cases in which ordinary automobiles, two-wheeled vehicles and the like are managed and monitored.

The invention claimed is:

1. A communication system of a construction machine for communicating between said construction machine and a terminal device, which comprises:

said construction machine including a communication device with means for enabling communications with said terminal device when an electrical connection between said communication device and a power source is ON, and location detecting means for detecting a location of said construction machine; and said construction machine including means for periodically turning ON and OFF said electrical connection between said power source and said communication device when an engine of said construction machine is stopped; and said communication device performing said communications when said electrical connection is turned ON.

2. The communication system of a construction machine according to claim 1, wherein a period of time during which said means for periodically turning ON and OFF is turned ON is a minimum time necessary for performing a communication processing.

3. The communication system of a construction machine according to claim 1, wherein a time in which said means for periodically turning ON and OFF is turned OFF becomes shorter as the location of said one construction machine detected by said location means strays from a specific area or approaches a specific area.

4. The communication system of a construction machine according to claim 1, wherein a period for said turning ON and OFF is set arbitrarily.

5. A communication system of a construction machine for communicating between said construction machine and a terminal device, which comprises:

a communication device with means for enabling communications with said terminal device when an electrical connection between said communication device and a power source is ON, and said construction machine including travel speed computing means for computing a travel speed of said construction machine;

said construction machine including means for periodically turning ON and OFF said electrical connection between said power source and said communication device when an engine of said construction machine is stopped; and said communication device performing said communications when said electrical connection is turned ON.

6. The communication system of a construction machine according to claim 5, wherein a period of time during which said means for periodically turning ON and OFF is turned ON is a minimum time necessary for performing a communication processing.

7. The communication system of a construction machine according to claim 5, further comprising location detecting means, wherein a time in which said means for periodically turning ON and OFF is turned OFF becomes shorter as a travel speed detected by the location detecting means becomes faster.

8. The communication system of a construction machine according to claim 5, wherein a period for said turning ON and OFF is set arbitrarily.

9. A communication system of a construction machine where said construction machine and a terminal device are connected by communication means enabling mutual transmission and reception, and in accordance with an input operation performed at said terminal device of requesting construction machine information related to said construction machine, a content of a request is sent to said construction machine, and said construction machine, which receives the request content, acquires, via said construction machine, the construction machine information corresponding to the request content and sends the acquired construction machine information to said terminal device, which comprises:

said construction machine including detecting means for detecting a fact that an engine of said construction machine has been started; and when said detecting means detects that said engine is started within a predetermined time zone, information about the starting of said construction machine is sent to said terminal device from said construction machine.

10. A communication system of a construction machine where said construction machine and a terminal device are connected by communication means enabling mutual transmission and reception, and in accordance with an input operation performed at said terminal device of requesting construction machine information related to said construction machine, a content of a request is sent to said construction machine, and said construction machine, which receives the request content, acquires, via said construction machine, the construction machine information corresponding to the request content and sends the acquired construction machine information to said terminal device, which comprises:

said construction machine including totaling means for totaling engine operating hours of said construction machine; and when a cumulative value of said engine operating hours totaled by said totaling means for said construction machine either reaches a specified value, or increases by a specified quantity, the construction machine information of said construction machine is sent to said terminal device from said construction machine.

11. A communication system of a construction machine where said construction machine and a terminal device are connected by communication means enabling mutual transmission and reception, and in accordance with an input operation performed at said terminal device of requesting construction machine information related to said construction machine, a content of a request is sent to said construction machine, and said construction machine, which receives the request content, acquires, via said construction machine, the construction machine information corresponding to the request content and sends the acquired construction machine information to said terminal device, which comprises:

said construction machine including detecting means for detecting a location of said construction machine; and when the location of said construction machine detected by said detecting means moves outside a predetermined area or inside of a predetermined area, the construction machine information is sent to said terminal device from said construction machine.

12. A communication system of a construction machine where said construction machine and a terminal device are connected by communication means enabling mutual transmission and reception, and in accordance with an input operation performed at said terminal device of requesting construction machine information related to said construction machine, a content of a request is sent to said construction machine, and said construction machine, which receives the request content, acquires, via said construction machine, the construction machine information corresponding to the request content and sends the acquired construction machine information to said terminal device, which comprises:

said construction machine including detecting means for detecting a relative location of said construction machine in relation to a set range; and when the relative location of said construction machine in relation to the set range constitutes a specified relative location, the construction machine information is sent to said terminal device from said construction machine.

13. A communication device of a construction machine where said construction machine and a terminal device are connected by communication means enabling mutual transmission and reception, and in accordance with an input operation performed at said terminal device of requesting construction machine information related to said construction machine, a content of a request is sent to said construction machine, and said construction machine, which receives the request content, acquires, via said construction machine, the construction machine information corresponding to the request content and sends the acquired construction machine information to said terminal device, which comprises:

said construction machine including detecting means for detecting a drop in voltage of a power source mounted to said construction machine; and when the voltage of said power source detected by said detecting means drops below a specified value, the construction machine information is sent to said terminal device from said construction machine.

14. A communication system of a construction machine where said construction machine and a terminal device are connected by communication means enabling mutual transmission and reception, and in accordance with an input operation performed at said terminal device of requesting construction machine information related to said construction machine, a content of a request is sent to said construction machine, and the construction machine, which receives the request content, acquires, via said construction machine, the construction machine information corresponding to the request content and sends the acquired construction machine information to said terminal device, which comprises:

said construction machine including detecting means for detecting a location of said construction machine, and the construction machine information of said construction machine being sent to said terminal device from said construction machine when a content of construction machine-related data to be sent this time differs from a content of construction machine-related data sent at a previous time.

15. A communication device of a construction machine for communicating between a plurality of construction machines and a terminal device, which comprises:

one or more business offices at/from which said plurality of construction machines are stored/dispatched;

one or more work sites at which said plurality of construction machines are operated;

said plurality of construction machines respectively including location detecting means for detecting locations of said plurality of construction machines;

based on detection results of said location detecting means and location data for said one or more business offices and said the one or more work sites, when one construction machine of said plurality of construction machines enters one business office of said one or more business offices or one work site of said one or more work sites, data stating that said one construction machine has entered said one business office or said one work site is sent to said terminal device from said one construction machine; and when said one construction machine exits from said one business office or said one work site, data stating that said one construction machine has exited said one business office or said one work site is sent to said terminal device from said one construction machine; and based on the sent data, data on the entry/exit of said plurality of construction machines to/from said one business office or said one work site is managed by said terminal device.

16. The communication device of a construction machine according to claim 15, wherein when said one construction machine exits from said one business office or said one work site, location data is sent to said terminal device from said one construction machine each time said one construction machine moves a predetermined distance, and based on the sent location data, data on a movement history of said one construction machine is managed by said terminal device.

17. A communication device of a mobile unit for communicating between a terminal device and a plurality of operational mobile units, which comprises:

a transportation mobile unit for transporting said plurality of operational mobile units;

one or more storage and dispatch areas at/from which said plurality of operational mobile units are stored/dispatched;

one or more operating areas where said plurality of operational mobile units are operated;

said plurality of operational mobile units respectively including location detecting means for detecting locations of said plurality of operational mobile units;

based on detection results of said location detecting means and location data of said one or more operating areas, data as to whether or not one operational mobile unit of said plurality of operation mobile units is at one operating area of said one or more operating areas is sent to said terminal device from said one operational mobile unit;

based on detection results of said location detecting means and location data of said one or more storage and dispatch areas; when said one operational mobile unit enters one storage and dispatch area of said one or more storage and dispatch areas, data that said one operational mobile unit has entered said one storage and dispatch area is sent to said terminal device from said one operational mobile unit;

when said operational mobile unit exits from said one storage and dispatch area, data that said one operational mobile unit exited from said one storage and dispatch area is sent to said terminal device from said one operational mobile unit;

based on the sent data, data as to whether said plurality of operational mobile units are either being stored at or have been dispatched from said one or more storage and dispatch areas, and data as to whether or not said plurality of operational mobile units are at said one or more operating areas are managed by said terminal device; and based on the managed data, said terminal device issues instructions to said transportation mobile unit to transport said one operational mobile unit from said one operating area to said one storage and dispatch area, or to transport said one operational mobile unit from said one storage and dispatch area to said one operating area.

18. A communication device of a mobile unit for communicating between a terminal device and a plurality of operational mobile units for operating within one or more operating areas, which comprises:

a transportation mobile unit for transporting said plurality of operational mobile units is provided;

one or more storage and dispatch areas at/from which said plurality of operational mobile units are stored/dispatched;

one or more operating areas where said plurality of operational mobile units are operated;

said plurality of operational mobile units respectively including location detecting means for detecting locations of said plurality of operational mobile units;

based on detection results of said location detecting means, location data of said one or more storage and dispatch areas, and location data of said one or more operating areas; when one operational mobile unit of said plurality of operational mobile enters either one storage and dispatch area of one or more storage and dispatch areas, or one operating area of said one or more operating areas, data that the one operational mobile unit entered said one storage and dispatch or said one operating area is sent to said terminal device from said one operational mobile unit, and when said operational mobile unit exits from either said one storage and dispatch area, or said one operating area, data that this one operational mobile unit exited from said one storage and dispatch area or said one operating area is sent to said terminal device from said one operational mobile unit;

based on the sent data, data as to whether said plurality of operational mobile units are either being stored at or have been dispatched from said one or more storage and dispatch areas, and data as to whether or not said plurality of operational mobile units are at said one or more operating areas are managed by said terminal device; and based on the managed data, said terminal device issues instructions to said transportation mobile unit to either transport said one operational mobile unit from said one operating area to said one storage and dispatch area, or to transport said one operational mobile unit from said one storage and dispatch area to said one operating area.

19. A communication system of a construction machine for communicating between a plurality of construction machines and a terminal device, which comprises:

said plurality of construction machines including a communication device enabling communications with said terminal device when an electrical connection between said communication device and a power source is turned ON;

said plurality of construction machines respectively including means for periodically turning ON and OFF at a predetermined period said electrical connection between said power source and said communication device when an engine of one construction machine of said plurality of construction machines is stopped; and said one construction machines changing said predetermined period in accordance with change data sent to said one construction machine from said terminal device.

20. A communication system of a construction machine for communicating between said construction machine and a terminal device, comprising:

said construction machine having a communication device with means for communicating with said terminal device when an electrical connection between said communication device and a power source is ON, location detecting means for detecting a location of said construction machine, and state detecting means for detecting a state of said construction machine; and said construction machine further including means for periodically turning ON and OFF said electrical connection between said power source and said communication device when an engine of said construction machine is stopped; and when the electrical connection is turned ON, said communication device performing said communications processing or said state detecting means detecting the state of the construction machine.

21. A communication device of a construction machine where said construction machine and a terminal device are connected by communication means enabling mutual transmission and reception, and in accordance with an input operation performed at said terminal device requesting construction machine information related to said construction machine, a content of a request is sent to said construction machine, and said construction machine, which receives the request content, acquires, via said construction machine, construction machine information corresponding to the request content and sends the acquired construction machine information to said terminal device, comprising:

said construction machine including detecting means for detecting a drop in voltage of a power source mounted to said construction machine; and means for periodically turning ON and OFF an electrical connection between said power source and said communication device when the engine of said construction machine is stopped; and when the voltage of said power source detected by said detecting means drops below a specified value, a time in which said means for periodically turning ON and OFF is turned OFF becomes longer.

* * * * *